(12) United States Patent
Bickel

(10) Patent No.: US 12,316,113 B2
(45) Date of Patent: May 27, 2025

(54) SYSTEMS AND METHODS FOR EVALUATING ELECTRICAL PHASORS TO IDENTIFY, ASSESS, AND MITIGATE POWER QUALITY ISSUES

(71) Applicant: Schneider Electric USA, Inc., Andover, MA (US)

(72) Inventor: Jon A. Bickel, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 515 days.

(21) Appl. No.: 17/554,665

(22) Filed: Dec. 17, 2021

(65) Prior Publication Data

US 2022/0200281 A1 Jun. 23, 2022

Related U.S. Application Data

(60) Provisional application No. 63/127,302, filed on Dec. 18, 2020.

(51) Int. Cl.
*H02J 3/00* (2006.01)
*G05B 13/04* (2006.01)
*H02J 13/00* (2006.01)

(52) U.S. Cl.
CPC .......... *H02J 3/0012* (2020.01); *G05B 13/042* (2013.01); *H02J 13/00001* (2020.01); *H02J 13/00002* (2020.01)

(58) Field of Classification Search
CPC .... H02J 3/0012; H02J 3/001; H02J 13/00001; H02J 13/00002; Y04S 10/18; G05B 13/042
See application file for complete search history.

(56) References Cited

U.S. PATENT DOCUMENTS 5,796,224 A 8/1998 Hayashi et al.
10,598,736 B2 * 3/2020 Luan .................. H02J 3/00
(Continued)

FOREIGN PATENT DOCUMENTS

WO 2021002916 A1 1/2021

OTHER PUBLICATIONS

Sadigh et al., "Review of Voltage Compensation Methods in Dynamic Voltage Restorer (DVR)", Jul. 2012, IEEE, 2012 IEEE Power and Energy Society General Meeting, p. 1-8 (Year: 2012).*

(Continued)

*Primary Examiner* — Mong-Shune Chung
(74) *Attorney, Agent, or Firm* — Troutman Pepper Locke LLP

(57) ABSTRACT

Systems and methods for evaluating electrical phasors to identify, assess and mitigate selected power quality issues are disclosed herein. A method in accordance with one embodiment of this disclosure includes capturing or deriving at least one energy-related signal using one or more Intelligent Electronic Devices in an electrical system, and processing electrical measurement data from, or derived from, the at least one energy-related signal to identify anomalous characteristics in the electrical system. In response to identifying the anomalous characteristics in the electrical system, a degree of voltage phase jump and a voltage sag magnitude may be determined based on or using the identified anomalous characteristics. The degree of the voltage phase jump and the voltage sag magnitude may be displayed on at least one phasor diagram, and the at least one phasor diagram may be analyzed to determine most optimal/cost-effective apparatus(es) to mitigate at least one of the identified anomalous characteristics.

27 Claims, 30 Drawing Sheets

(56) References Cited

U.S. PATENT DOCUMENTS

| | | | |
|---|---|---|---|
| 11,189,454 B2* | 11/2021 | Carter | H01J 37/08 |
| 2006/0259255 A1* | 11/2006 | Anderson | G09B 29/003 |
| | | | 702/64 |
| 2011/0264388 A1* | 10/2011 | Gong | G01R 31/088 |
| | | | 702/58 |
| 2015/0346286 A1* | 12/2015 | Janssen | H02J 3/00 |
| | | | 702/58 |
| 2019/0072596 A1* | 3/2019 | Steuer | G01R 21/133 |
| 2020/0014207 A1 | 1/2020 | Bickel et al. | |
| 2020/0389032 A1* | 12/2020 | Thompson | H02J 3/381 |

OTHER PUBLICATIONS

International Search Report and the Written Opinion for corresponding International Patent Application No. PCT/US21/64130, dated May 3, 2022, 35 pages.

Sadigh, A. Khoshkbar et al., "Review of Voltage Compensation Methods in Dynamic Voltage Restorer (DVR)", 2012 IEEE Power and Energy Society General Meeting, Jul. 2012, 9 pages (including 1 page indicating upload to ResearchGate.net on Aug. 6, 2014).

Salehi, Vahid et al., "Real-time Power System Analysis and Security Monitoring by WAMPAC Systems," Innovative Smart Grid Technologies (ISGT), 2012 IEEE PES, IEEE, Jan. 16, 2012, pp. 1-8.

Farantatos, Evangelos et al., "A Hybrid Framework for Online Dynamic Security Assessment Combining High Performance Computing and Synchrophasor Measurements," 2015 IEEE Power & Energy Society General Meeting, IEEE, Jul. 26, 2015, 5 pages.

Nielsen, John Godsk et al., "Control Strategies for Dynamic Voltage Restorer Compensating Voltage Sags with Phase Jump," APEC 2001, 16th Annual IEEE Applied Power Electronics Conference and Exposition, vol. 2, Mar. 4, 2001, pp. 1267-1273.

Extended European Search Report dated Nov. 20, 2024 for corresponding European Patent Application No. 21907927.4-1002, 11 pages.

* cited by examiner (a)

(b)

(c)

(d)

(e)

SYSTEMS AND METHODS FOR EVALUATING ELECTRICAL PHASORS TO IDENTIFY, ASSESS, AND MITIGATE POWER QUALITY ISSUES

CROSS REFERENCE TO RELATED APPLICATION

This application claims the benefit of and priority to U.S. Provisional Application No. 63/127,302, filed on Dec. 18, 2020, which application was filed under 35 U.S.C. § 119(e) and is incorporated by reference herein in its entirety.

FIELD

This disclosure relates generally to power quality issues, and more particularly, to systems and methods for evaluating electrical phasors to identify, assess, and mitigate power quality issues.

BACKGROUND

As is known, power quality issues/events are one of the most significant and costly impacts on electrical systems (also sometimes referred to as "electrical networks"). Poor power quality is estimated to cost the European economy up to €150 billion annually, according to the Leonardo Power Quality Initiative.[1] Additionally, the U.S. economy experiences losses ranging from $119 billion to $188 billion annually, according to research by the Electric Power Research Institute (EPRI).[2] Perhaps the most important statistic is the EPRI finding that 80 percent of power-quality disturbances are generated within a facility. One exemplary economic model summarizes the total cost associated with power quality events as follows:

[1] https://adfpowertuning.com/en/about-us/news-stories/148-leonardo-energy-qpan-european-power-quality-surveyq-shows-g150bn-annually-in-cost-for-low-power-quality.html
[2] https://blog.schneider-electric.com/power-management-metering-monitoring-power-quality/2015/10/16/why-poor-power-quality-costs-billions-annually-and-what-can-be-done-about-it/

> Total losses=production losses+restart losses+product/material losses+equipment losses+third-party costs+other miscellaneous costs[3]

[3] The Cost of Poor Power Quality, Roman Targosz and David Chapman, October 2015, ECI Publication No. Cu0145

Other miscellaneous costs associated with power quality issues may include intangible losses such as a damaged reputation with customers and suppliers or more direct losses such as the devaluation of credit ratings and stock prices.

SUMMARY

Described herein are new and innovative assessment techniques for evaluating electrical phasors to identify, assess and mitigate power quality issues. The power quality issues may include short-duration root mean square (rms) variations and voltage transients (generally referred to herein as "transient overvoltage events"), for example.

As is known, transient overvoltage events, for example, can originate inside an energy consumer's facility or out on the utility's grid, often propagating through various levels of electrical and data systems. Sources of destructive transient overvoltage events can range from the obvious, such as a lightning strike during a thunderstorm, to the subtle, such as static discharge from a human finger. Studies have suggested that sixty percent or more of all transient overvoltage events originate inside a facility with the remainder originating from outside sources, including lightning events and switching transient events originating on the utility system.

Transient overvoltage events that exceed insulation ratings can stress electrical insulation, leading to gradual breakdown or abrupt failure of the dielectric. Some industrial facilities, for example, may experience thousands of transient overvoltage events per hour with voltage impulses exceeding five to ten times the nominal system voltage in certain cases. Reducing the magnitude and duration of transient overvoltage events can extend the life of equipment insulation (e.g., in these industrial facilities), resulting in longer equipment operational life.

Transient overvoltage events typically last from less than a microsecond to several milliseconds, and are generally classified into one of two different subcategories: impulsive or oscillatory. Because damage due to transient overvoltage events may not be obvious, resulting failures are often diagnosed as "unknown cause." Studies have shown that up to seventy-five percent of integrated circuit failures may be due to transient overvoltage events. Furthermore, it has been estimated that billions of dollars in electronic equipment losses occur globally each year due to transient overvoltage events, with these numbers increasing each year as technology evolves.

Because of their prevalence and influence on electrical systems, providing a firm understanding of the exposure to short-duration rms variations and transient overvoltage events is essential, especially for facilities with sensitive or susceptible loads and processes. To address this and other needs, the invention disclosed herein provides new and innovative assessment techniques for evaluating electrical phasors to identify, assess and mitigate power quality issues, including short-duration rms variations and transient overvoltage events.

A method in accordance with one embodiment of this disclosure includes capturing, measuring or deriving at least one energy-related signal using one or more intelligent electronic devices (IEDs) in an electrical system, and processing electrical measurement data from, or derived from, the at least one energy-related signal to identify anomalous characteristics in the electrical system. In response to identifying the anomalous characteristics in the electrical system, a degree of voltage phase jump and a voltage sag magnitude (e.g., an indication of the voltage sag's depth) may be determined based on or using the identified anomalous characteristics. The degree of the voltage phase jump and the voltage sag magnitude may be presented/displayed on at least one phasor diagram, and the at least one phasor diagram may be analyzed to determine most optimal/cost-effective apparatus(es) to mitigate at least one of the identified anomalous characteristics. One or more actions may be taken or performed based on determining the most optimal/cost-effective apparatus(es) to mitigate the at least one of the identified anomalous characteristics.

In accordance with some embodiments of this disclosure, the degree of the voltage phase jump and the voltage sag magnitude are each represented by at least one indication on the at least one phasor diagram. The at least one indication may take the form of at least one of: a phasor, a shape, a marker, a shading, a coloring, a heat map, a sound indicator, and an icon, for example, with the at least one indicator being representative of the degree of the voltage phase jump and the voltage sag magnitude. In accordance with some embodiments of this disclosure, characteristics associated with the phasor, the shape, the marker, the shading, the coloring, the heat map, the sound indicator, and the icon are manually or automatically configured.

In accordance with some embodiments of this disclosure, the method further includes determining a duration of the identified anomalous characteristics, and displaying the duration of the identified anomalous characteristics on the at least one phasor diagram. In accordance with some embodiments of this disclosure, information relating to at least one of: the degree of voltage phase jump, the voltage sag magnitude, and the duration of the identified anomalous characteristics presented on the at least one phasor diagram is analyzed to determine the most optimal/cost-effective apparatus(es) to mitigate at least one of the identified anomalous characteristics.

In accordance with some embodiments of this disclosure, the one or more actions taken or performed based on determining the most optimal/cost-effective apparatus(es) to mitigate the at least one of the identified anomalous characteristics, include: overlaying one or more mitigative solution characteristics on one or more phasor diagrams of the at least one phasor diagram. In accordance with some embodiments of this disclosure, the one or more mitigative solution characteristics are indicated using at least one of: a shape, a marker, a shading, a coloring, a heat map, a sound indicator, and an icon, with the at least one indicator being representative of the one or more mitigative solution characteristics. The one or more mitigative solution characteristics overlayed on the one or more phasor diagrams may be associated, for example, with at least one range or zone where the one or more mitigative solution characteristics are determined to be capable of successfully mitigating at least one anomalous condition of the identified anomalous conditions within the at least one range or zone. In accordance with some embodiments of this disclosure, the one or more mitigative solution characteristics include capability to resolve or mitigate at least one of: the voltage phase jump, the voltage sag magnitude and a duration of the identified anomalous characteristics (e.g., as shown by a marker or other form of indication). In some embodiments, recurrent anomalous characteristics may be indicated on one or more phasor diagrams of the at least one phasor diagram. It is understood that a variety of information may be presented on the above and below described at least one phasor diagram, including information relating the mitigative solution characteristics and information relating to the identified anomalous characteristics (e.g., degree of phase jump, voltage sag magnitude and duration of the identified anomalous characteristics). These types of information may each be shown by one or more indications including, for example, a shape, a marker, a shading, a coloring, a heat map, a sound indicator, and an icon.

In accordance with some embodiments of this disclosure, the at least one phasor diagram presented/displayed includes at least one of: information relating to the most optimal/cost-effective apparatus(es) of analyzed mitigative apparatus(es) to mitigate the at least one of the identified anomalous characteristics, and information relating to the identified anomalous characteristics. In accordance with some embodiments of this disclosure, the information relating to the identified anomalous characteristics including at least one of: degree of phase jump, voltage sag magnitude and duration of the identified anomalous characteristics. In accordance with some embodiments of this disclosure, the information relating to the most optimal/cost-effective apparatus(es) of analyzed mitigative apparatus(es) to mitigate the at least one of the identified anomalous characteristics, and the information relating to the identified anomalous characteristics, is shown by one or more indications. In accordance with some embodiments of this disclosure, the one or more indications including at least one of: a shape, a marker, a shading, a coloring, a heat map, a sound indicator, and an icon.

In accordance with some embodiments of this disclosure, the identified anomalous characteristics are indicative of at least one power quality issue in the electrical system. In accordance with some embodiments of this disclosure, the at least one power quality issue is identified based on an analysis of at least one of: the degree of voltage phase jump, the voltage sag magnitude, and the duration of the identified anomalous characteristics (e.g., as presented/displayed on the at least one phasor diagram). In accordance with some embodiments of this disclosure, the at least one power quality issue includes at least one voltage event. The at least one voltage event may include, for example, at least one of: a voltage sag, a voltage swell, a transient overvoltage event, a short-duration rms variation, and a long-duration rms variation.

As is known, anomalous characteristics/conditions (e.g., the identified anomalous conditions) may produce or lead to stresses (e.g., electrical, thermal and mechanical) that may shorten the life of equipment in an electrical system. Therefore, it is desirable to detect the anomalous characteristics/conditions and reduce the effects of the anomalous characteristics/conditions in response to detecting the anomalous characteristics/conditions (e.g., to extend the operational life of the equipment). It is important to note that a specific device and/or technique may be capable of adequately/sufficiently mitigating one or more specific anomalous characteristics/conditions; however, not capable of mitigating other anomalous characteristics/conditions. To address this and other concerns, the above-discussed method may analyze the generated at least one phasor diagram to analyze at least one voltage event (or anomalous event) to determine the most optimal/cost-effective apparatus(es) to mitigate at least one of the identified anomalous characteristics, and take one or more actions based on determining the most optimal/cost-effective apparatus(es) to mitigate the at least one of the identified anomalous characteristics. In accordance with some embodiments of this disclosure, the one or more actions may be automatically taken/performed by a control system (e.g., a diagnostic control system) associated with the electrical system. In accordance with some embodiments of this disclosure, the control system is communicatively coupled to the one or more IEDs responsible for capturing the at least one energy-related signal, and/or to a cloud-based system, on-site/edge software, a gateway, and other head-end system associated with the electrical system.

In some embodiments, the above method (and/or the other systems and methods disclosed herein) may use one or more of the above and below discussed features. For example, features of one or more of the above and below discussed example implementations of the inventions disclosed herein may be combined with or substituted by one or more other of the above and below discussed example implementations of the inventions disclosed herein. Additionally, in some embodiments the above method (and/or the other systems and methods disclosed herein) may be implemented on or using at least one IED, for example, on the one or more IEDs responsible for capturing or deriving the energy-related signals. Additionally, in some embodiments the above method (and/or the other systems and methods disclosed herein) may be implemented partially or fully remote from the one or more IEDs, for example, in a cloud-based system, on-site/edge software, a gateway, and other head-end system associated with the electrical system. Examples of the one or more IEDs may include a smart utility meter, a digital power quality meter, and/or another measurement device (or devices). The one or more IEDs may include breakers, relays, power quality correction devices, uninterruptible power supplies (UPSs), filters, and/or variable speed drives (VSDs), for example. Additionally, the one or more IEDs may include at least one virtual meter in some embodiments.

It is understood that the energy-related signals captured or derived by the one or more IEDs discussed above may include, for example, at least one of: a voltage signal, a current signal, input/output (I/O) data, and a derived or extracted value. In some embodiments, the I/O data includes at least one of a digital signal (e.g., two discrete states) and an analog signal (e.g., continuously variable). The digital signal may include, for example, at least one of on/off status(es), open/closed status(es), high/low status(es), synchronizing pulse and any other representative bi-stable signal. Additionally, the analog signal may include, for example, at least one of temperature, pressure, volume, spatial, rate, humidity, and any other physically or user/usage representative signal.

In accordance with some embodiments of this disclosure, the derived or extracted value includes at least one of a calculated, computed, estimated, derived, developed, interpolated, extrapolated, evaluated, and otherwise determined additional energy-related value from at least one of the measured voltage signal and/or the measured current signal. In some embodiments, the derived value additionally or alternatively includes at least one of active power(s), apparent power(s), reactive power(s), energy(ies), harmonic distortion(s), power factor(s), magnitude/direction of harmonic power(s), harmonic voltage(s), harmonic current(s), interharmonic current(s), interharmonic voltage(s), magnitude/direction of interharmonic power(s), magnitude/direction of sub-harmonic power(s), individual phase current(s), phase angle(s), impedance(s), sequence component(s), total voltage harmonic distortion(s), total current harmonic distortion(s), three-phase current(s), phase voltage(s), line voltage(s), spectral analysis and/or other similar/related parameters. In some embodiments, the derived value additionally or alternatively includes at least one energy-related characteristic, the energy-related characteristic including magnitude, direction, phase angle, percentage, ratio, level, duration, associated frequency components, energy-related parameter shape, and/or decay rate. In accordance with some embodiments of this disclosure, the derived or extracted value may be linked to at least one process, load(s) identification, etc., for example.

It is understood that the at least one energy-related signal or waveform captured or derived by one or more IEDs may include (or leverage) substantially any electrical parameter derived from at least one of a voltage and current signal (including the voltages and currents themselves), for example. It is also understood that the at least one energy-related signal or waveform may be continuously or semi-continuously/periodically captured/recorded and/or transmitted and/or logged by the one or more IEDs, and power quality issues/events may be detected/identified based on the at least one energy-related signal.

A system to automatically identify power quality issues from at least one energy-related signal in an electrical system is also provided herein. In one aspect of this disclosure, the system includes at least one processor and at least one memory device (e.g., local and/or remote memory device) coupled to the at least one processor. The at least one processor and the at least one memory device are configured to capture or derive at least one energy-related signal using one or more IEDs in the electrical system, and process electrical measurement data from, or derived from, the at least one energy-related signal to identify anomalous characteristics in the electrical system. In response to identifying the anomalous characteristics in the electrical system, a degree of voltage phase jump and a voltage sag magnitude may be determined based on or using the identified anomalous characteristics. The degree of the voltage phase jump and the voltage sag magnitude may be presented/displayed on at least one phasor diagram, and the at least one phasor diagram may be analyzed to determine most optimal/cost-effective apparatus(es) to mitigate at least one of the identified anomalous characteristics. One or more actions may be taken or performed based on determining the most optimal/cost-effective apparatus(es) to mitigate the at least one of the identified anomalous characteristics.

In accordance with some embodiments of this disclosure, the at least one processor and the at least one memory device of the system are further configured to determine a duration of the identified anomalous characteristics, and display the duration of the identified anomalous characteristics on the at least one phasor diagram. In accordance with some embodiments of this disclosure, information relating to at least one of: the degree of voltage phase jump, the voltage sag magnitude, and the duration of the identified anomalous characteristics presented on the at least one phasor diagram is analyzed to determine the most optimal/cost-effective apparatus(es) to mitigate at least one of the identified anomalous characteristics.

In accordance with some embodiments of this disclosure, the one or more actions taken or performed based on determining the most optimal/cost-effective apparatus(es) to mitigate the at least one of the identified anomalous characteristics, include: overlaying one or more mitigative solution characteristics on one or more phasor diagrams of the at least one phasor diagram. In accordance with some embodiments of this disclosure, the one or more mitigative solution characteristics are indicated using at least one of: a shape, a marker, a shading, a coloring, a heat map, a sound indicator, and an icon, with the at least one indicator being representative of the one or more mitigative solution characteristics. The one or more mitigative solution characteristics overlayed on the one or more phasor diagrams may be associated, for example, with at least one range or zone where the one or more mitigative solution characteristics are determined to be capable of successfully mitigating at least one anomalous condition of the identified anomalous conditions within the at least one range or zone. In accordance with some embodiments of this disclosure, the one or more mitigative solution characteristics include capability to resolve or mitigate at least one of: the voltage phase jump, the voltage sag magnitude and a duration of the identified anomalous characteristics. In some embodiments, recurrent anomalous characteristics may be indicated on one or more phasor diagrams of the at least one phasor diagram. It is understood that a variety of information may be presented on the above and below described at least one phasor diagram, including information relating the mitigative solution characteristics and information relating to the identified anomalous characteristics (e.g., degree of phase jump, voltage sag magnitude and duration of the identified anomalous characteristics). These types of information may each be shown by one or more indications including, for example, a shape, a marker, a shading, a coloring, a heat map, a sound indicator, and an icon.

In accordance with some embodiments of this disclosure, the at least one phasor diagram presented/displayed includes at least one of: information relating to the most optimal/cost-effective apparatus(es) of analyzed mitigative apparatus(es) to mitigate the at least one of the identified anomalous characteristics, and information relating to the identified anomalous characteristics. In accordance with some embodiments of this disclosure, the information relating to the identified anomalous characteristics including at least one of: degree of phase jump, voltage sag magnitude and duration of the identified anomalous characteristics. In accordance with some embodiments of this disclosure, the information relating to the most optimal/cost-effective apparatus(es) of analyzed mitigative apparatus(es) to mitigate the at least one of the identified anomalous characteristics, and the information relating to the identified anomalous characteristics, is shown by one or more indications. In accordance with some embodiments of this disclosure, the one or more indications including at least one of: a shape, a marker, a shading, a coloring, a heat map, a sound indicator, and an icon.

In accordance with some embodiments of this disclosure, the above-discussed system includes or is coupled to at least one control device or system (e.g., a diagnostic control device or system). In accordance with some embodiments of this disclosure, the at least one control device or system is configured to take or perform the above-discussed one or more actions based on determining the most optimal/cost-effective apparatus(es) to mitigate the at least one of the identified anomalous characteristics (e.g., in response to receiving one or more control signals from the above-discussed system or portions/select circuitry of the system).

In some embodiments, the one or more IEDs capturing or deriving the at least one energy-related signal include at least one metering device. The at least one metering device may correspond, for example, to at least one metering device in the electrical system for which the energy-related signals are being captured/monitored.

As used herein, an IED is a computational electronic device optimized to perform a particular function or set of functions. Examples of IEDs may include smart utility meters, power quality meters, microprocessor relays, digital fault recorders, and other metering devices. IEDs may also be imbedded in VSDs, uninterruptible power supplies (UPSs), circuit breakers, relays, transformers, or any other electrical apparatus. IEDs may be used to perform measurement/monitoring and control functions in a wide variety of installations. The installations may include utility systems, industrial facilities, warehouses, office buildings or other commercial complexes, campus facilities, computing co-location centers, data centers, power distribution networks, or any other structure, process or load that uses electrical energy. For example, where the IED is an electrical power monitoring device, it may be coupled to (or be installed in) an electrical power transmission or distribution system and configured to sense/measure and store data (e.g., waveform data, logged data, I/O data, etc.) as electrical parameters representing operating characteristics (e.g., voltage, current, waveform distortion, power, etc.) of the electrical distribution system. These parameters and characteristics may be analyzed by a user to evaluate potential performance, reliability and/or power quality-related issues, for example. The IED may include at least a controller (which in certain IEDs can be configured to run one or more applications simultaneously, serially, or both), firmware, a memory, a communications interface, and connectors that connect the IED to external systems, devices, and/or components at any voltage level, configuration, and/or type (e.g., AC, DC). At least certain aspects of the monitoring and control functionality of an IED may be embodied in a computer program that is accessible by the IED.

In some embodiments, the term "IED" as used herein may refer to a hierarchy of IEDs operating in parallel and/or tandem/series. For example, an IED may correspond to a hierarchy of energy meters, power meters, and/or other types of resource meters. The hierarchy may comprise a tree-based hierarchy, such a binary tree, a tree having one or more child nodes descending from each parent node or nodes, or combinations thereof, wherein each node represents a specific IED. In some instances, the hierarchy of IEDs may share data or hardware resources and may execute shared software. It is understood that hierarchies may be non-spatial such as billing hierarchies where IEDs grouped together may be physically unrelated.

It is understood that an input is data that a processor and/or IED (e.g., the above-discussed one or more IEDs) receives, and an output is data that a processor and/or IED sends. Inputs and outputs may either be digital or analog. The digital and analog signals may be both discrete variables (e.g., two states such as high/low, one/zero, on/off, etc. If digital this may be a value. If analog, the presence of a voltage/current may be considered by the system/IED as an equivalent signal) or continuous variables (e.g., continuously variable such as spatial position, temperature, pressure voltage, etc.). They may be digital signals (e.g., measurements in an IED coming from a sensor producing digital information/values) and/or analog signals (e.g., measurements in an IED coming from a sensor producing analog information/values). These digital and/or analog signals may include any processing step within the IED (e.g., derive a Power Factor, a magnitude, among all the derived calculations).

Processors and/or IEDs may convert/reconvert digital and analog input signals to a digital representation for internal processing. Processors and/or IEDs may also be used to convert/reconvert internally processed digital signals to digital and/or analog output signals to provide some indication, action, or other response (such as an input for another processor/IED). Typical uses of digital outputs may include opening or closing breakers or switches, starting or stopping motors and/or other equipment, and operating other devices and equipment that are able to directly interface with digital signals. Digital inputs are often used to determine the operational status/position of equipment (e.g., is a breaker open or closed, etc.) or read an input synchronous signal from a utility pulsed output. Analog outputs may be used to provide variable control of valves, motors, heaters, or other loads/processes in energy management systems. Finally, analog inputs may be used to gather variable operational data and/or in proportional control schemes.

A few more examples where digital and analog I/O data are leveraged may include (but not be limited to): turbine controls, plating equipment, fermenting equipment, chemical processing equipment, telecommunications, equipment, precision scaling equipment, elevators and moving sidewalks, compression equipment, waste water treatment equipment, sorting and handling equipment, plating equipment temperature/pressure data logging, electrical generation/transmission/distribution, robotics, alarm monitoring and control equipment, as a few examples.

As noted earlier in this disclosure, the at least one energy-related signal captured or derived by the one or more IEDs may include I/O data. It is understood that the I/O data may take the form of digital I/O data, analog I/O data, or a combination digital and analog I/O data. The I/O data may convey status information, for example, and many other types of information, as will be apparent to one of ordinary skill in the art from discussions above and below.

It is understood that the terms "processor" and "controller" are sometimes used interchangeably herein. For example, a processor may be used to describe a controller. Additionally, a controller may be used to describe a processor.

Techniques relating to phasor analysis for transient overvoltage events are also disclosed herein. In accordance with some embodiments of this disclosure, the phasor analysis provides/enables an assessment of effects of motor regeneration characteristics or conditions in an electrical system. In one aspect, a method for providing/enabling this assessment includes capturing or deriving at least one energy-related signal using one or more IEDs in the electrical system, and processing electrical measurement data from, or derived from, the at least one energy-related signal to identify at least one of: regenerative characteristics or conditions associated with at least one working/operational motor (e.g., an induction motor) in the electrical system, and a switching event(s)/action(s) producing a switching transient in the electrical system. The identified regenerative characteristics or conditions and/or the switching event(s)/action(s) from the electrical measurement data may be analyzed to determine if the at least one operational motor is exposed to damage(s)/stress(es) (e.g., electrical and/or mechanical stress(es)) from the identified regenerative characteristics or conditions and/or the switching event(s)/action(s). In response to determining the at least one operational motor is exposed to damage(s)/stress(es) from the identified regenerative characteristics or conditions and/or the switching event(s)/action(s), one or more actions may be taken or performed to reduce or eliminate at least one of: the damage(s)/stress(es) to the at least one operational motor and the damage(s)/stress(es) to other components in the electrical system from the identified regenerative characteristics or conditions and/or the switching event(s)/action(s).

In accordance with some embodiments of this disclosure, the one or more IEDs responsible for capturing the at least one energy-related signal are located proximate to the at least one operational motor for which the regenerative characteristics or conditions are identified in the electrical system, and/or to the switching event(s)/action(s) producing a switching transient in the electrical system. Additionally, in accordance with some embodiments of this disclosure, the method further includes analyzing the identified regenerative characteristics or conditions and/or the switching event(s)/action(s) from the electrical measurement data to determine power quality issues caused by the at least one operational motor. In accordance with some embodiments of this disclosure, the regenerative characteristics or conditions are caused by an energy source being disconnected from the at least one operational motor.

In accordance with some embodiments of this disclosure, the one or more actions taken/performed using the aforesaid method include identifying at least one means to mitigate or eliminate at least one of: the damage(s)/stress(es) to the at least one operational motor and the damage(s)/stress(es) damage(s)/stress(es) to other components in the electrical system, selecting one or more of the at least one mitigation or elimination means based on priority and/or severity of: the damage(s)/stresses to the at least one operational motor and/or the damage(s)/stresses to other components, and at least one of indicating and applying the selected one or more of the at least one mitigation or elimination means. The selected one or more of the at least one mitigation or elimination means may be indicated, for example, on at least one plot, the at least one plot indicating at least one of: a point or points where re-energization occurred with respect to the phase angle, and the selected one or more of the at least one mitigation or elimination means. In accordance with some embodiments of this disclosure, the one or more of the at least one mitigation or elimination means is further selected based on an expected ability of the one or more of the at least one mitigation or elimination means to reduce or eliminate at least one of magnitude and duration of potentially damaging conditions (e.g., from energy-related transients, such as switching transients) in the electrical system. Additionally, in accordance with some embodiments of this disclosure, the one or more of the at least one mitigation or elimination means is further selected based on costs (e.g., economic costs) associated with acquiring and/or applying the one or more of the at least one mitigation or elimination means.

In accordance with some embodiments of this disclosure, the regenerative characteristics or conditions associated with at least one operational motor in the electrical system are determined to be due to a switching transient(s) in the electrical system, and the one or more of the at least one mitigation or elimination means includes at least one transient mitigative device. The at least one transient mitigative device may include, for example, at least one of: a surge arrester, a lightning arrestor, a surge suppressor, transient voltage surge suppressor, line reactor, regenerative load bank, and an isolation transformer.

In accordance with some embodiments of this disclosure, the one or more actions are automatically performed by a control system (e.g., a diagnostic control system) associated with the electrical system. The control system may be communicatively coupled to the one or more IEDs responsible for capturing or deriving the at least one energy-related signal, and/or to a cloud-based system, on-site/edge software, a gateway, and other head-end system associated with the electrical system, for example.

In accordance with some embodiments of this disclosure, the other components in the electrical system for which the damage(s)/stress(es) are evaluated are adjacently connected to the at least one operational motor for which the regenerative characteristics or conditions are identified.

A corresponding system to the above method for using electrical phasors to analyze/assess effects of motor regeneration characteristics or conditions in an electrical system is also provided herein. It is understood that the phasor analysis may be applied to other equipment/devices besides motors, as will be appreciated by one of ordinary skill in the art.

Other example aspects, features and advantages of the disclosed invention will be appreciated from the discussions below.

BRIEF DESCRIPTION OF THE DRAWINGS

The foregoing features of the disclosure, as well as the disclosure itself may be more fully understood from the following detailed description of the drawings, in which.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification (and adopted from IEEE Standard 1159-2019) are collected here. Several of these concepts and terms are graphically illustrated in FIG. 1, for example, which highlights the event magnitude and duration for short-duration rms variations, including voltage sags/dips, swells, and brief interruptions (<1 minute). The nominal operating voltage in this figure ranges between ±10% of the nominal rated voltage. It is notable that FIG. 1 does not include all power quality categories such as waveform distortion, imbalance, voltage fluctuations, and power frequency deviations.

As used herein, the term "aperiodic event" is used to describe an electrical event that occurs non-cyclically, arbitrarily or without specific temporal regularity. For the sake of this disclosure, both short-duration root-mean-square (rms) variations and transients are considered to be aperiodic events (i.e., notching is treated as a harmonic phenomenon herein).

As used herein, the term "instantaneous interruption" is used to describe a deviation to 0-10% of the nominal value for a duration of ½ cycle to 30 cycles.

As used herein, the term "momentary interruption" is used to describe a deviation to 0-10% of the nominal value for a duration of 30 cycles to 3 seconds.

As used herein, the term "phase jump" is used to describe the change in voltage phase angle during a voltage sag as compared to the phase angle of the voltage before the voltage sag. It is understood that the term "phase jump" may also be referred to as phase-angle jump, phase shift, or phase jump/shift. Phase jump can be different for each of the three phases in a polyphase system. (IEEE Standard 1409-2012, "IEEE Guide for Application of Power Electronics for Power Quality Improvement on Distribution Systems Rated 1 kV Through 38 kV")

Figure 1:
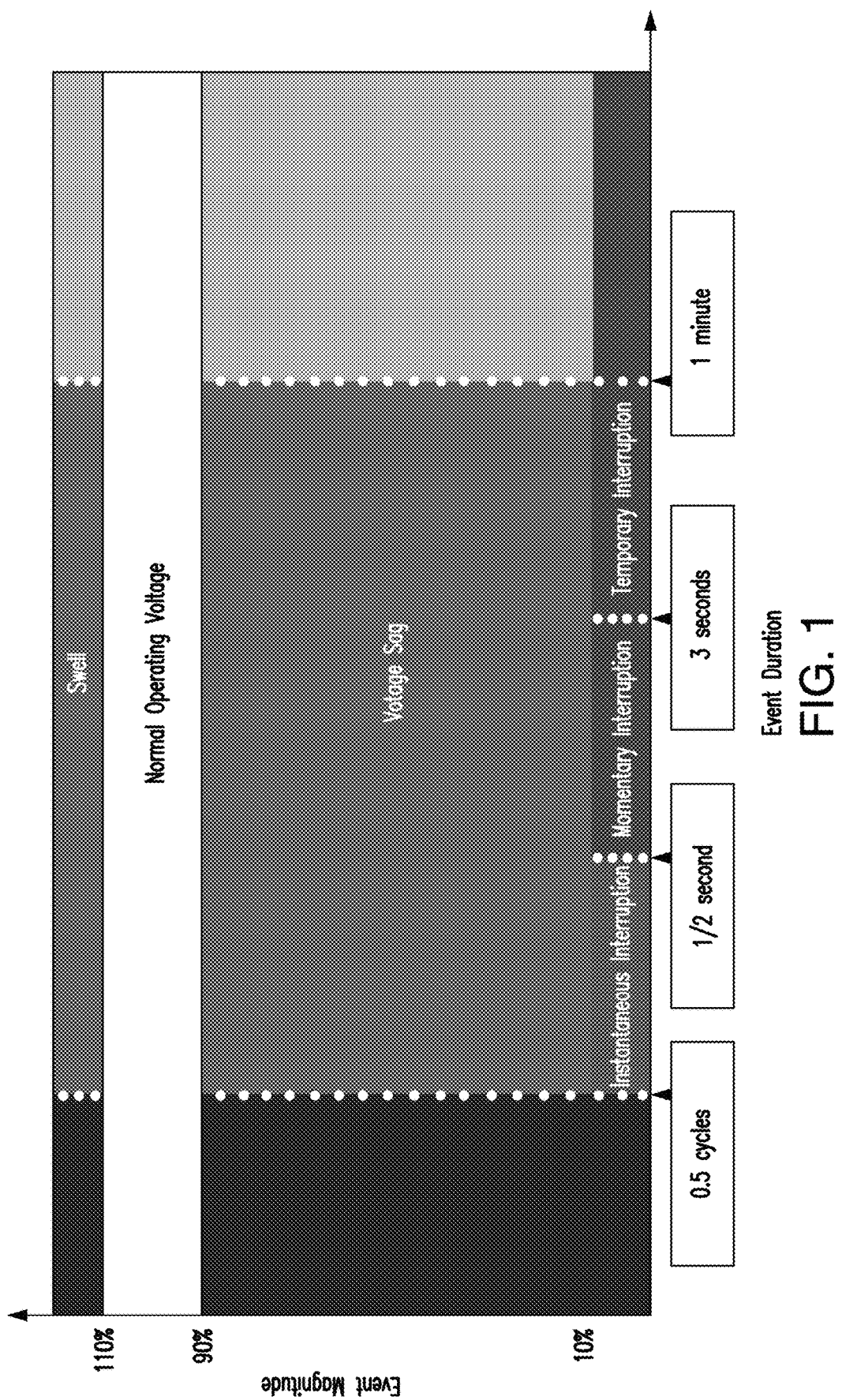
FIG. 1 shows a graphical view of several example power quality categories.

As used herein, the term "sag" (of which a "voltage sag" is one example) is used to describe a deviation to 10-90% of the nominal value, for example, for a duration of ½ cycle to 1 minute, as shown in FIG. 1.

As used herein, the term "short-duration rms variations" is used to describe a deviation from the nominal value with a duration of ½ cycle to 1 minute. Sub-categories of short-duration rms variations include instantaneous interruptions, momentary interruptions, temporary interruptions, sags and swells.

As used herein, the term "swell" is used to describe a deviation greater than 110% of the nominal value, for example, for a duration of ½ cycle to 1 minute, as shown in FIG. 1.

As used herein, the term "temporary interruption" is used to describe a deviation to 0-10% of the nominal value for a duration of 3 seconds to 1 minute.

As used herein, the term "transient" is used to describe a deviation from the nominal value with a duration less than 1 cycle. Sub-categories of transients include impulsive (uni-direction polarity) and oscillatory (bi-directional polarity) transients.

IEEE Standard 1159-2019, as briefly referenced above, lists seven general categories of power quality phenomena. Two of these categories (short-duration rms variations and transients) are considered to be a-periodic (e.g., not regularly occurring). Of these two categories, short-duration rms variations are the most disruptive and have the largest universal economic impact on energy consumers. Short-duration rms variations include voltage sags/dips, swells, instantaneous interruptions, momentary interruptions and temporary interruptions. One study by Electric Power Research Institute (EPRI) estimates an average of 56 voltage sags are experienced by industrial customers each year. As the trend of industries becoming more dependent on sag-sensitive equipment has increased, so has the impact of these events.

It is understood that IEEE Standard 1159-2019 is one standards body's (IEEE in this case) approach to defining/characterizing power quality events. It is understood there are other standards that define power quality categories/events as well, such as the International Electrotechnical Commission (IEC), American National Standards Institute (ANSI), etc., which may have different descriptions or power quality event types, characteristics, and terminology. In some embodiments, power quality events may be customized power quality events (e.g., defined by a user).

Short-duration rms variations, as defined by IEEE Standard 1159-2019 and other sources, may include many sub-categories, including sags, swells, interruptions and so forth. A primary cause of short-duration rms variations are electrical faults, which can originate from:

| | |
|---|---|
| Insulation failure/dielectric breakdowns | Construction incidents |
| Lightning and other overvoltage events | Physical sagging of overhead conductors |
| Conductor aging | Wildlife |
| Poor design | Pollution |
| Inclement weather | Traffic accidents |
| Vegetation | Equipment failure |

A leading source of short-duration rms variations are electrical faults; hence, the need (i.e., codes & standards, safety requirements, manufacturer requirements, protection of equipment, and so forth) to provide protection from system faults. Faults (definition) generally lead to a short circuit condition (define), resulting in significantly reduced impedances, and thus, large current flows (i.e., due to Ohm's law). Depending on the location of a fault within an electrical system, faults can have catastrophic effects on the production and safe operation of a facility. The high current associated with faults produces heat that can damage equipment and insulation, result in system operational issues and affect system stability, lead to voltage sags and interruptions, cause fires, and produce safety hazards.

Rapid changes in the impedance due to electrical fault events can produces very fast deviations in the electrical system's characteristics. For example, the system voltage may abruptly decrease and phase shifts (phase jump) may occur. Significant variations in the voltage's magnitude can adversely impact connected equipment, causing it to trip offline or mis-operate.

All equipment is designed to operate within a prescribed voltage range. For example, a residential microwave oven may have a nominal voltage rating of 120 volts while an electric oven adjacent to the microwave may have a nominal rating of 240 volts. Similarly, industrial equipment may use equipment designed for hundreds of volts (e.g., 120 volts) to thousands of volts (e.g., 4160 volts, 12.47 kV, etc.). As the voltage to a particular piece of equipment deviates from its expected nominal value, the equipment may exhibit a range of problems/issues such as de-energization, erratic operation, or even damage.

Figure 2:
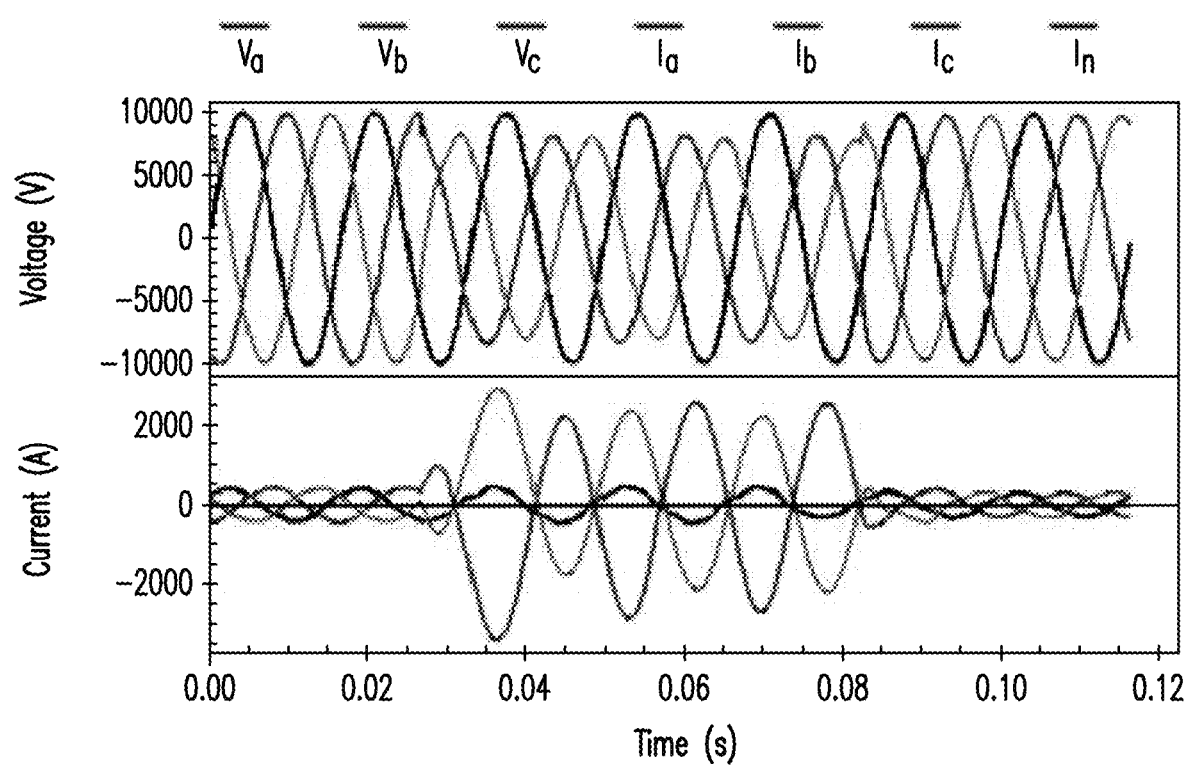
FIG. 2 illustrates an example of a downstream fault on a utility distribution feeder.

By definition, a voltage sag (dip) is an unexpected excursion of the normal operating voltage to 10-90% of the nominal rated voltage lasting less than one minute. FIG. 2 illustrates an example of a downstream fault (here, a phase-to-phase fault) on a utility distribution feeder. As shown in this figure, the downstream fault causes large current flow and a voltage sag/dip on the two phases. The degree of impact this type of event has on an energy consumer's facility is primarily dependent on the four factors:
1. The nature and source of the event,
2. The susceptibility of the load(s) to the event,
3. The event's influence on the process or activity, and
4. The cost sensitivity to this effect.

Consequently, each customer system and operation may respond differently to an electrical perturbation. For example, it is possible for a voltage sag to significantly impact one customer's operation while the same voltage sag may have little or no noticeable impact on another customer's operation. It is also possible for a voltage sag to impact one part of a customer's electrical system (e.g., certain electrical equipment) differently than it does on another part of the same electrical system (e.g., other electrical equipment).

Figure 3:
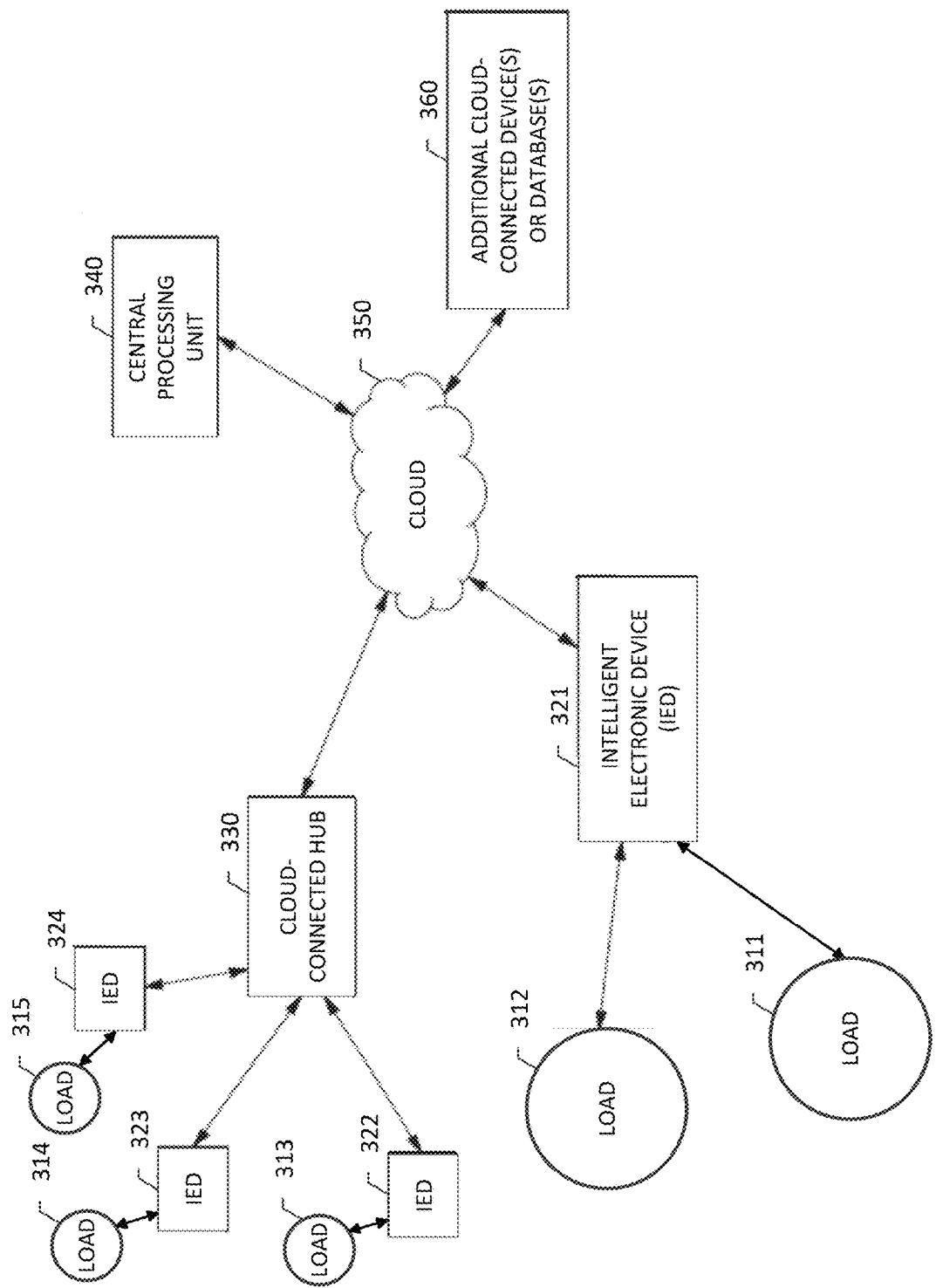
FIG. 3 shows an example electrical system in accordance with embodiments of the disclosure.

Referring to FIG. 3, an example electrical system in accordance with embodiments of the disclosure includes one or more loads (here, loads 311, 312, 313, 314, 315) (also sometimes referred to herein as "equipment" or "apparatuses") and one or more intelligent electronic devices (IEDs) (here, IEDs 321, 322, 323, 324) capable of sampling, sensing or monitoring one or more parameters (e.g., power monitoring parameters) associated with the loads. In embodiments, the loads 311, 312, 313, 314, 315 and IEDs 321, 322, 323, 324 may be installed in one or more buildings or other physical locations or they may be installed on one or more processes and/or loads within a building. The buildings may correspond, for example, to commercial, industrial or institutional buildings.

As shown in FIG. 3, the IEDs 321, 322, 323, 324 are each coupled to one or more of the loads 311, 312, 313, 314, 315 (which may be located "upline" or "downline" from the IEDs in some embodiments). The loads 311, 312, 313, 314, 315 may include, for example, machinery or apparatuses associated with a particular application (e.g., an industrial application), applications, and/or process(es). The machinery may include electrical or electronic equipment, for example. The machinery may also include the controls and/or ancillary equipment associated with the equipment.

In embodiments, the IEDs 321, 322, 323, 324 may monitor and, in some embodiments, analyze parameters (e.g., energy-related parameters) associated with the loads 311, 312, 313, 314, 315 to which they are coupled. The IEDs 321, 322, 323, 324 may also be embedded within the loads 311, 312, 313, 314, 315 in some embodiments. According to various aspects, one or more of the IEDs 321, 322, 323, 324 may be configured to monitor utility feeds, including surge protective devices (SPDs), trip units, active filters, lighting, IT equipment, motors, and/or transformers, which are some examples of loads 311, 312, 313, 314, 315, and the IEDs 321, 322, 323, 324, and may detect ground faults, voltage sags, voltage swells, momentary interruptions and oscillatory transients, as well as fan failure, temperature, arcing faults, phase-to-phase faults, shorted windings, blown fuses, and harmonic distortions, which are some example parameters that may be associated with the loads 311, 312, 313, 314, 315. The IEDs 321, 322, 323, 324 may also monitor devices, such as generators, including input/outputs (I/Os), protective relays, battery chargers, and sensors (for example, water, air, gas, steam, levels, accelerometers, flow rates, pressures, and so forth).

According to another aspect, the IEDs 321, 322, 323, 324 may detect overvoltage and undervoltage conditions (e.g., transient overvoltages), as well as other parameters such as temperature, including ambient temperature. According to a further aspect, the IEDs 321, 322, 323, 324 may provide indications of monitored parameters and detected conditions that can be used to control the loads 311, 312, 313, 314, 315 and other equipment in the electrical system in which the loads 311, 312, 313, 314 and IEDs 321, 322, 323, 324 are installed. A wide variety of other monitoring and/or control functions can be performed by the IEDs 321, 322, 323, 324, and the aspects and embodiments disclosed herein are not limited to IEDs 321, 322, 323, 324 operating according to the above-mentioned examples.

It is understood that the IEDs 321, 322, 323, 324 may take various forms and may each have an associated complexity (or set of functional capabilities and/or features). For example, IED 321 may correspond to a "basic" IED, IED 322 may correspond to an "intermediate" IED, and IED 323 may correspond to an "advanced" IED. In such embodiments, intermediate IED 322 may have more functionality (e.g., energy measurement features and/or capabilities) than basic IED 321, and advanced IED 323 may have more functionality and/or features than intermediate IED 322. For example, in embodiments IED 321 (e.g., an IED with basic capabilities and/or features) may be capable of monitoring instantaneous voltage, current energy, demand, power factor, averages values, maximum values, instantaneous power, and/or long-duration rms variations, and IED 323 (e.g., an IED with advanced capabilities) may be capable of monitoring additional parameters such as voltage transients, voltage fluctuations, frequency slew rates, harmonic power flows, and discrete harmonic components, all at higher sample rates, etc. It is understood that this example is for illustrative purposes only, and likewise in some embodiments an IED with basic capabilities may be capable of monitoring one or more of the above energy measurement parameters that are indicated as being associated with an IED with advanced capabilities. It is also understood that in some embodiments the IEDs 321, 322, 323, 324 each have independent functionality.

In the example embodiment shown, the IEDs 321, 322, 323, 324 are communicatively coupled to a central processing unit 340 via the "cloud" 350. In some embodiments, the IEDs 321, 322, 323, 324 may be directly communicatively coupled to the cloud 350, as IED 321 is in the illustrated embodiment. In other embodiments, the IEDs 321, 322, 323, 324 may be indirectly communicatively coupled to the cloud 350, for example, through an intermediate device, such as a cloud-connected hub 330 (or a gateway), as IEDs 322, 323, 324 are in the illustrated embodiment. The cloud-connected hub 330 (or the gateway) may, for example, provide the IEDs 322, 323, 324 with access to the cloud 350 and the central processing unit 340.

As used herein, the terms "cloud" and "cloud computing" are intended to refer to computing resources connected to the Internet or otherwise accessible to IEDs 321, 322, 323, 324 via a communication network, which may be a wired or wireless network, or a combination of both. The computing resources comprising the cloud 350 may be centralized in a single location, distributed throughout multiple locations, or a combination of both. A cloud computing system may divide computing tasks amongst multiple racks, blades, processors, cores, controllers, nodes or other computational units in accordance with a particular cloud system architecture or programming. Similarly, a cloud computing system may store instructions and computational information in a centralized memory or storage, or may distribute such information amongst multiple storage or memory components. The cloud system may store multiple copies of instructions and computational information in redundant storage units, such as a RAID array.

The central processing unit 340 may be an example of a cloud computing system, or cloud-connected computing system. In embodiments, the central processing unit 340 may be a server located within buildings in which the loads 311, 312, 313, 314, 315, and the IEDs 321, 322, 323, 324 are installed, or may be remotely-located cloud-based service. The central processing unit 340 may include computing functional components similar to those of the IEDs 321, 322, 323, 324 is some embodiments, but may generally possess greater numbers and/or more powerful versions of components involved in data processing, such as processors, memory, storage, interconnection mechanisms, etc. The central processing unit 340 can be configured to implement a variety of analysis techniques to identify patterns in received measurement data from the IEDs 321, 322, 323, 324, as discussed further below. The various analysis techniques discussed herein further involve the execution of one or more software functions, algorithms, instructions, applications, and parameters, which are stored on one or more sources of memory communicatively coupled to the central processing unit 340. In certain embodiments, the terms "function", "algorithm", "instruction", "application", or "parameter" may also refer to a hierarchy of functions, algorithms, instructions, applications, or parameters, respectively, operating in parallel and/or tandem (series). A hierarchy may comprise a tree-based hierarchy, such a binary tree, a tree having one or more child nodes descending from each parent node, or combinations thereof, wherein each node represents a specific function, algorithm, instruction, application, or parameter.

In embodiments, since the central processing unit 340 is connected to the cloud 350, it may access additional cloud-connected devices or databases 360 via the cloud 350. For example, the central processing unit 340 may access the Internet and receive information such as weather data, utility pricing data, or other data that may be useful in analyzing the measurement data received from the IEDs 321, 322, 323, 324. In embodiments, the cloud-connected devices or databases 360 may correspond to a device or database associated with one or more external data sources. Additionally, in embodiments, the cloud-connected devices or databases 360 may correspond to a user device from which a user may provide user input data. A user may view information about the IEDs 321, 322, 323, 324 (e.g., IED makes, models, types, etc.) and data collected by the IEDs 321, 322, 323, 324 (e.g., energy usage statistics) using the user device. Additionally, in embodiments the user may configure the IEDs 321, 322, 323, 324 using the user device.

In embodiments, by leveraging the cloud-connectivity and enhanced computing resources of the central processing unit 340 relative to the IEDs 321, 322, 323, 324, sophisticated analysis can be performed on data retrieved from one or more IEDs 321, 322, 323, 324, as well as on the additional sources of data discussed above, when appropriate. This analysis can be used to dynamically control one or more parameters, processes, conditions or equipment (e.g., loads) associated with the electrical system. As noted in the Summary Section of this disclosure, for example, it is understood that the term "loads" as used herein may refer to any source, any component, any element and any process.

In embodiments, the parameters, processes, conditions or equipment are dynamically controlled by a control system associated with the electrical system. In embodiments, the control system may correspond to or include one or more of the IEDs 321, 322, 323, 324 in the electrical system, central processing unit 340 and/or other devices within or external to the electrical system.

Figure 3A:
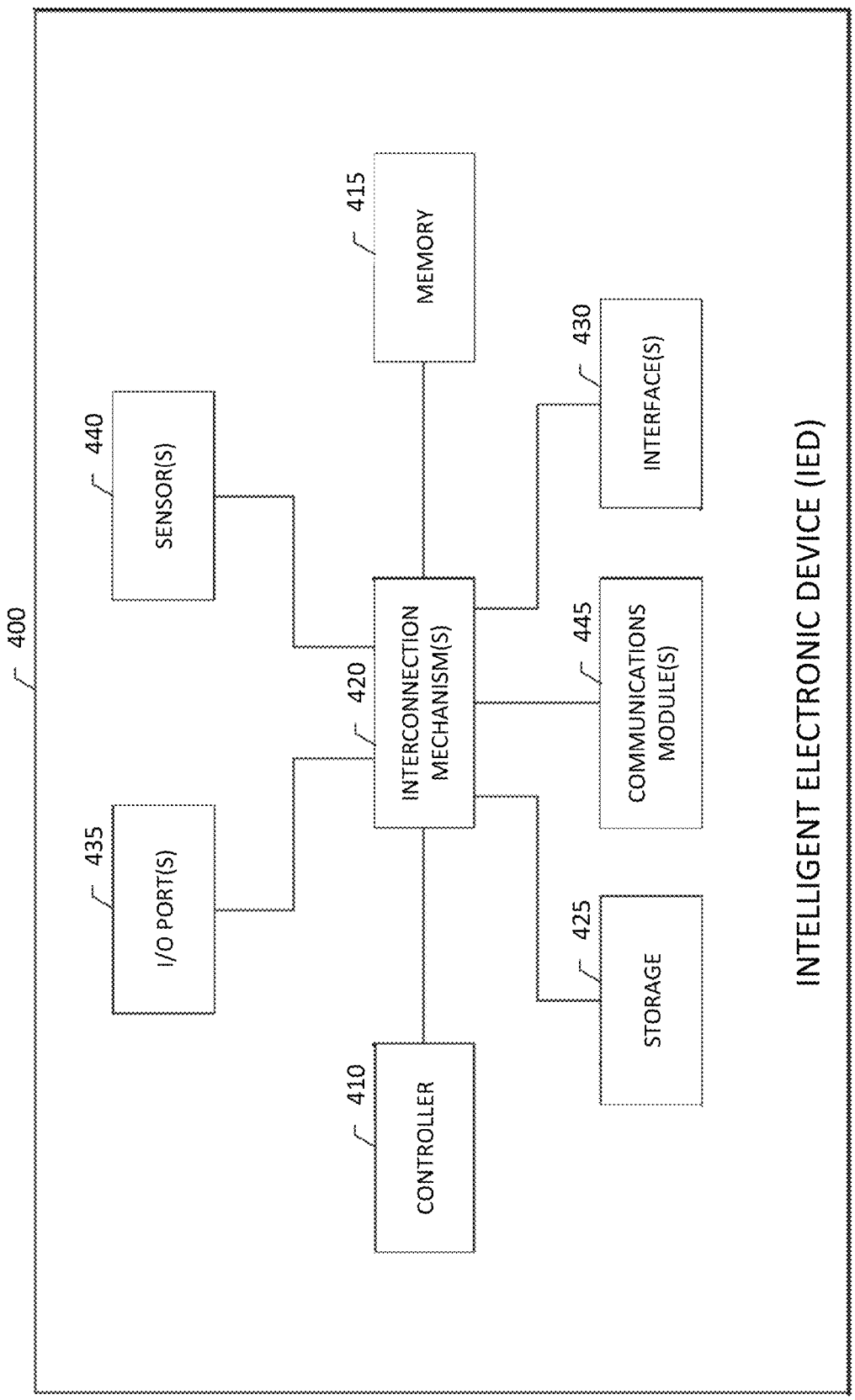
FIG. 3A shows an example Intelligent Electronic Device (IED) that may be used in an electrical system in accordance with embodiments of the disclosure.

Referring to FIG. 3A, an example IED 400 that may be suitable for use in the electrical system shown in FIG. 3, for example, includes a controller 410, a memory device 415, storage 425, and an interface 430. The IED 400 also includes an input-output (I/O) port 435, a sensor 440, a communication module 445, and an interconnection mechanism 420 for communicatively coupling two or more IED components 410-445.

The memory device 415 may include volatile memory, such as DRAM or SRAM, for example. The memory device 415 may store programs and data collected during operation of the IED 400. For example, in embodiments in which the IED 300 is configured to monitor or measure one or more electrical parameters associated with one or more loads (e.g., 311, shown in FIG. 3) in an electrical system, the memory device 415 may store the monitored electrical parameters.

The storage system 425 may include a computer readable and writeable nonvolatile recording medium, such as a disk or flash memory, in which signals are stored that define a program to be executed by the controller 410 or information to be processed by the program. The controller 410 may control transfer of data between the storage system 425 and the memory device 415 in accordance with known computing and data transfer mechanisms. In embodiments, the electrical parameters monitored or measured by the IED 400 may be stored in the storage system 425.

The I/O port 435 can be used to couple loads to the IED 400, and the sensor 440 can be used to monitor or measure the electrical parameters associated with the loads. The I/O port 435 can also be used to coupled external devices, such as sensor devices (e.g., temperature and/or motion sensor devices) and/or user input devices (e.g., local or remote computing devices) (not shown), to the IED 400. The external devices may be local or remote devices, for example, a gateway (or gateways). The I/O port 435 may further be coupled to one or more user input/output mechanisms, such as buttons, displays, acoustic devices, etc., to provide alerts (e.g., to display a visual alert, such as text and/or a steady or flashing light, or to provide an audio alert, such as a beep or prolonged sound) and/or to allow user interaction with the IED 400.

The communication module 445 may be configured to couple the IED 400 to one or more external communication networks or devices. These networks may be private networks within a building in which the IED 400 is installed, or public networks, such as the Internet. In embodiments, the communication module 445 may also be configured to couple the IED 400 to a cloud-connected hub (e.g., 330, shown in FIG. 3), or to a cloud-connected central processing unit (e.g., 340, shown in FIG. 3), associated with an electrical system including IED 400.

The IED controller 410 may include one or more processors that are configured to perform specified function(s) of the IED 400. The processor(s) can be a commercially available processor, such as the well-known Pentium™, Core™, or Atom™ class processors available from the Intel Corporation. Many other processors are available, including programmable logic controllers. The IED controller 410 can execute an operating system to define a computing platform on which application(s) associated with the IED 400 can run.

In embodiments, the electrical parameters monitored or measured by the IED 400 may be received at an input of the controller 410 as IED input data, and the controller 410 may process the measured electrical parameters to generate IED output data or signals at an output thereof. In embodiments, the IED output data or signals may correspond to an output of the IED 400. The IED output data or signals may be provided at I/O port(s) 435, for example. In embodiments, the IED output data or signals may be received by a cloud-connected central processing unit, for example, for further processing (e.g., to monitoring energy-related data in an electrical system, as will be discussed further below), and/or by equipment (e.g., loads) to which the IED is coupled (e.g., for controlling one or more parameters associated with the equipment, as will be discussed further below). In one example, the IED 400 may include an interface 430 for displaying visualizations indicative of the IED output data or signals. The interface 430 may correspond to a graphical user interface (GUI) in embodiments.

Components of the IED 400 may be coupled together by the interconnection mechanism 420, which may include one or more busses, wiring, or other electrical connection apparatus. The interconnection mechanism 420 may enable communications (e.g., data, instructions, etc.) to be exchanged between system components of the IED 400.

It is understood that IED 400 is but one of many potential configurations of IEDs in accordance with various aspects of the disclosure. For example, IEDs in accordance with embodiments of the disclosure may include more (or fewer) components than IED 400. Additionally, in embodiments one or more components of IED 400 may be combined. For example, in embodiments memory 415 and storage 425 may be combined.

Figure 3B:
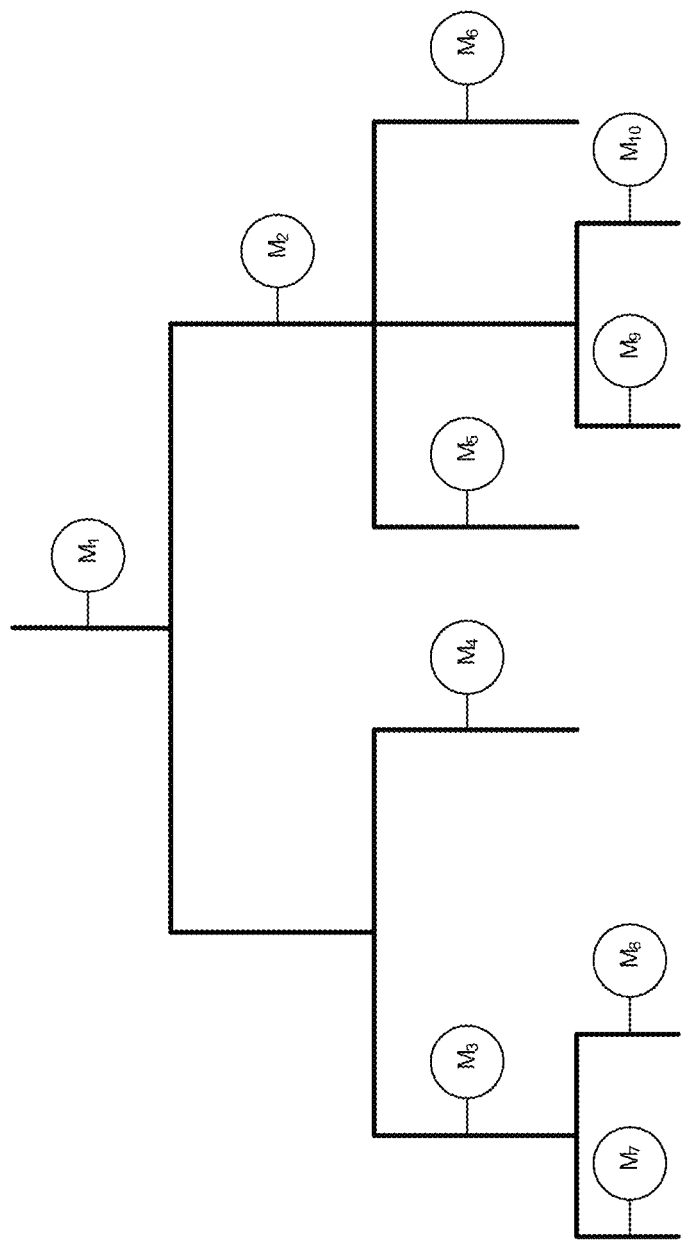
FIG. 3B shows an example configuration of IEDs in accordance with embodiments of the disclosure.

Referring to FIG. 3B, an example configuration (e.g., a hierarchical configuration) of IEDs such as IED 400 in an electrical system is shown. As discussed above, an electrical system typically includes one or more metering points or locations. As also discussed above, one or more IEDs may be installed or located (temporarily or permanently) at the metering locations, for example, to measure, protect and/or control a load or loads in the electrical system.

The illustrated electrical system includes a plurality of metering locations (here, $M_1$, $M_2$, $M_3$, etc.). In embodiments in which the electrical system is a "completely metered" system, for example, at least one IED is installed at the first metering location $M_1$, at least one IED is installed at the second metering location $M_2$, and so forth. Connection 1 is a physical point in the electrical system where energy flow (as measured at $M_1$ by the at least one IED installed at $M_1$) diverges to provide energy to the left electrical system branch (associated with metering locations $M_3$, $M_4$, $M_7$, $M_8$) and the right electrical system branch (associated with metering locations $M_2$, $M_5$, $M_6$, $M_9$, $M_{10}$). In accordance with some embodiments of this disclosure, as will be discussed further below, the IEDs installed at the various metering locations (here, $M_1$, $M_2$, $M_3$, etc.) may share electrical measurement data from or derived from energy-related signals captured by or derived from the IEDs. The shared electrical measurement data may be used, for example, to identify power events in the electrical system, and to identify alarms triggered in response to the identified power events. For example, IEDs installed at metering locations $M_7$, $M_8$ may share electrical measurement data with an IED installed at metering location $M_3$ to identify power events at metering location $M_3$, and to identify alarms triggered in response to the identified power events at metering location $M_3$.

In the illustrated example, the IED installed at metering location $M_3$ is considered to be "upstream" from the IEDs installed at metering locations $M_7$, $M_8$. Additionally, in the illustrated example, the IEDs installed at metering locations $M_7$, $M_8$ are considered to be downstream relative to the IED installed at metering location $M_3$. As used herein, the terms "upstream" and "downstream" are used to refer to electrical locations within an electrical system. More particularly, the electrical locations "upstream" and "downstream" are relative to an electrical location of an IED collecting data and providing this information. For example, in an electrical system including a plurality of IEDs, one or more IEDs may be positioned (or installed) at an electrical location that is upstream relative to one or more other IEDs in the electrical system, and the one or more IEDs may be positioned (or installed) at an electrical location that is downstream relative to one or more further IEDs in the electrical system. A first IED or load that is positioned on an electrical circuit upstream from a second IED or load may, for example, be positioned electrically closer to an input or source of the electrical system (e.g., a utility feed) than the second IED or load. Conversely, a first IED or load that is positioned on an electrical circuit downstream from a second IED or load may be positioned electrically closer to an end or terminus of the electrical system than the other IED. The above-described first and second IEDs can record an electrical event's voltage and current phase information (e.g., by sampling the respective signals) and communicatively transmit this information to a diagnostic computing system and/or a control system, for example. The diagnostic computing system and/or a control system may then analyze the voltage and current phase information (e.g., instantaneous, root-mean-square (rms), waveforms and/or other electrical characteristics) to determine if the source of the voltage event was electrically upstream or downstream from where the first and/or second IEDs are electrically coupled to the electrical system (or network), for example, to determine a direction of a power event (i.e., upstream or downstream).

It is understood that the above-discussed configuration or arrangement of IEDs is but one of many potential configurations of IEDs in an electrical system.

In order to accurately describe aperiodic events such as voltage sags in an electrical system, it is important to measure the voltage signals associated with the event (e.g., using one or more IEDs). Two attributes often used to characterize voltage sags and transients are magnitude (deviation from the norm) and duration (length in time) of the event. Both parameters are instrumental in defining, and thus, mitigating these types of power quality issues. Scatter plots of the magnitude (y-axis) and corresponding duration (x-axis) of an event are shown in a single graph called a "Magnitude-Duration" plot or a Tolerance Curve.

Figure 4:
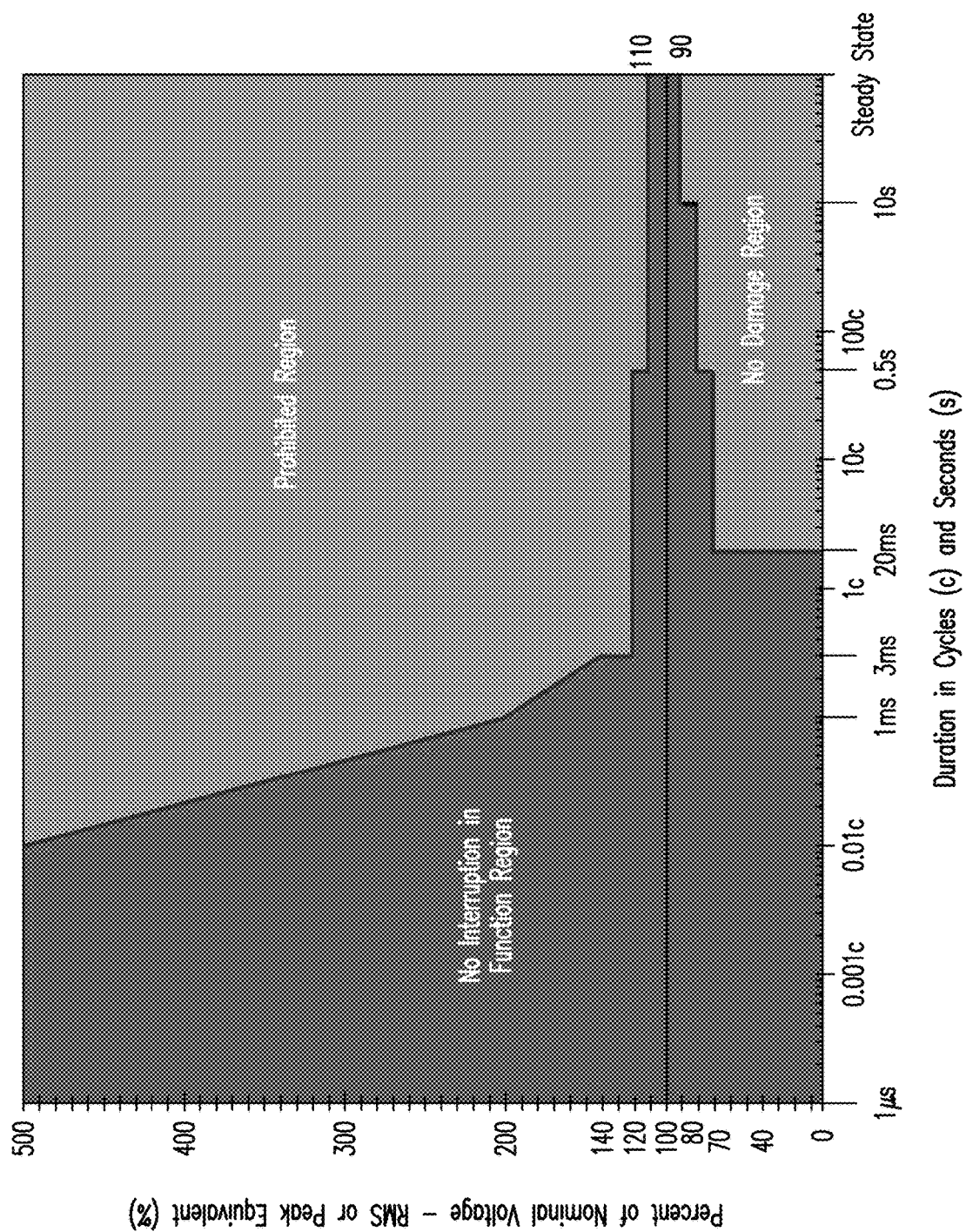
FIG. 4 shows an example Information Technology Industry (ITI) curve (also sometimes referred to as an ITIC curve, CBEMA curve, or a "power acceptability curve")

FIG. 4 illustrates a well-known Magnitude-Duration plot: the ITI Curve (often referred to as the ITIC curve or CBEMA Curve). The ITIC Curve (line separating the "Prohibited Region" from the "No Interruption in Function Region", and line separating the "No Interruption in Function Region" from the "No Damage Region") describes "an AC input voltage envelope which typically can be tolerated (no interruption in function) by most Information Technology Equipment (ITE)," and is "applicable to 120V nominal voltages obtained from 120V, 208Y/120V, and 120/240V 60 Hertz systems." The "Prohibited Region" in the graph "includes any surge or swell which exceeds the upper limit of the envelope. Events occurring in this region may result in damage to ITE. The "No Damage Region" includes sags or interruptions (i.e., below the lower limit of the envelope) that are not expected to damage ITE. Finally, the "No Interruption in Function Region" describes the area between the ITIC Curve where sags, swells, interruptions and transients can normally be tolerated by most ITE.

Tolerance curves such as the ITIC are useful for comparing voltage event characteristics from multiple events, specifying ride-through characteristics of ITE, and identifying persistent issues; however, they have several important limitations to note:
1. It is a static/fixed envelope/curve,
2. It is proposed for Information Technology Equipment (ITE),
3. It is intended for 120V 60 Hz electrical systems,
4. It is a standardized/generic graph describing what "normally" should be expected,
5. It inherently provides no information regarding the consequences of an event,
6. It is solely a voltage-based graph, and does not consider any other electrical parameter(s), and
7. It is presented on a semi-log graph for multiplicative efficiency.

In short, tolerance curves have their uses, but they are generalized recommendations for specific applications at explicit voltage levels. They do not indicate how a specific system or piece of equipment will actually respond to a sag/swell event, what the event's impact will be to the electrical system, or how and where to economically mitigate the issues. Furthermore, various zones (subsets) within the electrical system are treated the same, even though each metering device typically monitors a unique load or combination of loads. An effective analogy is a road atlas: while the atlas illustrates the location of the road, it does not indicate the location of road hazards, expected gas mileage, condition of the vehicle, speed traps, and so forth. A better approach is required to evaluate voltage events (and other power quality issues/events).

As noted in the Summary section of this disclosure, several example techniques for evaluating electrical phasors to identify, assess and mitigate selected power quality issues are provided herein. A first example technique, which provides a new approach for evaluating voltage events, is discussed immediately beneath this paragraph. Additionally, a second example technique, which relates to phasor analysis for transient overvoltage events, is discussed in more detail later on in this disclosure. Further example techniques (e.g., using features from or derived from the first and/or second example techniques) will be apparent to one of ordinary skill in the art.

Technique 1: A New Approach to Evaluating Voltage Events

Helping energy consumers recognize the need for power quality (PQ) mitigation equipment can be difficult due to the complexity of the topic, the difficulty of quantifying PQ issues, and the fact that energy consumers often defer addressing an unknown. Once an energy consumer selects and installs a product, it is important to ensure it performs as expected/intended. The selection criteria for voltage sag mitigation equipment often focuses on the number and/or magnitude/depth of voltage sag events and/or respective durations.

This invention quantifies both the impact and complexity of voltage events, ensures customers purchase the optimal-sized (not undersized as is often the case) mitigative device (or equipment) for their facility, analyzes and helps energy consumers understand in advance the response of any specific mitigation device (or equipment) models (including competitive models) to voltage events based on the electric power monitoring system's (EPMS) data, and allows energy consumers to validate the mitigative device (or equipment) performance after purchasing said mitigative device (or equipment). This invention drives pull-through sales, enhances lead generation, promotes expertise in the field of PQ fosters stronger customer ties/relationships, and strengthens the reputation for relevant energy-related innovation in the industry.

Mitigation devices (or equipment such as DVRs, etc.) are often large investments for energy consumers, but can improve uptime/reliability and power quality for the energy consumer's operation. This invention helps analyze waveform captures (which are not intuitive to most energy consumers) from PQ events to simplify and improve identifying opportunities to integrate these types of mitigative products. It facilitates understandable reports (to support Edge and Cloud), simplifies explanations and needs-based recognition for both PQ mitigation equipment and metering IEDs, and ensures the consequences of purchasing this often-expensive equipment is more predictable.

There are many new benefits for this invention, including:
An algorithm that provides an automatic evaluation of anomalous voltage events from waveform captures, analyzes voltage sag magnitude, duration and phase jump impacts, plots event characteristics of impactful events, and provides cost-effective mitigation recommendations to resolve operational impact.
Novel scatter-plot approach overlays multiple mitigative solutions onto a single graph to clearly illustrate both effects and best solutions for customers.
Automatic accounting for voltage AND phase impact.
Straightforward lead generation tool that is easily comprehensible for technical and non-technical users.
Stronger sales reports for mitigation opportunities generated by integrating event impact information.
Deployable on Device/Edge/Cloud.
Facilitates M&V performance to allow users to easily quantify impact and ROI/event after solution is deployed.
Additional features/metrics can be integrated (e.g., fault characteristics, etc.), system aggregation, etc.

Mid/high-end metering devices have had the ability to capture short-duration rms variations such as voltage sags/dips for decades. These devices typically provide a time-series image of voltage perturbations (e.g., sags/dips) that include all metered voltage and current phases. Unfortunately, analyzing waveform captures without experience and training is complicated, akin to a radiologist analyzing an MRI or CT-Scan. In fact, many power systems engineers are unable to diagnose waveform captures without years of experience.

When analyzing voltage events, there are several questions to be answered including:
What type of voltage event was it?
How long did the voltage event last?
Was the source of the voltage event internal or external (e.g., inside the facility/outside on the utility)?
Where was the location of the voltage event's source?
How much of my system was affected by the voltage event?
What caused the voltage event?
Is this voltage event a reoccurring issue?
and most importantly . . . was my operation impacted?

Figure 5:
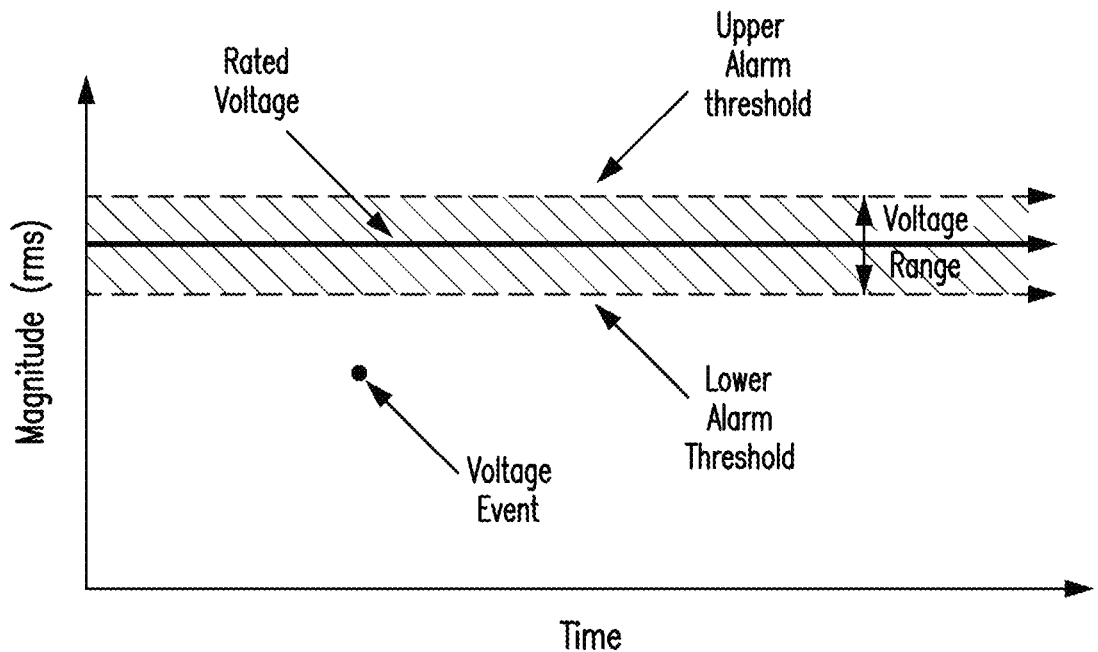
FIG. 5 shows example root mean square (rms) alarm thresholds in accordance with embodiments of the disclosure.

If configured properly, a capable metering device will provide an "alarm" (i.e., indication) when the voltage measurement on at least one phase deviates outside of a predefined magnitude range for a predefined duration. FIG. 5 illustrates the normal voltage range (shaded area) that is bounded by an upper and lower alarm threshold. The rated or nominal voltage is also shown. For example, when the measured voltage level goes below the lower alarm threshold (e.g., see the voltage event shown in FIG. 5), an alarm will be initiated by the metering device.

The event alarm data typically includes information such as worst magnitude of the event, duration of the event, start time and date of the event, alarm type, and (depending on the device) a waveform capture of the three-phase voltages and currents during the event. Each of these event parameters provide important clues to troubleshoot the voltage event and answer the questions listed above. However, one very important question is not directly addressed: Did the voltage event impact the load? To determine whether or not the voltage event resulted in a load impact, a more thorough analysis of the waveform capture must be performed.

Example 1: Load Loss

Figure 6:
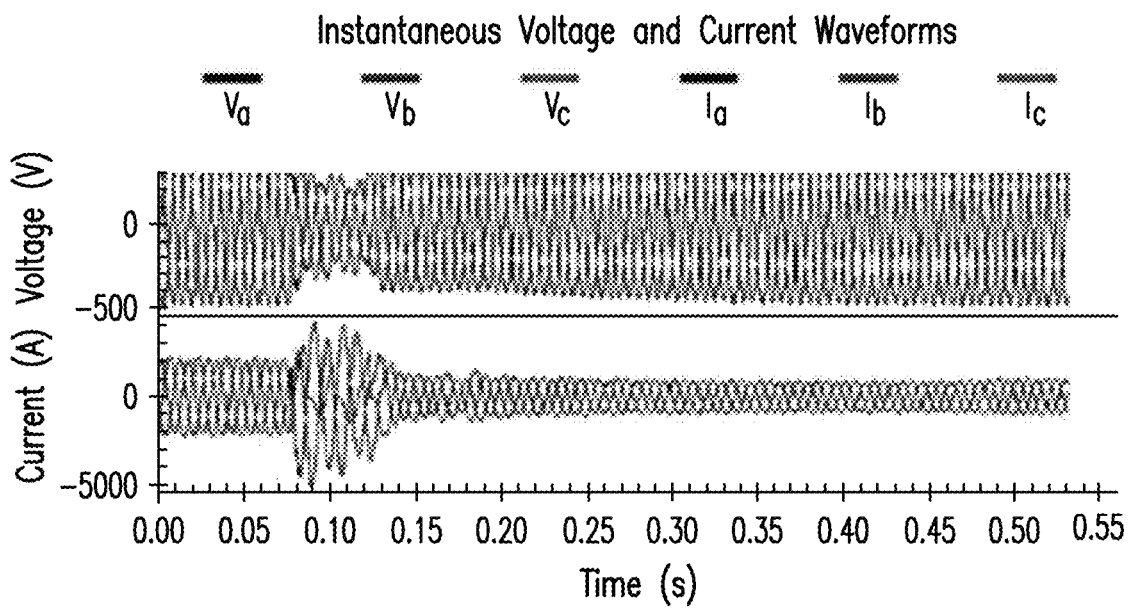
FIG. 6 shows an example instantaneous waveform capture of an illustrative voltage event in accordance with embodiments of the disclosure.
Figure 7:
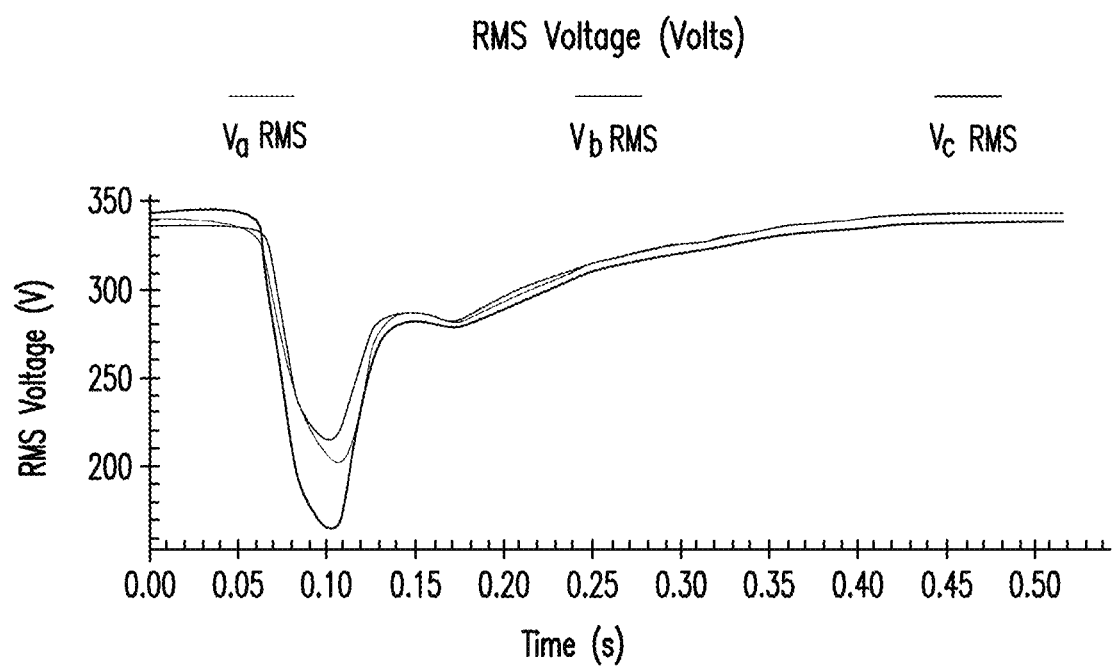
FIG. 7 shows example rms voltage for the illustrative voltage event of FIG. 6 in accordance with embodiments of the disclosure.
Figure 8:
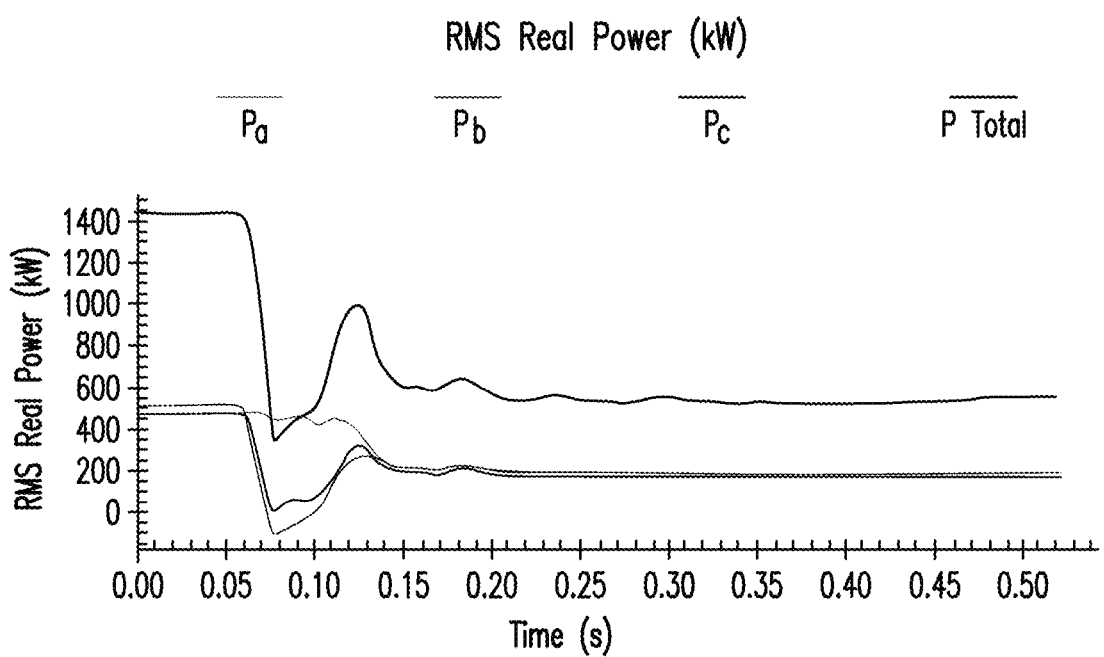
FIG. 8 shows example rms real power for the illustrative voltage event of FIG. 6 in accordance with embodiments of the disclosure.

FIGS. 6-8 illustrate a voltage sag event on a three-phase, 60 Hertz, 347/600-volt wye-configured system. The event shown in this example appears to have been caused by an upstream fault. FIGS. 7 and 8 are derived from the event waveform data captured in FIG. 6. The voltage event lasted approximately 11 cycles (or about 180 milliseconds) in duration, and the worst-case voltage deviation during the event was approximately 53% of the nominal voltage (or 184 volts) on Phase C as shown in FIG. 7 (rms voltage).

FIG. 8 illustrates the rms real power data throughout the voltage event, and is the data with the most relevance for troubleshooting the event's impact. Before the event began (pre-event), the total real power consumed by the downstream load(s) was approximately 1,458 kW. The voltage event began when t≈0.07 seconds, and is assumed to have concluded once the voltage recovered to its normal operating range (t≈0.26 seconds). Upon the conclusion of the event (i.e., post-event), the total real power consumed by the downstream load(s) was approximately 544 kW. Therefore, the pre-event versus post-event total power flow to the load(s) decreased by about 914 kW (or 63%) as a result of the voltage sag event. The conclusion is the voltage event caused 914 kW (or 63%) of load to de-energize (drop offline), likely resulting in a significant impact to the facility's operation. A negative load change between 0 and –100% that is coincident with a voltage event generally indicates the voltage event was responsible for the load loss. An investigation should be performed to identify the root cause of this event and take the appropriate steps to mitigate future occurrences (if possible).

Example 2: Load Gain

Figure 9:
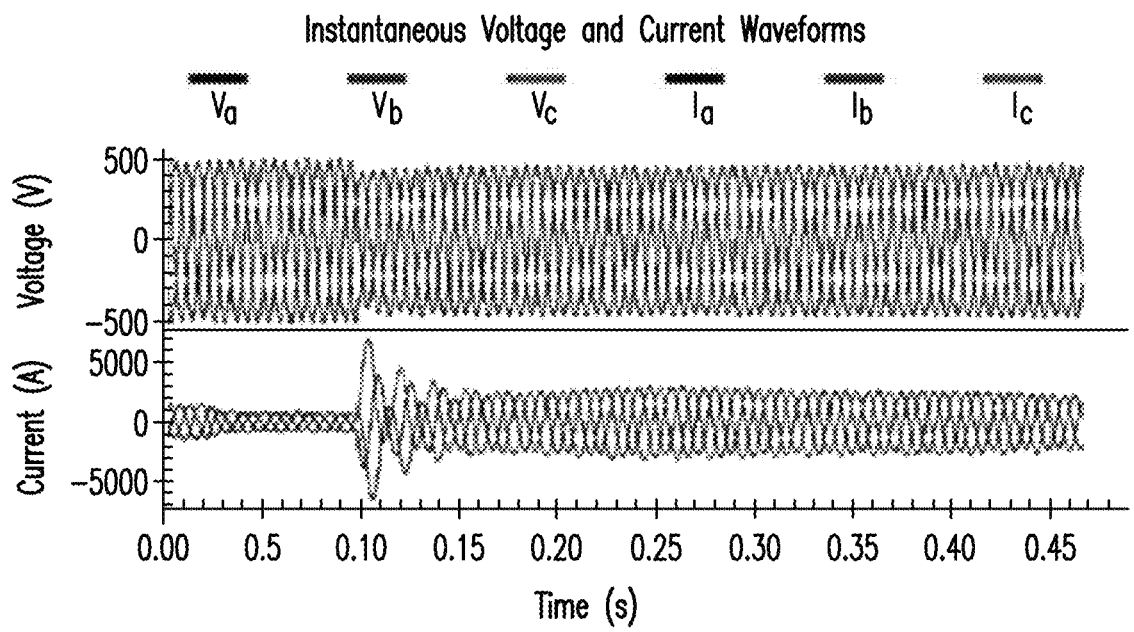
FIG. 9 shows an example instantaneous waveform capture of another illustrative voltage event in accordance with embodiments of the disclosure.
Figure 10:
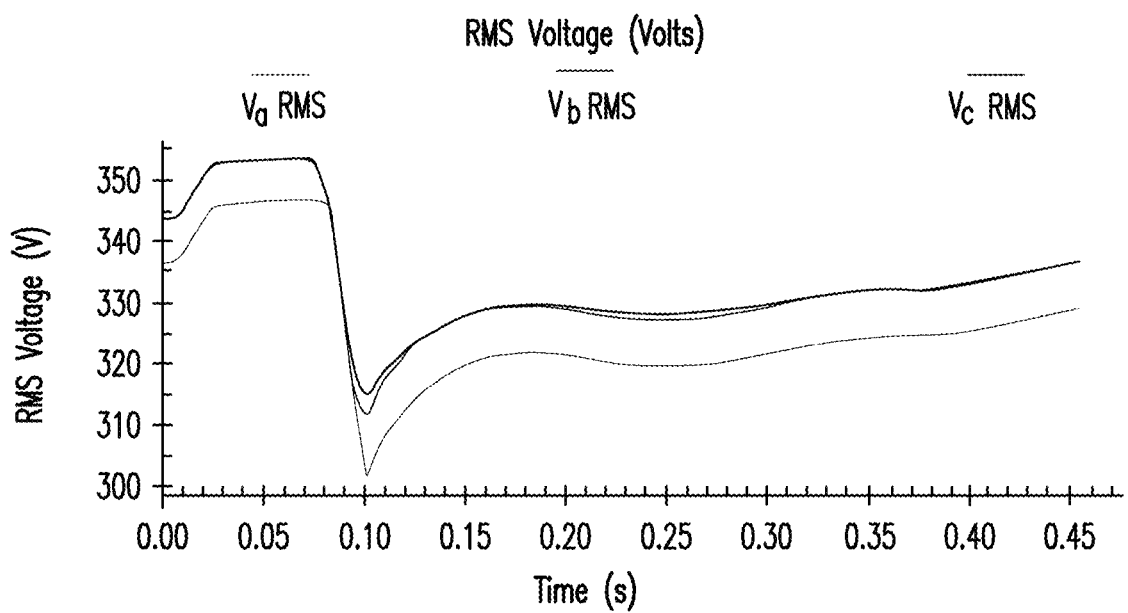
FIG. 10 shows example rms voltage for the illustrative voltage event of FIG. 9 in accordance with embodiments of the disclosure.
Figure 11:
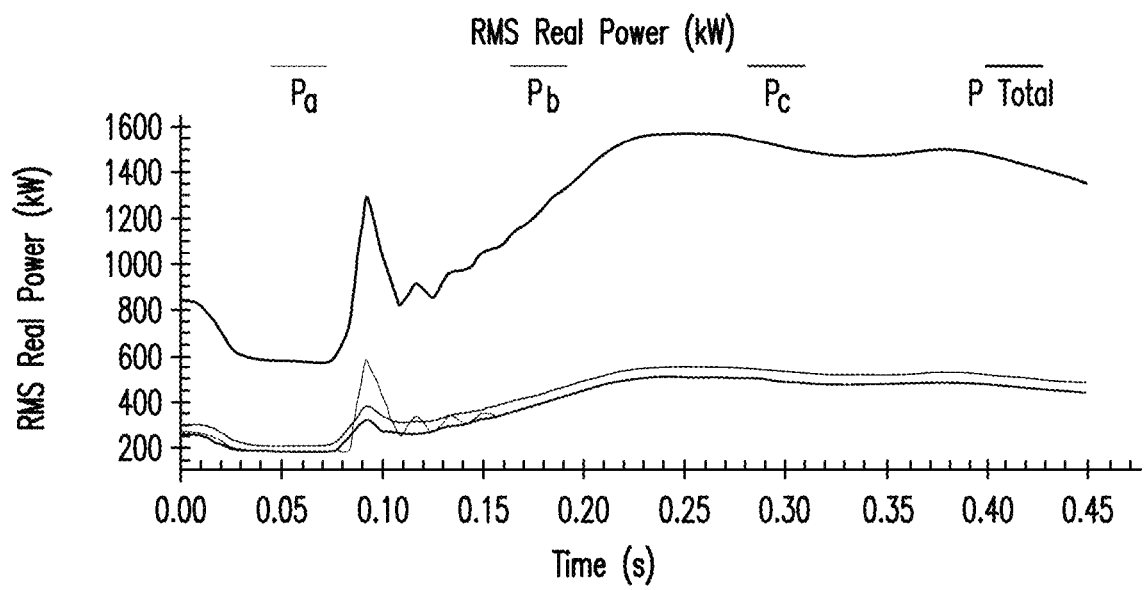
FIG. 11 shows example rms real power for the illustrative voltage event of FIG. 9 in accordance with embodiments of the disclosure.

FIGS. 9-11 illustrate a voltage sag event on the same electrical system described in Example 1. The event shown in these figures was caused by the energization of a downstream three-phase load. FIGS. 10 and 11 are derived from the event waveform data captured in FIG. 9. The voltage event lasted approximately 1 cycle (or about 16 milliseconds) in duration, and the worst-case voltage deviation during the event was approximately 87% of the nominal voltage (or 301 volts) on Phase A as shown in FIG. 10 (rms voltage).

FIG. 11 illustrates the rms real power data throughout the voltage event, and again is the data with the most relevance for troubleshooting the event's impact. Before the event began (pre-event), the total real power consumed by the downstream load(s) was approximately 837 kW. The voltage event began when t≈0.10 seconds, and is assumed to have concluded once the voltage recovered to its normal operating range (t≈0.12 seconds). Upon the conclusion of the event (i.e., post-event), the total real power consumed by the downstream load(s) was approximately 1,345 kW. Therefore, the pre-event versus post-event total power flow to the load(s) increased by roughly 508 kW (or 61%) as a result of the voltage sag event. For this example, the voltage sag event was coincident with an increase of 508 kW (or 61%) in the total load, and should not have impacted the facility's operation. A positive load change that is coincident with a voltage event generally indicates the voltage event was produced by energizing a significant load(s). While voltage sags/dips often correlate with the energization of a load(s), an investigation should still be performed to ensure: 1) the voltage deviation isn't excessive, 2) there are no overlooked load impacts due to the voltage sag/dip, and 3) the metering device's alarm thresholds are set appropriately.

Example 3: Load Reversal

Figure 12:
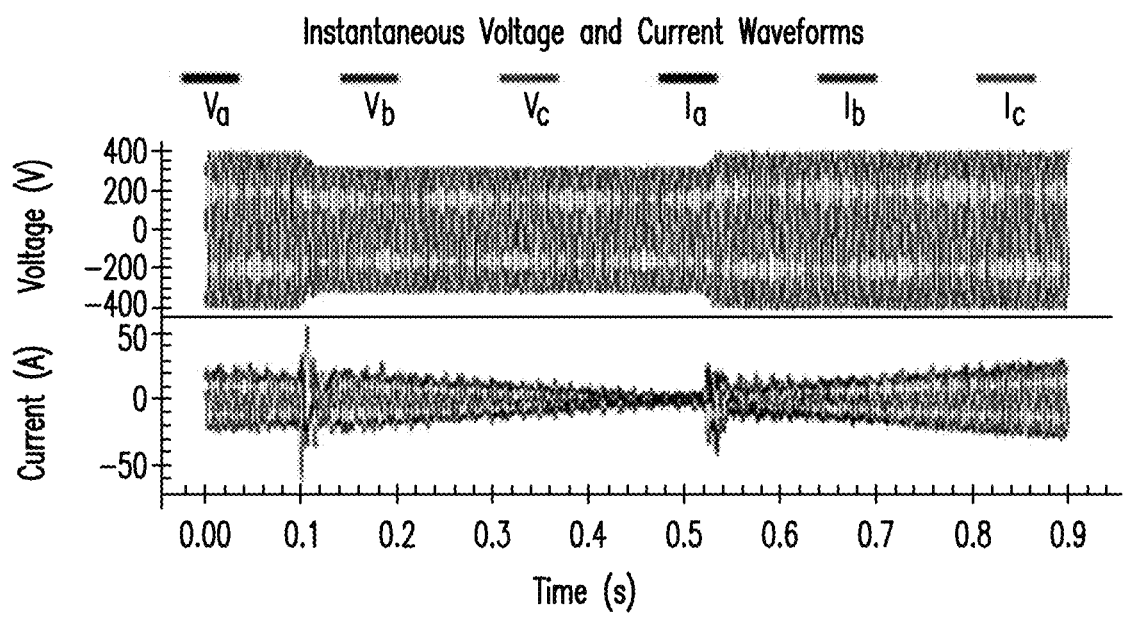
FIG. 12 shows an example instantaneous waveform capture of another illustrative voltage event in accordance with embodiments of the disclosure.
Figure 13:
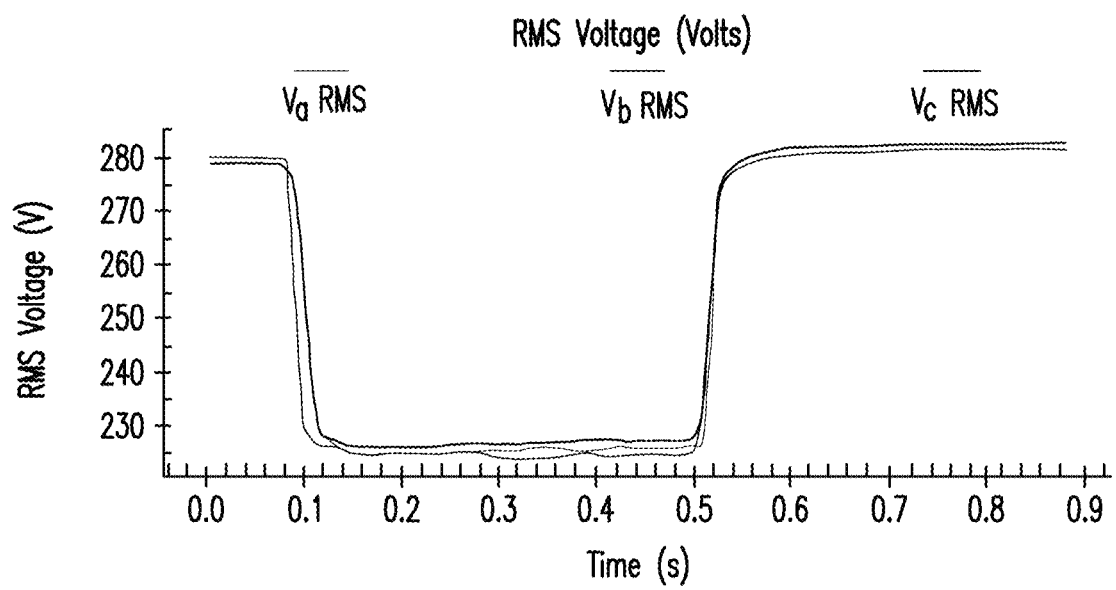
FIG. 13 shows example rms voltage for the illustrative voltage event of FIG. 12 in accordance with embodiments of the disclosure.
Figure 14:
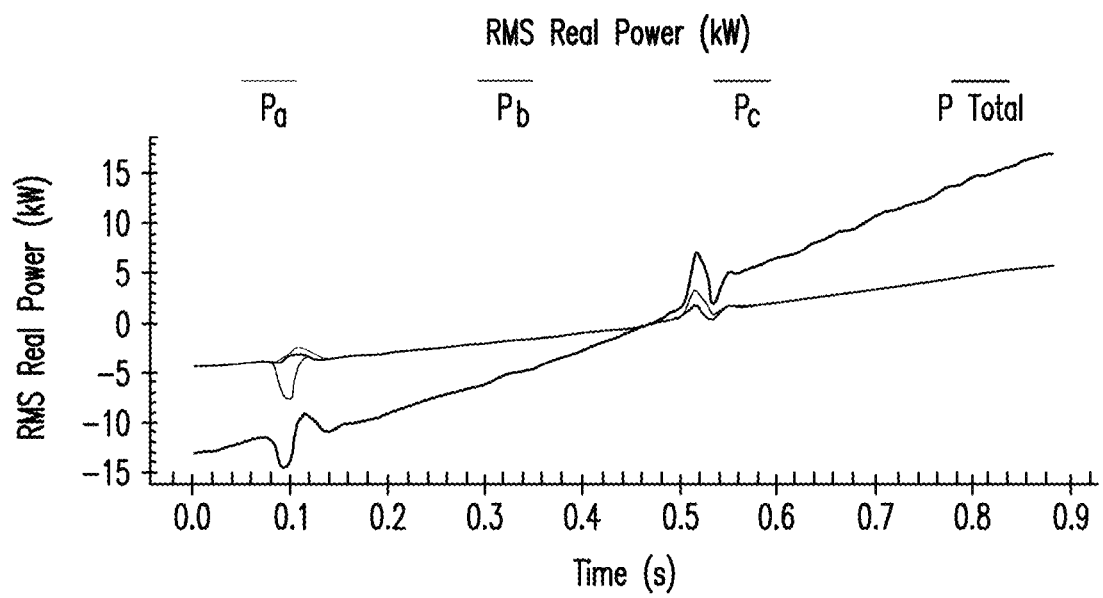
FIG. 14 shows example rms real power for the illustrative voltage event of FIG. 12 in accordance with embodiments of the disclosure.

FIGS. 12-14 illustrate a unique voltage sag event captured from a different system than those shown in the previous two examples. The cause of this voltage event is unknown; however, the results are certainly interesting and will be speculated upon here. In this example, the voltage event occurs on a three-phase, 60 Hertz, 277/480-volt wye-configured system. FIGS. 13 and 14 are derived from the event waveform data captured in FIG. 12. The voltage event lasted approximately 25 cycles (or about 417 milliseconds) in duration, and the worst-case voltage deviation during the event was approximately 81% of the nominal voltage (or 224 volts) on Phase B as shown in FIG. 12 (rms voltage).

FIG. 14 illustrates the rms real power data throughout the voltage event, and provides valuable insight for a troubleshooter when trying to determine the cause of the event. Before the event began (pre-event), the total real power consumed as measured by the metering devices was approximately –13 kW. The negative power indicates the directional flow of the energy with respect to the meter's polarity. If the meter is configured to indicate positive energy flow when the energy is flowing from the source to the load, a negative power flow would be shown when energy is flowing from the load to the source.[4] The voltage event began when t≈0.10 seconds, and is assumed to have concluded once the voltage recovered to its normal operating range (t≈0.52 seconds). Upon the conclusion of the event (i.e., post-event), the total real power consumed by the was approximately +5 kW. Moreover, the load continued to increase for the duration of the waveform capture to a value of approximately +17 kW. As a result, the pre-event versus post-event total power flow experienced a reversal of –231% (i.e., about 131% of the original power flow in the opposite direction). While the power flow reversal is likely intentional, it should still be investigated to ensure this behavior is normal and acceptable. Additionally, one or more loads may have been impacted during this voltage event and subsequent power flow reversal, so mitigation opportunities may need to be considered.

[4] Note: As used herein, the terms "source" and "load" are just nomenclature to indicate direction; not necessarily to indicate where the energy is actually generated and consumed. The source-side and load-side polarity are determined during commissioning, and are at the discretion of the person installing and configuring the meter.

As inferred above, different types of voltage events (e.g., faults) can (and often do) produce dissimilar characteristics. For example, a three-phase fault is inherently more symmetrical; however, single-phase and two-phase faults are not. Understanding a voltage event's characteristics is more complex than simply determining the magnitude and duration of the event. Just as evaluating the pre-event and post-event characteristics is an important technique to understand a voltage event's impact, so too is evaluating additional characteristics of the fault itself.

IEEE Standard 1409-2012 (IEEE Guide for Application of Power Electronics for Power Quality Improvement on Distribution Systems Rated 1 kV Through 38 kV) "introduces and defines the emerging technology of customer power." It "involves devices and circuit configurations of power electronic equipment used in utility power distribution systems rated 1 kV through 38 kV for the purposes of mitigating problems associated with power quality." Examples from this standard will be used to illustrate certain event characteristics that are often overlooked, but are extremely relevant for consideration when attempting to mitigate power quality issues. The invention described herein provides a novel approach to leverage new graphical techniques for evaluating voltage events.

There are two important characteristics of voltage sag events that are generally considered when evaluating mitigation techniques: magnitude (e.g., depth) of the event, duration of the event. However, limiting consideration to these two characteristics of a voltage sag event can be shortsighted, as will be described, resulting in inadequate/improper sizing of mitigative solutions.

FIG. 4, as discussed above, is a useful tool for evaluating the magnitude vs. duration characteristics of voltage events (e.g., sags, swells, transients, etc.); however, it is constrained to magnitude and duration. This can be a problem because it does not account for the impact of other important characteristics of voltage events such as phase jump. IEEE Standard 1409-2012 defines "phase jump" (aka, phase-angle jump, phase shift, or phase jump) as "the change in voltage phase angle during a voltage sag as compared to the phase angle of the voltage before the voltage sag." It is important to note phase jump can be different for each of the three phases in a polyphase system.

Figure 15:
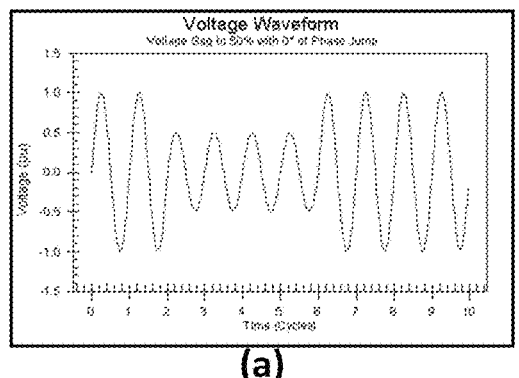
FIG. 15 shows example waveforms without phase jump and its phase jump phasor diagrams for an example voltage event in accordance with embodiments of this disclosure.
Figure 15:
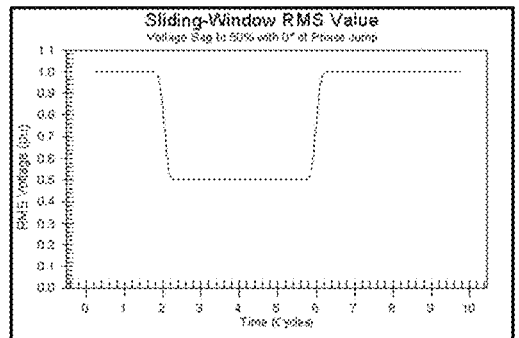
Figure 15:
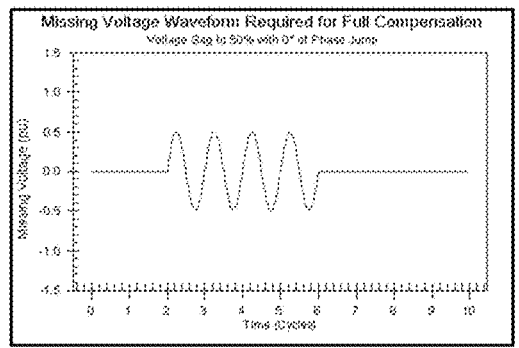
Figure 15:
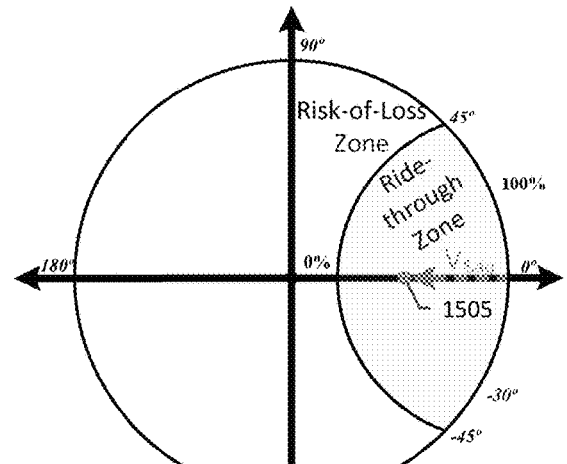
Figure 15:
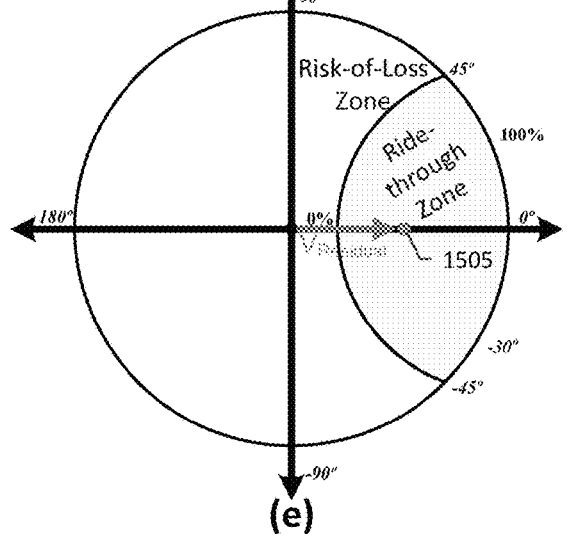
Figure 16:
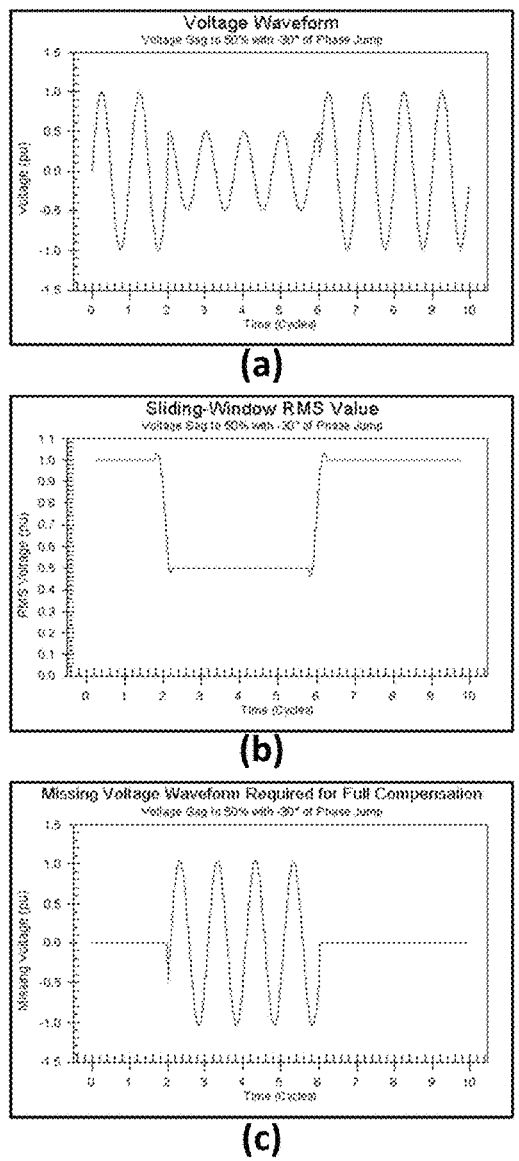
FIG. 16 shows example waveforms with phase jump waveforms and its phase jump phasor diagrams for another example voltage event in accordance with embodiments of this disclosure.
Figure 16:
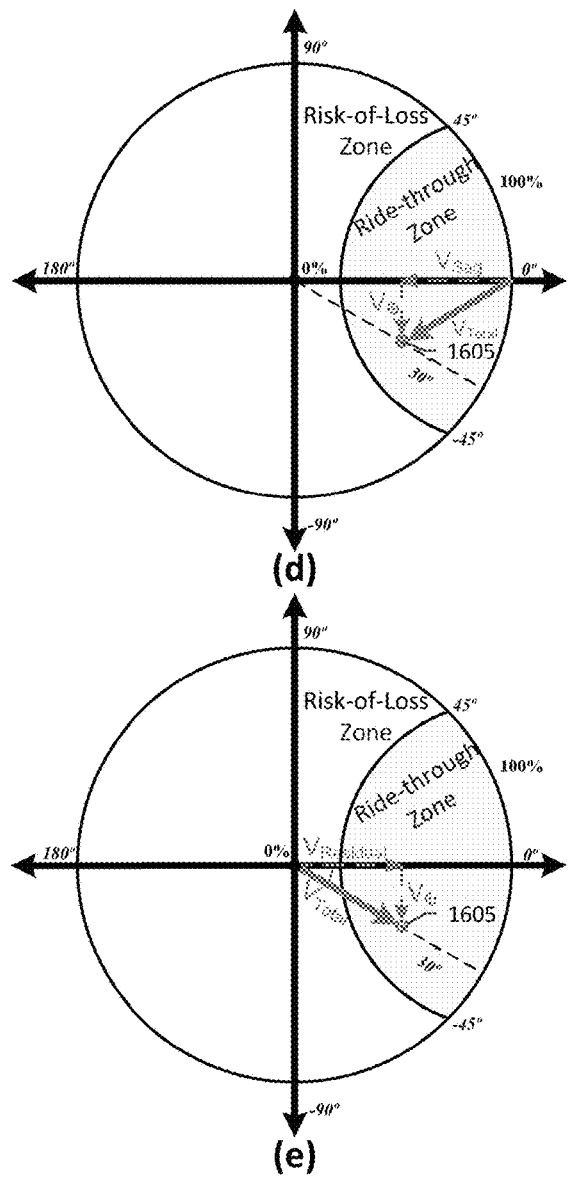

Two examples, taken from IEEE Standard 1409-2012, describe the impact of phase jump 1) on voltage events (e.g., sags, swells, etc.) and 2) on sizing of mitigation equipment to address voltage events (e.g., sags, swells, etc.). FIGS. 15(a), 15(b), 15(c), 16(a), 16(b), and 16(c) are taken from FIGS. 24-29 in IEEE Standard 1409-2012, respectively. FIGS. 15(a)-15(c) (taken from FIGS. 24-26 in IEEE Standard 1409-2012, respectively) illustrate a single-phase 50% voltage sag event with a 0° phase jump; FIGS. 16(a)-16(c) (taken from FIGS. 27-29 in IEEE Standard 1409-2012, respectively) illustrate a single-phase 50% voltage sag event with a −30° phase jump. FIG. 15(a) illustrates the instantaneous waveform of the single-phase 50% voltage sag with a 0° phase jump, FIG. 15(b) illustrates the rms voltage waveform of the single-phase 50% voltage sag with a 0° phase jump, and FIG. 15(c) illustrates the voltage required to achieve full compensation for the single-phase 50% voltage sag event with a 0° phase jump, respectively. Likewise, FIG. 16(a) illustrates the instantaneous waveform of the single-phase 50% voltage sag with a −30° phase jump, FIG. 16(b) illustrates the rms voltage waveform of the single-phase 50% voltage sag with a −30° phase jump, and FIG. 16(c) illustrates the voltage required to achieve full compensation for the single-phase 50% voltage sag event with a −30° phase jump, respectively.

FIGS. 15(c) and 16(c) (i.e., the "Full compensation" voltage waveforms for each respective event) show the instantaneous waveforms required to be injected to bring the original respective waveforms back to 100%. Even though both events (FIG. 15(a) and FIG. 16(a)) experience the same sag depth (i.e., 50%), the voltage waveforms required to fully compensate the waveform in FIG. 16(a) is twice the magnitude of the voltage waveform required to fully compensate the waveform in FIG. 15(a). The reason for the doubling of the voltage injection requirements in FIG. 16(a) is the phase jump associated with this voltage waveform. The ability to compensate for an instantaneous waveform is also dependent on the size of the downstream load (i.e., a greater load requires more energy to adequately compensate the voltage).

FIGS. 15(d) and 16(d) provide a new approach to analyze voltage events, accounting for events with phase jump or without phase jump. For example, FIG. 15(d) illustrates the voltage event shown in FIG. 15(a) using a graphical approach; FIG. 16(d) illustrates the voltage event shown in FIG. 16(a) using a graphical approach. The center of the circle shown in FIGS. 15(d) and 16(d) is 0% of the nominal voltage, and the perimeter of the circle is 100% of the nominal voltage at the location where the measurement is occurring.

In FIG. 15(d), the midpoint between 0% and 100% of the nominal voltage on the x-axis (indicated by '⊕') denotes the sag depth (i.e., 50% of the nominal voltage). The arrow (pointing to the left) in FIG. 15(d) signifies the voltage loss and the black line between 0% and the '⊕' symbol signifies the residual/remaining voltage. While analysis of voltage waveforms (e.g., FIG. 15(a)) to determine associated phase jump can be difficult, a cursory evaluation of FIG. 15(d) clearly shows the arrow to be aligned/on the x-axis indicating no phase jump is associated with this voltage sag event.

Although the voltage event shown in FIG. 16(a) presents a 50% of nominal voltage sag like the voltage event shown in FIG. 15(a), they do have differing characteristics. Chiefly, analysis of FIG. 16(d) shows phase jump is present while FIG. 15(d) does not. In this case, the waveform shown in FIG. 16(d) exhibits a −30° phase jump, which moves the location of the '⊕' symbol off of the x-axis.

In FIG. 15(d), the $V_{Sag}$ vector (as indicated by a corresponding arrow in the figure) encompasses (is equal to) the total effects of the voltage sag event. This is because there is no phase jump associated with the voltage event shown in FIG. 15(a). In FIG. 16(d), this is not the case. For the voltage sag event shown in FIG. 16(a), there are two components shown: 1) the depth/magnitude of the voltage event ($V_{Sag}$), and 2) the phase jump associated with the voltage event ($V_S$). As is shown in FIG. 16(d), these two components are orthogonal with each other. The total effects of the voltage sag event are determined finding the square root of the sum of the squares of these two components:

$$V_{Total} = \sqrt{V_{Sag}^2 + V_{\oplus}^2}$$

Any voltage sag event that includes a phase jump component ($V_{\oplus}$) will require larger voltage compensation requirements because (per the equation) the total voltage impact is greater. Moreover, the larger the phase jump associated with a voltage sag event, the larger the mitigative device/equipment will need to be (assuming a fixed voltage sag event magnitude/depth). The duration of the voltage sag event also plays an important role in sizing the mitigation equipment as well.

FIGS. 15(d) and 16(d) both include an intersecting circular shaded area on the right side of the large circle (i.e., herein referred to as the 'ride-through zone'). This area/region is indicative of the theoretical capability of a particular mitigative device (or equipment) to ride-though a voltage sag event. The area enclosing the rest of the circle (i.e., the area outside of the shaded area) designates the theoretical region where a particular mitigative device (or equipment) would be incapable of riding through a voltage sag event (i.e., herein referred to as the "risk-of-loss zone"). The ride-through capabilities of a particular mitigative device (or equipment) are based on a combination of the 1) downstream load coincident with (at the time of) the voltage sag event, 2) magnitude/depth of the voltage sag event, 3) duration of the event, and 4) phase jump associated with the voltage sag event. The combination of all three of these variables is an important aspect for determining the ability of a mitigative device (or equipment) to allow the downstream load to ride-through the voltage sag event.

For example, referring to FIG. 15(d), assume the threshold for the ride-through zone of a particular mitigative device intersects the x-axis where a voltage sag event's magnitude/depth is approximately 25% of the nominal voltage (i.e., 's', as also indicated by reference designator 1505, is located on the x-axis a distance of 25% of the radius of the area outside of the shaded area from the center of the area outside of the shaded area). In other words, the mitigative device is capable of allowing the downstream load to ride-through a 75% voltage sag event. At this point (i.e., 75% voltage sag, 0° phase jump), the mitigative device (or equipment) will be marginally capable of meeting the voltage sag event ride-through requirements for the downstream load; however, there will be no available capacity for either positive or negative phase jump. In this case, a voltage sag event with some degree of phase shift/jump would move the point '⊕' outside of the shaded area and into the area outside of the shaded area; thus, moving outside of the ride-through zone and into the risk-of-loss zone.

In another example, FIG. 16(d) shows a 50% voltage sag event with a −30° phase jump (i.e., 's', as also indicated by reference designator 1605, is located one-half the radius along the x-axis and −30° below the x-axis (i.e., using Cartesian coordinate nomenclature: (0.5, −0.2886). As can be seen, the location of the sag (including phase jump) is still within the ride-through zone (i.e., '⊕' is still within the shaded area) indicating the mitigative device (or equipment) is still capable of mitigating the voltage sag event. In this example/case, a phase jump that exceeds ±60° (determined using basic trigonometry to calculate the chord length (CL) at the point of the voltage sag: $CL=2\sqrt{r^2-d^2}$) will exceed the capability of the mitigative device (or equipment) to correct the voltage sag voltage (i.e., '⊕' is located outside the ride-through zone in the area outside of the shaded area), resulting in a potential impact to the downstream load.

FIGS. 15(e) and 16(e) illustrate the same techniques; however, they use the center of the graph as the reference point instead of the perimeter (i.e., 0% of the nominal voltage at the origin instead of the 100% of the nominal voltage on the perimeter of the circle on the x-axis). In either case, the respective shaded areas remain as shown in FIGS. 15(d) and 16(d). The shaded regions of the graphs will change, depending on the mitigation device's (or equipment's) ability to ride-through voltage sag events with certain characteristics. Again, event phase jump, event duration, and the event's magnitude/depth are important factors in both the load(s) ability to ride-through a voltage sag event and the mitigation device's (or equipment's) ability to facilitate said ride-through capability.

Figure 17:
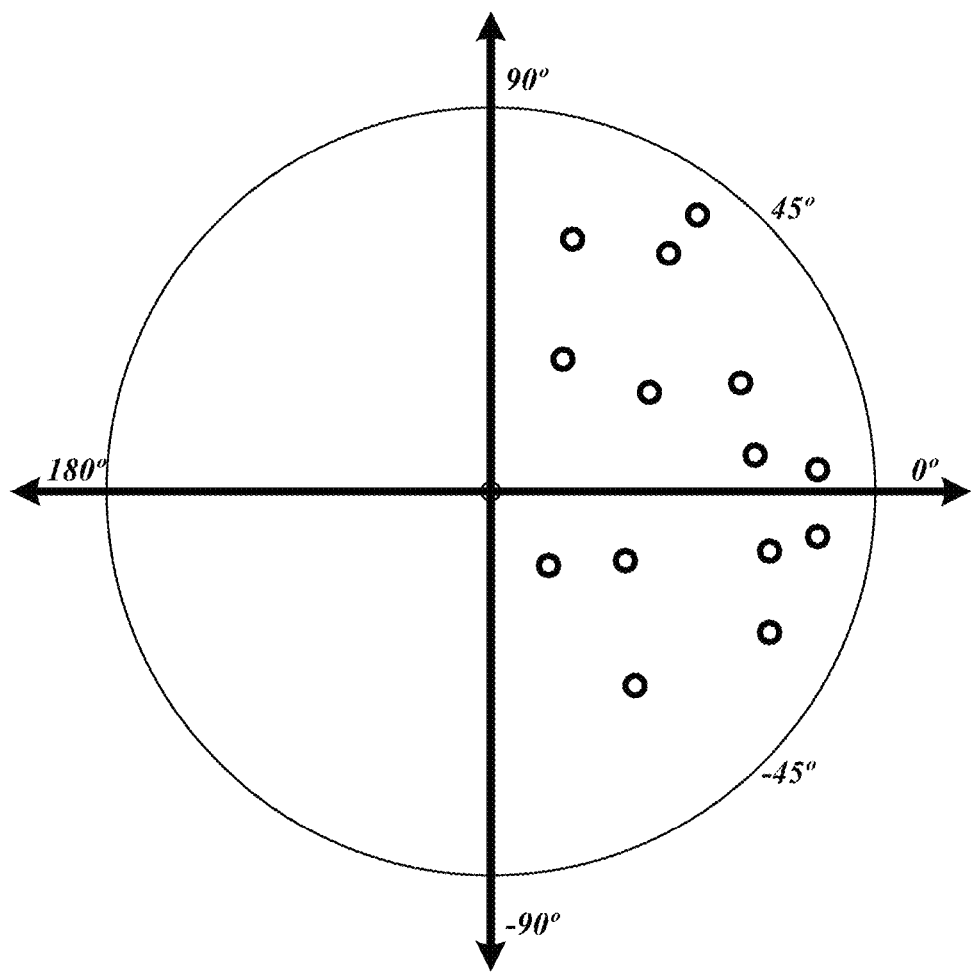
FIG. 17 shows an example phase jump plot of multiple discrete events in accordance with embodiments of this disclosure.

Taking this concept further, it is possible to produce graphical plots (e.g., FIG. 17) that shows multiple voltage sag events, each with its respective phase jump, on a single graph. The data points may be shown by individual phase voltages, average voltage per event, worst/maximum phase jump associated with a voltage sag event, or a combination of these with appended information. The data points shown in FIG. 17 provide the respective magnitudes/depths of each voltage sag event on the x-axis and the phase jumps/shifts for these events are indicated on the y-axis.

Figure 18:
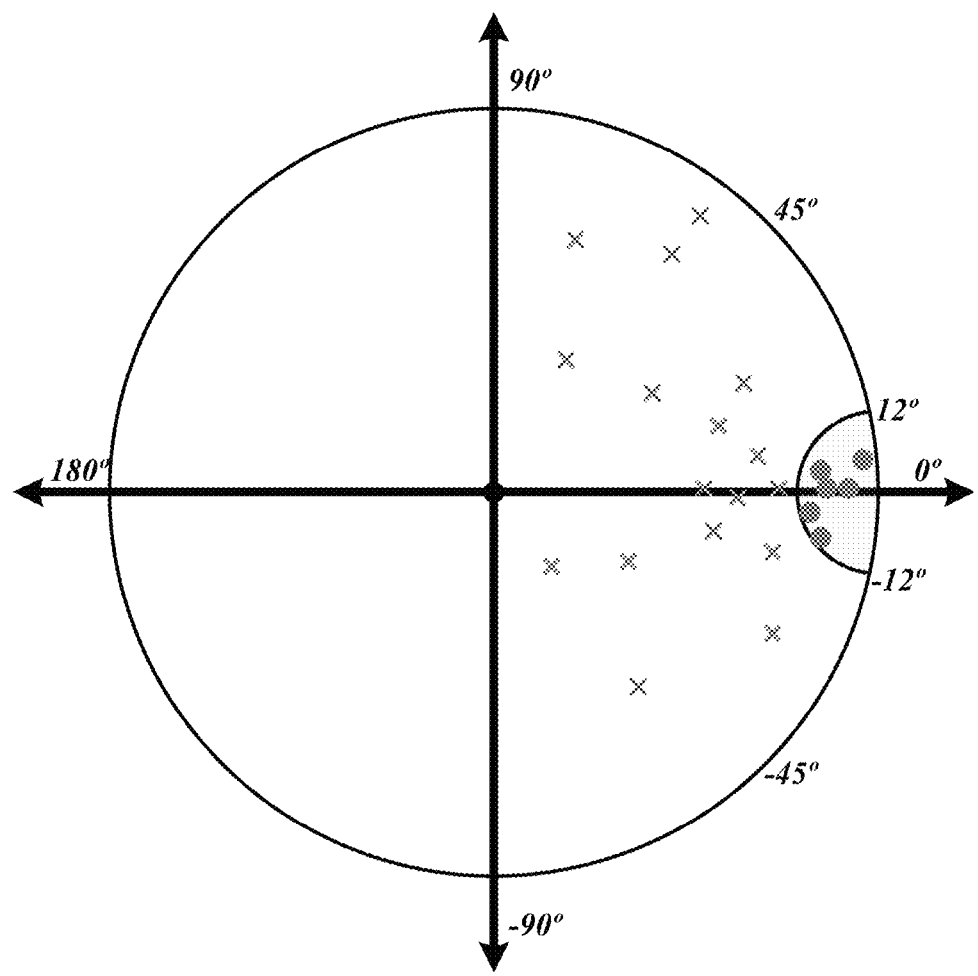
FIG. 18 shows an example phase jump plot of multiple discrete events with impact indications in accordance with embodiments of this disclosure.

FIG. 18 provides a more advanced graphical plot/display with supplemental information. Data points (as indicated by small circles) in the shaded area/region (ride-though zone) indicate voltage sag events that occurred, but did not experience a coincident impact. The data points (as indicated by X's) in the area/region outside of the shaded area (risk-of-loss zone) indicate voltage sag events that occurred that experienced a coincident impact. This is useful to evaluate and determine characteristics of voltage sag events in which the system is more vulnerable. It may also useful to append information to each data point, such as metadata, waveform capture data, other measured data (e.g., current, etc.), derived data (e.g., coincident load, harmonics, etc.), respective voltage event duration, voltage event source information (e.g., upstream from IED, downstream from IED, etc.), and/or other information associated with the IED point, IED load, IED information, and/or associated with the voltage sag event.

Calculations/determinations/derivations for coincident load impact may be performed automatically using pre-event/event/post-event waveform capture data and/or logged data at the time of the voltage sag event to derive pre-event power data minus event/coincident power data at worst/lowest voltage value during the event. A second approach may be to allow the end-user to configure how the coincident power data is determined manually by setting threshold(s), duration(s), phase(s), and/or other coincident measured/derived data measured by the IED or combinations of associated IEDs (e.g., discrete, process/zone or system, etc.). A third approach may be to use historical and/or statistical information/data/metrics/metadata/etc. to determine threshold(s), duration(s), phase(s), and/or other coincident measured/derived data measured by the IED, combination of IEDs, or external to the IED.

Information from this feature may be included in report(s), viewed in a tooltip, graphically, and/or by some other technique for evaluating the associated information. Additional metrics may also be provided to assist selection, validation, and/or verification of mitigation device(s) or equipment. Customer segment information may also be employed to ascertain/manage/report/prioritize/etc. the impact of a voltage sag event(s).

Figure 19A:
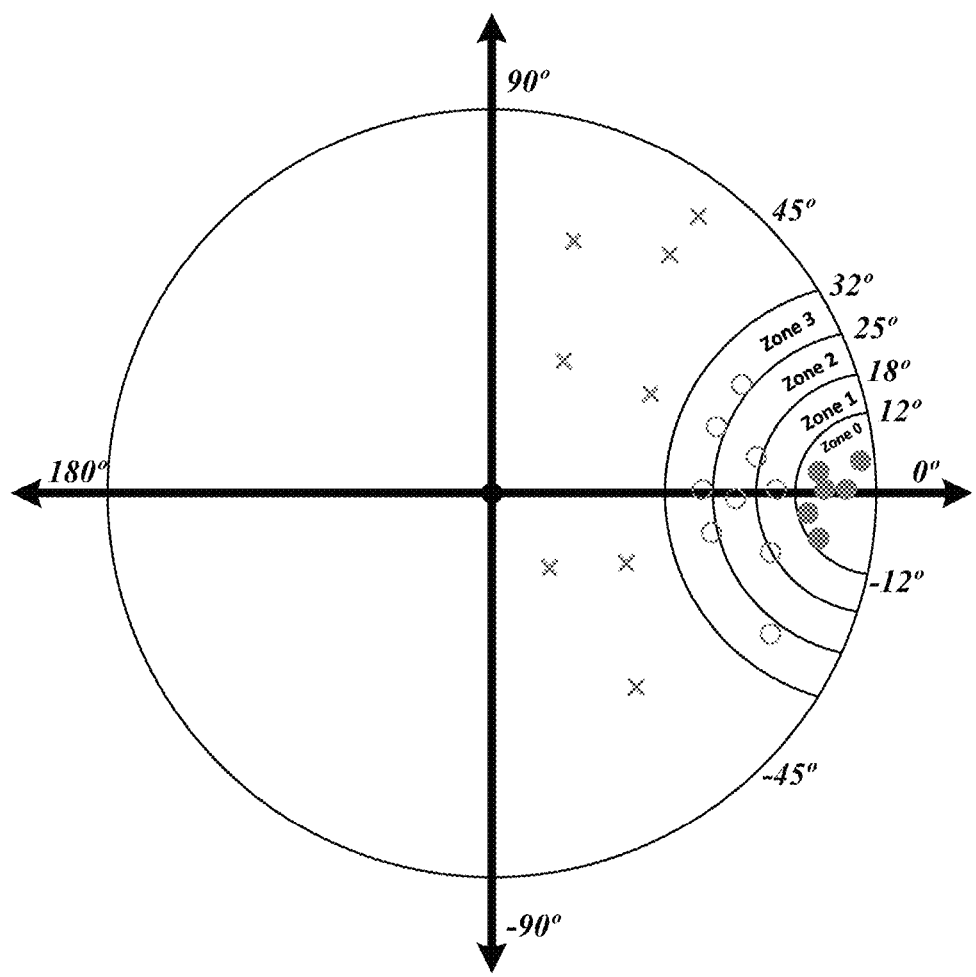
FIG. 19A shows an example phase jump plot of multiple discrete events with impact indications and mitigation overlays in accordance with embodiments of this disclosure.

FIG. 19A provides another approach for leveraging the phasor graphical view of voltage sag event(s). Similar to FIG. 18, FIG. 19A provides multiple zones (here, Zones 0, 1, 2, 3, etc.). In the illustrated embodiment, the area/zone outside of Zones 0, 1, 2, 3 indicate voltage sag events (magnitude and phase jump) that have occurred that may produce a risk-of-loss. The X's inside designate each voltage sag event captured by an IED. In this example, the areas/zones outside of the risk-of-loss area/zone are designated by four separate zones (note: fewer or more zones may be used as required): Zones 0, 1, 2, and 3. Each zone is a concentric circle with the others (in this example) and is defined by a magnitude/depth (x-axis) and phase jump (y-axis). Again, as described above, additional information may be appended to each discrete zone.

Zone 0 (i.e., the zone containing/encompassing the filled circles) represents the area/region where the system (at the point where the voltage sag data was measured) is inherently able to ride-though voltage sag events. This zone may (in reality) be circular or some other geometric shape (symmetrical or nonsymmetrical, linear or nonlinear, arbitrary-shaped, etc.), depending on the load(s) inherent ride-through characteristics. In this case, Zone 0 indicates the system or load(s) inherent ability to ride-through a combination of 1) a phase jump between ±12°, and 2) a voltage sag magnitude/depth of approximately 20% below the nominal voltage (again, these are just exemplary data values). Again, not shown here is the duration of the voltage sag event.

Zones 1-3 are each indicative of the ride-though capability of the system by adding a type(s) of mitigative device(s) (or equipment). Zone 1 represents the improvement in voltage sag event ride-through characteristics using, for example, Mitigation Device 1 (or MD1), Zone 2 represents the improvement in voltage sag event ride-through characteristics using, for example, Mitigation Device 2 (or MD2), and Zone 3 represents the improvement in voltage sag event ride-through characteristics using, for example, Mitigation Device 3 (or MD3). Each mitigation device increases the system/load(s) ride-through characteristics/capabilities (at the point where the data is collected) more than the previous mitigation device. Achieving the capability to ride-through a given voltage sag event occurring out to the perimeter of Zone 3 would also (inherently) provide ride-through of voltage sags occurring in lower-numbered zones (e.g., Zones 0-2). Additionally, the ability to ride-through any voltage sag event(s) occurring in Zone 3 could, as an example, be facilitated by one mitigation device, multiple mitigation devices, different technologies of mitigation device(s), different configurations of one or more mitigation device(s), and so forth. The point here is that the characteristics of each discrete zone may be dependent or independent from other zones, but are dependent on the one or more mitigation devices used to characterize the particular zone.

Zone 1 (in this example) will provide the ability to ride-through voltage sag events exhibiting a combination of 1) a phase jump between ±18°, and 2) a voltage sag magnitude/depth of approximately 31.5% below the nominal voltage. Zone 2 (in this example) will provide the ability to ride-through voltage sag events exhibiting a combination of 1) a phase jump between ±25°, and 2) a voltage sag magnitude/depth of approximately 42% below the nominal voltage. Finally, Zone 3 (in this example) will provide the ability to ride-through voltage sag events exhibiting a combination of 1) a phase jump between ±32°, and 2) a voltage sag magnitude/depth of approximately 55% below the nominal voltage (again, these are just exemplary data values). Again, the duration of the voltage sag event is not included in this evaluation.

Using a phasor plot like the one shown in FIG. 19A, it is possible to show voltage sag event(s) based on the combination of their magnitude/depth, phase jump, and associated impact. This allows the end-user to understand the characteristics of voltage sag event(s) resulting in equipment tripping offline, unexpected downtime, product and production losses, wasted material, wasted recovery energy, excess $CO_2$ generation (due to events), and so forth. Moreover, it's possible to overlay the characteristics of one or more mitigation device(s) (or equipment) to quickly determine and optimize the most economic solutions to address these issues. Alternatively, it is possible to combine the characteristics of two or more mitigation devices (or equipment) to create an aggregated/summed virtual mitigation device(s) (or equipment). It is understood that impact and/or duration can be shown using different sized circles, textually provided using tooltip, or some other graphical or textual method to provide the information.

In FIG. 19A, the circles in Zone 1 indicate voltage sag event(s) that "could" have been rode-through without impact, assuming mitigation equipment with the appropriate characteristics to ride-though event(s) occurring in Zone 1 were installed. In this example, only one voltage sag event (as indicated by the circle) is present in Zone 1. Likewise, Zone 2 contains four voltage sag events (as indicated by the four circles). Remember, a mitigation device(s) (or equipment) with Zone 2 characteristics provide ride-through capabilities for all events in its area/zone (i.e., Zone 2) plus all events in lower area/zones (i.e., Zone 1). Zone 0 can be ignored because the system inherently rides through voltage sag event(s) within its area/zone. Finally, Zone 3 includes nine total voltage sag events (five additional events in Zone 3 plus the four events in Zones 1 and Zone 2). To summarize, installing equipment to meet Zone 1's ride-though characteristics would allow the system to avoid one additional voltage sag event, installing equipment to meet Zone 2's ride-through characteristics would allow the system to avoid four additional voltage sag events, and installing equipment to meet Zone 3's ride-through characteristics would allow the system to avoid nine additional voltage sag events.

Facilitating and/or providing this information (e.g., voltage sag event historical data, effects of sag magnitudes/depths, durations, and phase jumps/shifts, load impact, and mitigation device (or equipment) characteristics) would allow end-users, consultants, and/or equipment manufacturers to more easily resolve chronic voltage issues for end-users. It would allow them to more easily select the most cost-effective migration equipment, and to continuously evaluate its effectiveness (M&V). Moreover, it would allow end-users, consultants, and/or equipment manufacturers to more easily determine the cost per event to mitigate the effects of voltage sag events.

For this example, let's assume achieving the mitigation characteristics given by Zone 1 will be $5000, Zone 2 will be $15,000, and Zone 3 will be $24,000. Based on the number and locations of the voltage sag events occurring in each zone, Zone 1 will cost $5,000/event, Zone 2 will cost $3,750/event, and Zone 3 will cost $2,666/event (using historical data collected by the EPMS and shown in the scatterplot given in FIG. 19A). Again, this is just a simple example with theoretical data to help explain the concepts of the invention.

Figure 19B:
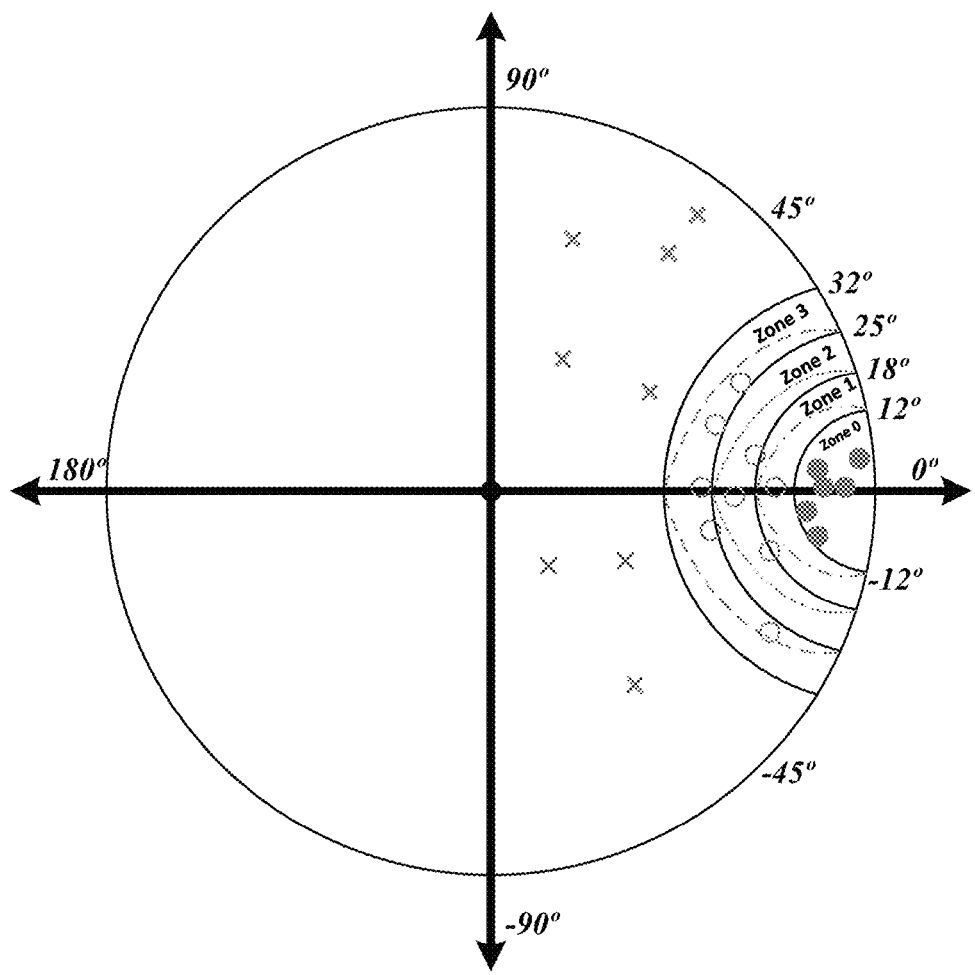
FIG. 19B shows an example phase jump plot of multiple discrete voltage sag events with impact indications, mitigation overlays, and duration lines in accordance with embodiments of this disclosure.

FIG. 19B adds additional complexity to the phasor diagram by including the concept of sag event duration. Each respective zone includes dashed lines that indicate how a voltage sag event's duration impacts the characteristics of the zone. The closer dashed lines are to the x-axis, the shorter the duration of a voltage sag event. As the voltage sag event's duration increases, the dashed lines move towards the inner diameter of the zone, thus illustrating a decreasing effectiveness of the mitigation device(s) (or equipment). The impact of the voltage sag event's duration can also be included in the tooltip information or by some other means. The duration of the voltage sag event can also be indicated by the size/shape/color/etc. of the voltage sag event indication (e.g., green-filled and red-filled circles) in accordance with some embodiments of this disclosure.

Additional characteristics, metrics, parameters, calculations, or combinations thereof may be considered to help end-users more efficiently resolve the effects and the impact of the voltage sag event.

It is understood that while various shapes (e.g., circles) are sometimes described and illustrated as being used to distinguish or indicate information relating to the voltage sag event (e.g., voltage sag duration), other means (e.g., other types of shapes, shadings, colorings, heat maps, sounds, etc.) may be used to indicate the same. It is also understood the shapes and other indicators described herein may be customized by users, for example, to suite their particular application(s)/need(s). Additionally, the shapes and other indicators may be context-based, for example, being generated based on customer segment type, etc. Other aspects and variations of the disclosed invention will be appreciated by one of ordinary skill in the art.

Figure 20:
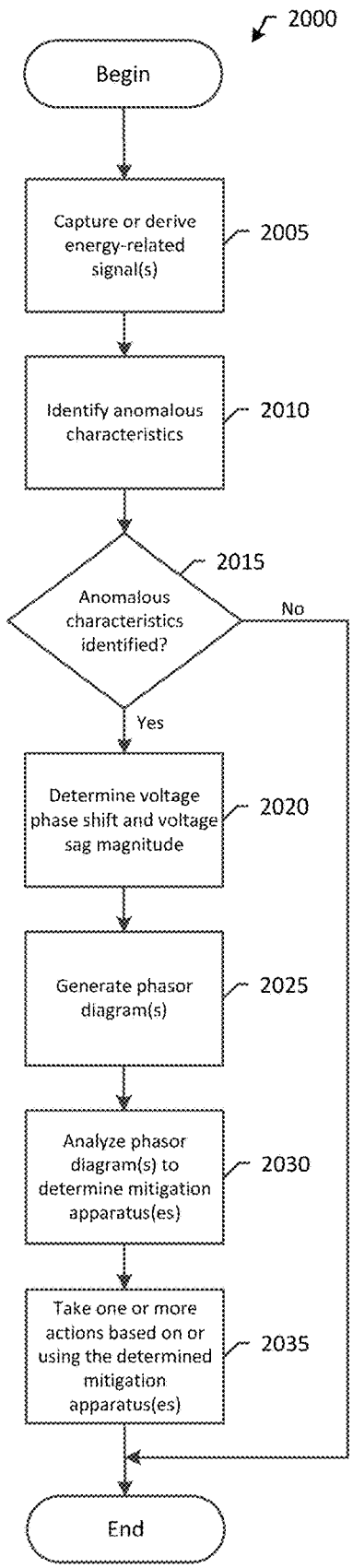
FIG. 20 is a flowchart illustrating an example implementation of a method to automatically identify, assess and mitigate power quality issues using electrical phasors in accordance with embodiments of this disclosure.

The invention may be further understood by the flowchart (or flow diagram) shown in FIG. 20, for example. Referring to FIG. 20, a flowchart is shown to illustrate an example implementation of a method according to the disclosure relating to automatically identifying, assessing and mitigating power quality issues using electrical phasors. Rectangular elements (typified by element 2005 in FIG. 20), as may be referred to herein as "processing blocks," may represent computer software and/or IED algorithm instructions or groups of instructions. Diamond shaped elements (typified by element 2015 in FIG. 20), as may be referred to herein as "decision blocks," represent computer software and/or IED algorithm instructions, or groups of instructions, which affect the execution of the computer software and/or IED algorithm instructions represented by the processing blocks. The processing blocks and decision blocks (and other blocks shown) can represent steps performed by functionally equivalent circuits such as a digital signal processor circuit or an application specific integrated circuit (ASIC).

The flowchart does not depict the syntax of any particular programming language. Rather, the flowchart illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied. Thus, unless otherwise stated, the blocks described below are unordered; meaning that, when possible, the blocks can be performed in any convenient or desirable order including that sequential blocks can be performed simultaneously (e.g., run parallel on multiple processors and/or multiple IEDs) and vice versa. Additionally, the order/flow of the blocks may be rearranged/interchanged in some cases as well. It will also be understood that various features from the flowchart described below may be combined in some embodiments. Thus, unless otherwise stated, features from one block of the flowchart may be combined with features of another block of the flowchart, for example, to capture the various advantages and aspects of systems and methods associated with automatically identifying, assessing and mitigating power quality issues using electrical phasors sought to be protected by this disclosure. It is also understood that various features from the flowchart may be separated in some embodiments. For example, while the flowchart is shown having many blocks, in some embodiments the illustrated method shown by this flowchart may include fewer blocks or steps.

Referring to FIG. 20, a flowchart illustrates an example implementation of a method 2000 to automatically identify, assess and mitigate power quality issues using electrical phasors in accordance with embodiments of this disclosure. Method 2000 may be implemented, for example, on a processor of at least one IED (e.g., 321, shown in FIG. 3) in the electrical system and/or remote from the at least one IED, for example, in at least one of: a cloud-based system, on-site/edge software, a gateway, or other head-end system.

As illustrated in FIG. 20, the method 2000 begins at block 2005, where at least one energy-related signal (or waveform) is captured or derived using at least one IED in the electrical system. The at least one IED may be installed or located, for example, at a respective metering point of a plurality of metering points in the electrical system. In some embodiments, the at least one IED may be coupled to one or more loads/equipment/apparatuses (e.g., induction motors) in the electrical system, and the energy-related waveform(s) captured or derived by the at least one IED may be associated with the operation of the loads/equipment/apparatuses to which the at least one IED is coupled. The energy-related signal(s) (or waveform(s)) may include, for example, at least one of: a voltage signal, current signal, power waveform(s), derivatives or integrals of a voltage or current, current and/or power waveforms, power factor, current and/or power waveforms, and any (or substantially any) other energy-related signal information derived from voltage and/or current signatures. The voltage and/or current signal may include, for example, single-phase or polyphase voltage and/or current signals/waveforms.

At block 2010, electrical measurement data from, or derived from, the at least one energy-related signal captured or derived at block 2005 is processed to identify anomalous characteristics in the electrical system. In accordance with some embodiments of this disclosure, the anomalous characteristics corresponds to a measured IED voltage, e.g., from the signal(s) captured or derived at block 2005, being above one or more upper alarm thresholds or below one or more lower alarm thresholds (e.g., as shown in FIG. 5). In some embodiments, the measured IED voltage has a magnitude and duration (rather than just a magnitude, for example). In these embodiments, the anomalous characteristics may correspond to the magnitude and duration of the measured IED voltage being above a magnitude and duration of the one or more upper alarm thresholds, or below a magnitude and duration of the one or more lower alarm thresholds. In some embodiments, the upper alarm thresholds and the lower alarm thresholds align with a recommended operational range of one or more loads, processes, and/or systems monitored by the at least one IED in the electrical system. As noted above in connection with FIG. 5, for example, equipment (e.g., loads) may have a rated voltage and a recommended operational range, with the rated voltage corresponding to a desired voltage magnitude/level for optimal load operation, and the recommended operational range being the area above or below the rated voltage where the loads may still operate continuously, although not necessarily optimally.

At block 2015, it is determined if anomalous characteristics were identified at block 2010. If it is determined that anomalous characteristics were identified at block 2010, the method may proceed to block 2020. Alternatively, if it is determined that anomalous characteristics were not identified at block 2015, the method may end, return to block 2005 (e.g., for capturing additional energy-related signal(s) for analysis), or one or more actions may be taken. Example actions may include storing, displaying and/or analyzing the at least one captured or derived energy-related signal. Additional example actions may be appreciated from further discussions below.

At block 2020, in response to identifying the anomalous characteristics in the electrical system, a degree of voltage phase jump, duration, and a voltage sag magnitude may be determined based on or using the identified anomalous characteristics.

At block 2025, at least one phasor diagram (or phase jump plot) is generated. In one example implementation, the degree of the voltage phase jump and the voltage sag magnitude are displayed on the at least one phasor diagram. In some embodiments, the degree of the voltage phase jump and the voltage sag magnitude are each represented by at least one indication on the at least one phasor diagram. The at least one indication may take the form of at least one of: a phasor, a shape, a marker, a shading, a coloring, a heat map, a sound indicator, and an icon, for example, with the at least one indicator being representative of the degree of the voltage phase jump and the voltage sag magnitude. In some embodiments, characteristics associated with the phasor, the shape, the marker, the shading, the coloring, the heat map, the sound indicator, and the icon are manually or automatically configured.

At block 2025, the voltage sag event's duration information may also be appended to the event indication plotted on the at least one phasor diagram. Additionally, in some embodiments recurrent anomalous characteristics may be indicated on one or more phasor diagrams of the at least one phasor diagram. It is understood that the at least one phasor diagram may include various types of information, as will be appreciated by discussions above and below. Additionally, it is understood that the at least one phasor diagram may be presented or displayed in a variety of manners and on various devices. For example, the at least one phasor diagram may be presented on at least one display device. In accordance with some embodiments of this disclosure, the at least one display device includes a display device of a system user and/or operator.

At block 2030, the at least one phasor diagram is analyzed to determine most optimal/cost-effective apparatus(es) to mitigate at least one of the identified anomalous characteristics.

At block 2035, which is optional in some embodiments, one or more actions may be taken or performed based on determining the most optimal/cost-effective apparatus(es) to mitigate the at least one of the identified anomalous characteristics. In accordance with some embodiments of this disclosure, the one or more actions taken or performed may include, for example, overlaying one or more mitigative solution characteristics on one or more phasor diagrams of the at least one phasor diagram. In accordance with some embodiments of this disclosure, the one or more mitigative solution characteristics are indicated using at least one of: a shape, a marker, a shading, a coloring, a heat map, a sound indicator, and an icon, with the at least one indicator being representative of the one or more mitigative solution characteristics.

In accordance with some embodiments of this disclosure, the one or more mitigative solution characteristics overlayed on the one or more phasor diagrams may be associated, for example, with at least one range or zone (e.g., zones 1, 2, 3, etc. as shown in FIGS. 19A and 19B) where the one or more mitigative solution characteristics are determined to be capable of successfully mitigating at least one anomalous condition of the identified anomalous conditions within the at least one range or zone. The one or more mitigative solution characteristics may include, for example, capability to resolve or mitigate at least one of: the voltage phase jump, the voltage sag magnitude and a duration of the identified anomalous characteristics.

Subsequent to block 2035, the method may end in some embodiments. In other embodiments, the method may return to block 2005 and repeat again (e.g., for capturing or deriving additional energy-related signal(s)). In some embodiments in which the method ends after block 2035, the method may be initiated again in response to user input, automatically, periodically, and/or a control signal, for example.

It is understood that method 2000 may include one or more additional blocks or steps in some embodiments, as will be apparent to one of ordinary skill in the art. For example, in accordance with some embodiments of this disclosure, additional evaluations may occur in the process indicated by method 2000. For example, in accordance with some embodiments of this disclosure, method 2000 may further include determining and providing impact metrics in dollars, tons of $CO_2$, energy, energy costs, recovery time, etc., to understand the impacts associated with individual and aggregate events. The impact metrics may also be used to optimize mitigation equipment costs vs event impact costs, for example. In accordance with another embodiment of this disclosure, the method 2000 may further include processing voltage sag event data from multiple devices to provide a system view of each discrete event, how the system was impacted, associated costs, etc. The response of mitigation equipment may also be estimated from a historical perspective and measurement and verification (M&V) information associated with installing the mitigation equipment may be provided using method 2000.

In some embodiments, the degree of the voltage phase jump and the voltage sag magnitude are each represented by at least one indication on the at least one phasor diagram. The at least one indication may take the form of at least one of: a phasor, a shape, a marker, a shading, a coloring, a heat map, a sound indicator, and an icon, for example, with the at least one indicator being representative of the degree of the voltage phase jump and the voltage sag magnitude. In accordance with some embodiments of this disclosure, characteristics associated with the phasor, the shape, the marker, the shading, the coloring, the heat map, the sound indicator, and the icon are manually or automatically configured.

It is understood that there are many example advantages associated with the above-discussed phasor diagrams (or phase jump plots), and the methods and systems associated with generating the phase jump plots (e.g., method 2000). For example, as will be appreciated by one of ordinary skill in the art, the above-discussed phase jump plots, and the methods and systems associated with generating the phase jump plots:

provide a simple method to quantify individual and aggregate issues;

facilitate selection of most cost-effective mitigation solutions (e.g., dynamic voltage restorers (DVRs));

help to identify, track/trend, quantity return on investment (ROI) and performance measurement and verification (M&V);

provide discrete thresholds for each location, zone and/or system; and provide customized zones for each mitigation solution (e.g., DVR).

Other example advantages will be understood and appreciated by one of ordinary skill in the art.

As noted earlier in this disclosure, several example techniques for evaluating electrical phasors to identify, assess and mitigate selected power quality issues are provided herein. The first example technique, which provides a new approach for evaluating voltage sag events, is discussed above. The second example technique, which relates to phasor analysis for transient overvoltage events, is discussed below.

Technique 2: Phasor Analysis for Transient Overvoltage Events

The occurrence of rapid changes in electrical systems often produces electrical transients in power systems. There are a variety of conventional sources that can produce rapid changes resulting in electrical transients such as opening/closing switches and breakers, or energizing/de-energizing electric loads (e.g., motors starting/stopping, energizing capacitor banks). More unconventional sources of rapid changes in electrical systems may include rapid injection of energy into the circuit (e.g., lightning, ESD), or electrical faults.

Electrical transients are classified as either impulsive or oscillatory, most being the latter due to the ringing often associated with perturbating an electrical system. Transients occur over very short periods (i.e., typically ≤1 cycle) and may exhibit extremely high voltage levels during these periods. High voltages produce additional heat in electrical circuits and equipment, stressing insulation and potentially causing arcs or electrical shorts circuits. The impact to a specific electrical system is dependent on a number of factors including characteristics of the loads, circuit infrastructure, and the transients themselves.

Switching transients (as defined in this document) are produced when mechanical contacts are opened/closed, producing a rapid (high-speed/short-duration) perturbation in the voltage that often propagates through the electrical system. As discussed above, switching transients (sometimes referred to as fast-switching transients) may originate from conventional sources (e.g., breakers, switches, motor contactors opening/closing, capacitor banks energizing/de-energizing, etc.). Electrical equipment and infrastructures used in many energy market segments can experience hundreds to thousands of switching transients each day, producing a deluge of significant electrical, mechanical and thermal stress within the electrical loads and system. Switching transients associated with energizing/de-energizing motors, for example, can be especially impactful, as will be discussed below in more detail.

As is known, motors are an essential type of electrical equipment, pervading everything from large, industrial facilities to residences. They are used in wide range of applications—from the large three-phase induction motors that the drive reactor coolant pumps in nuclear generation stations, to the small universal motors that drive your vacuum cleaner. Motors are a crucial component of every nation's economy—because of the work they perform, and because of the considerable amount of energy they consume.

The most common type of motor in use today is the polyphase induction motor with over 90% of those being squirrel cage induction motors. The prevalence of polyphase induction motors exists for several reasons:

Relatively inexpensive
  Rudimentary design
  Readily replaced
  Reliable operation
  Range of mounting styles and environmental enclosures Due to the significant capital and operational investments made by companies in induction motors—not to mention dependence on motors for production and the bottom-line—identifying and mitigating electrical events that can adversely impact a motor's condition is vital. Induction motors are generally robust, but can fail prematurely when electrically stressed. During steady-state conditions, motors are designed to operate at a specific rated voltage plus/minus some tolerance level or range. For example, a 460-volt rated motor may have a tolerance range of plus/minus 10% (i.e.,  414 volts to 506 volts). The greater a voltage excursion from the rated voltage, the more stress sustained by the motor.

An objective of the second example technique disclosed herein is to identify, evaluate, protect, and mitigate motor regenerative events that may produce significant electrical and mechanical stresses on electric motors and adjacently connected equipment. The source of regenerative events is often inherent with the "typical" operation of electrical systems that do not consider the repercussions associated with energizing and de-energizing motors. To better describe the problem associated with motor regeneration, several figures and examples are discussed below.

Figure 21:
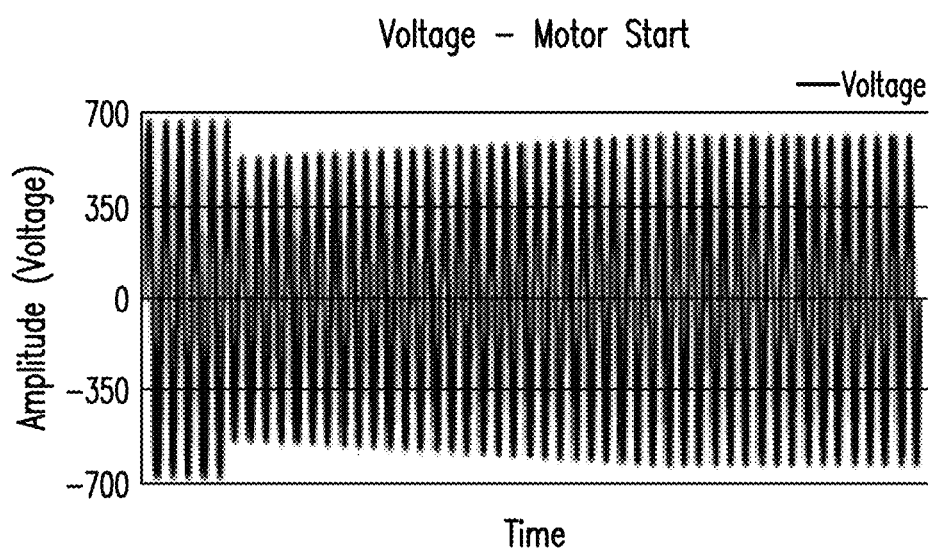
FIG. 21 provides an illustration of the voltage on one phase of a motor when the motor is energized/started.
Figure 21A:
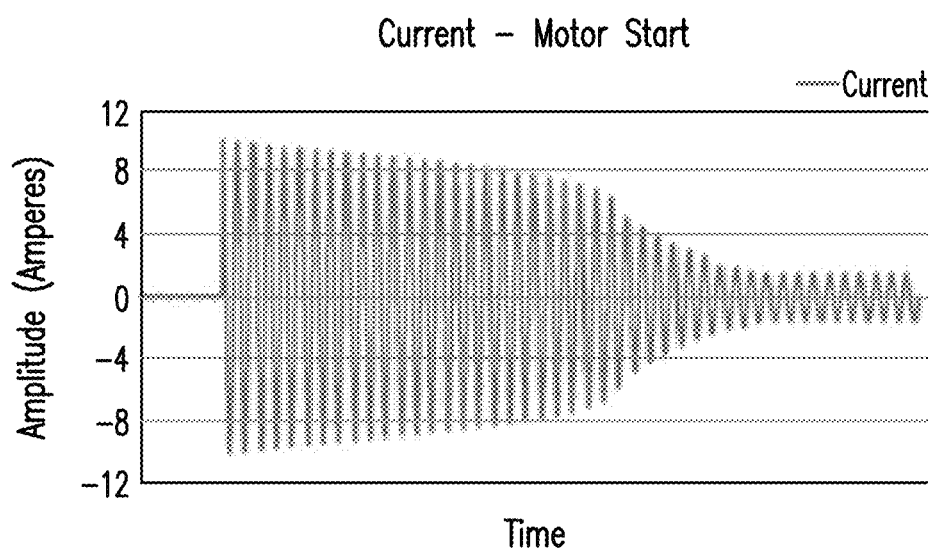
FIG. 21A provides an illustration of the current on one phase of a motor when the motor is energized/started. It is the current waveform associated with the voltage signal shown in FIG. 21.

As is known, when an induction motor is energized, a large current (i.e., inrush current) 6-10 times the motor's full-load current flows into the motor producing a voltage sag. The depth of the voltage sag associated with a motor start corresponds with the motor's (and system's) impedance (see Ohm's Law). FIGS. 21 and 21A illustrate the single-phase instantaneous voltage and current during a motor start. The inrush current (almost indicative of a short circuit) shown in FIG. 21A produces the voltage drop shown in FIG. 21. As the motor begins rotating, its impedance increases and its current flow decreases. With the increase in the motor's impedance, the voltage begins to recover to its pre-start conditions/levels. Once the motor reaches its steady-state operational condition, the voltage and current stabilize to normal and reasonable values. In this case, the voltage will be slightly lower than its pre-start condition and the current will have increased from zero amperes to its rated current (subject to its load condition).

Because of the effects described above related to motor energization, motors are known culprits of producing power quality problems. The voltage sags associated with motor energization can impact adjacently-connected equipment causing mis-operation, resetting, erroneous data, and/or creation of other associated issues. And because motors are pervasively applied in industrial and commercial applications, the potential for PQ issues is ever-present. To complicate matters, energizing motors is not the only source of PQ issues produced by motors (there are several). "When" the motor is started also needs to be considered. This invention focuses on conditions leading, not merely to significant PQ issues, but also to potential motor damage and reduction in a motor's operational life.

Figure 22:
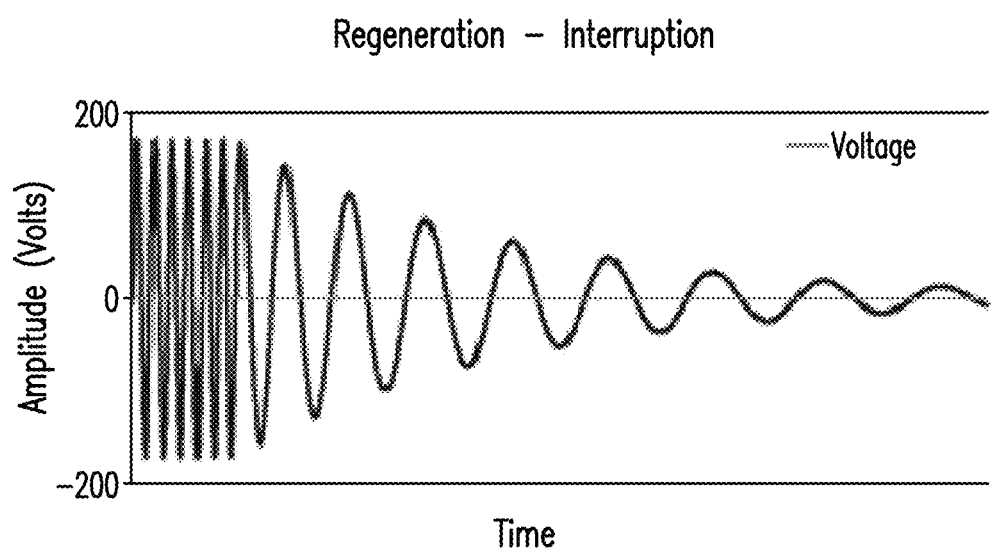
FIG. 22 provides an illustration of the single-phase voltage on a motor being disconnected from its voltage source and resulting in a regenerative voltage.

The source (i.e., line) voltage may be removed from a motor with little or no consequences; in fact, removing the voltage source (e.g., to de-energization, to protection, etc.) is an expected operational mode of most motors. When the voltage source is removed, a motor's magnetic field (flux) remains, but decays exponentially as the motor's rotor slows down (see FIG. 22). As the rotor's speed decreases, the motor acts as a generator with a residual voltage provided by the decaying magnetic field. The rate a motor's terminal voltage decays will depend on its connected impedance(s) (i.e., loads, capacitance, etc.), the energy stored in the motor's magnetic field, its decay constant (which is related to the aforementioned factors), among other factors. Any capacitors connected to the disconnected motor will increase the motor's decay constant, resulting in a longer (sometimes, much longer) period before the residual voltage on the motor's terminals attenuates. In some cases, capacitors may cause the residual voltage to increase when the motor is initially disconnected; however, the connected loads and losses (e.g., friction, heat, etc.) will ultimately stop the motor—it will just take much longer.

During startup, a motor has (or should have) approximately its rated voltage applied to its terminals (see FIG.

Figure 22A:
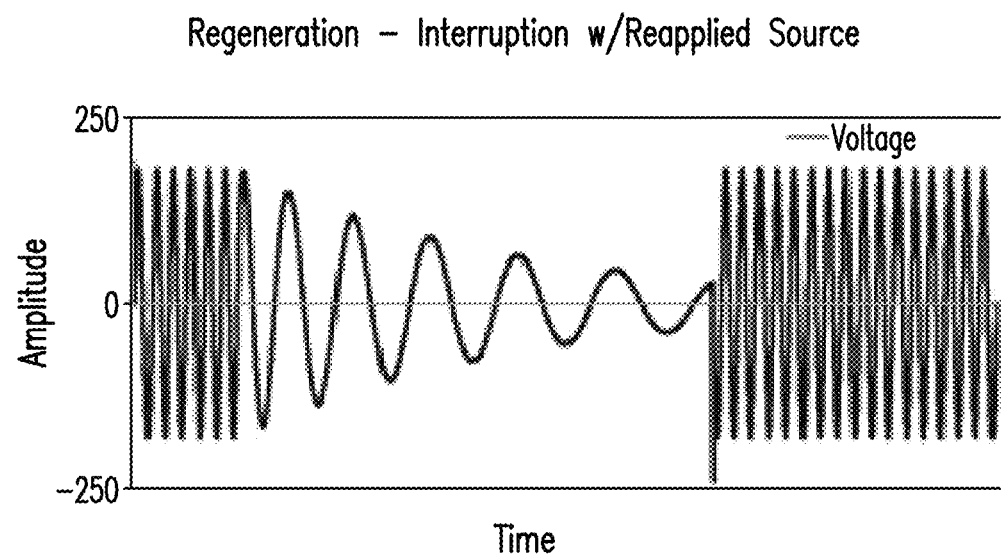
FIG. 22A provides an illustration of the single-phase voltage on a motor being disconnected from its voltage source and then reconnected back to its original voltage source, causing a switching transient.

21). The motor's impedance is very low when initially energized, so the startup current is very high (see FIG. 21A). As the motor comes up to speed, its impedance significantly increases and its current decreases accordingly. Removing an operating motor's source voltage results in a residual voltage remaining across the motor's terminals because the motor's magnetic field cannot dissipate instantaneously when the motor is de-energized. Re-energizing the motor while this residual voltage is still present (and the motor's impedance is still high) generates a momentary cumulative voltage that may be damaging to the motor and adjacent equipment alike (see FIG. 22A). This is amplified by the presence of capacitors (as previously mentioned).

Switching transients are caused by disconnecting a motor's circuit from its source and then reconnecting it back to its source before the motor's residual voltage has dissipated. Switching a motor in this manner may produce severe electrical and mechanical transient forces due to unexpected peak currents. The longer a motor has significant residual voltage on its terminals, the higher the probability and greater the risk of incurring a damaging event to the motor and potentially creating a subsequent transient that may even impact surrounding equipment. The effects of switching transients may be mechanical or electrical damage to the motor (e.g., twisted shafts, loosened rotors, bent coils, physical displacement of the motor, stressed or failed insulation, failed components, etc.).

Switching transients may be a common and frequently repeated occurrence in some applications. Damage may be gradual or acute, and its source may be undetected. Stress and fatigue from switching transients may be misattributed, and approaches to mitigate these issues may be ineffectual at best or exacerbated at worst.

Processes involving the positioning of equipment often energize and de-energize motors repeatedly and rapidly (e.g., jogging), and may lead to potential switching transients. Another typical source of switching transients is motor starting techniques often (and ironically) used for reduced voltage starting (e.g., wye-delta starting, auto-transformer starting, part-winding starting, etc.). These starting motor techniques involve switching the motor windings while the motor is partially up-to-speed, potentially leading to stress associated with the switching.

Switching sources is becoming more prevalent in many applications and may produce similar consequences as the fast reapplication of a source that has been disconnected from a motor. Open-transition switching may be particularly susceptible to producing switching transients, depending on the duration of the transition and the characteristics of the motor's rate of decay of its residual voltage.

Figure 23:
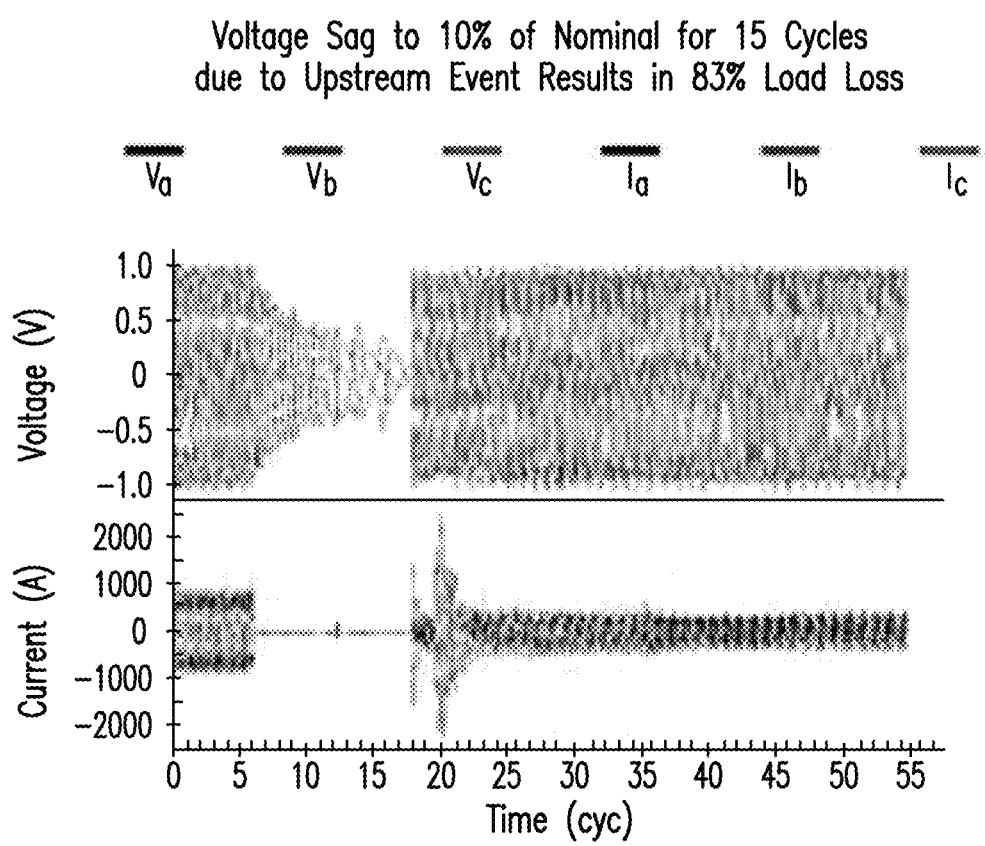
FIG. 23 is a real example of motor regeneration on a three-phase electrical system at an example data center.

The operation of utility protection equipment (e.g., reclosers, etc.) is another source of switching transients in motors. Reclosers intentionally open/closer distribution feeders in an attempt to clear the fault from the circuit. This may happen several times before the fault is either cleared or the recloser locks out the circuit, leading to switching transient exposure to all motors within a facility served by the affected distribution feed. FIG. 23 illustrates an actual fast-switching transient event captured at a data center.

Figure 24:
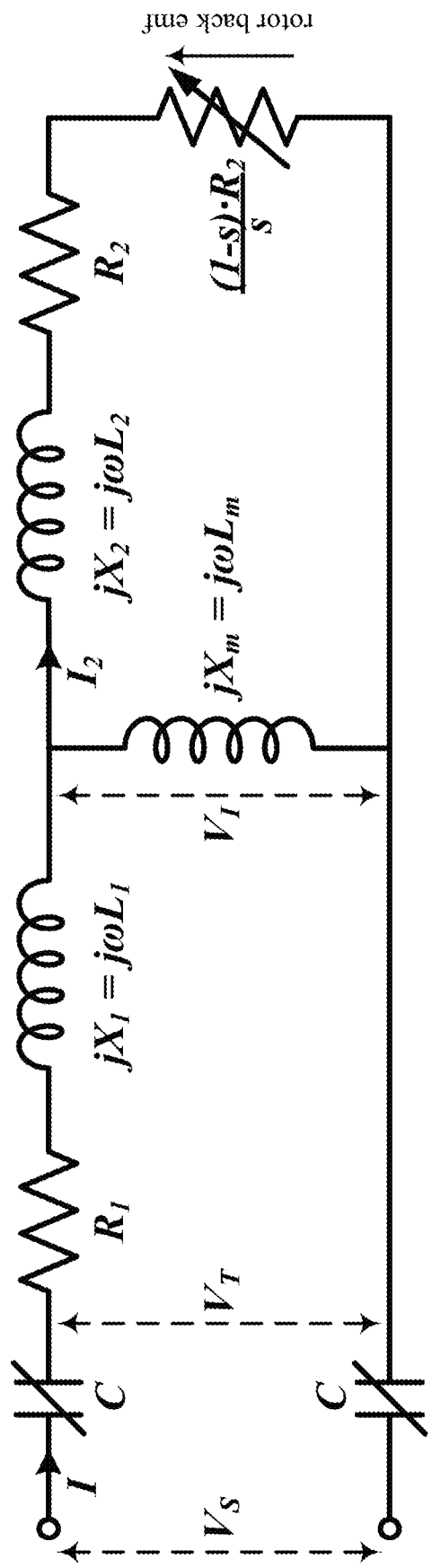
FIG. 24 is a simple model of an induction motor.
Figure 25:
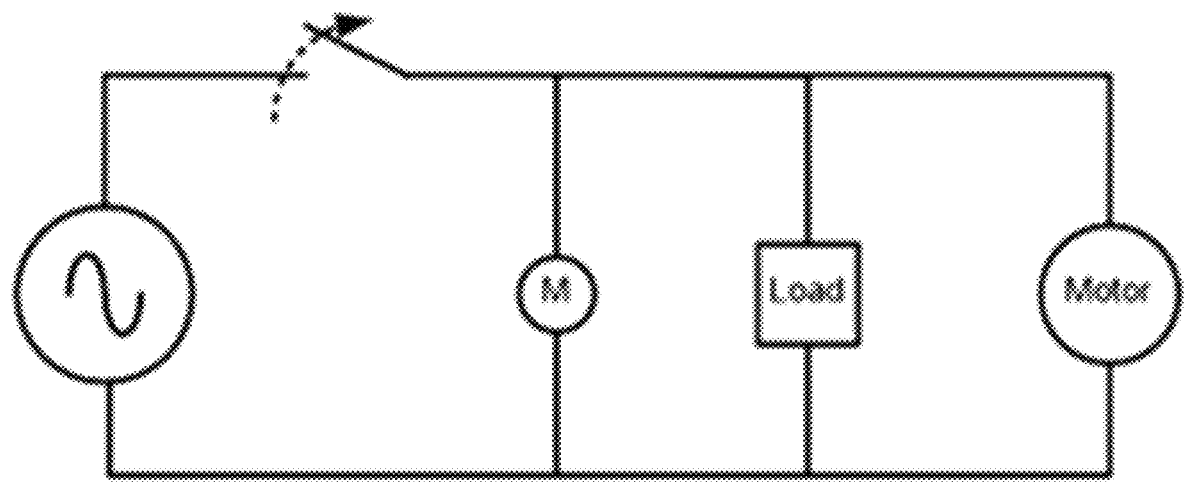
FIG. 25 provides a simple circuit to illustrate the cause and interactions of motor regeneration in an electrical system.

To understand the invention, it is important to examine the phase relationship between a motor and its source. To assist this discussion, FIG. 24 illustrates a simple model of an induction motor and FIG. 25 illustrates a simple system containing a motor, load, and metering device (i.e., IED). In FIG. 24, $R_1$ is the stator resistance, $R_2$ is the rotor copper loss, $L_1$ is the stator inductance, $L_2$ is the rotor inductance with respect to the stator, $L_m$ is the magnetizing inductance, s is the rotor slip, $[(1-s)\cdot R_2]/s$ is the developed mechanical power, and V and I are the sinusoidal supply voltage and current phasors. During the normal operation of a motor, the source voltage produces a magnetic field in the motor that rotates around the motor's stator at a synchronous speed. The motor's rotor follows this field at a slightly lower speed due to the motor's slip.

As shown in FIG. 24, the motor's source voltage is designated by $V_S$, and is equivalent to the terminal voltage ($V_T$) for the motor while the motor is operating normally. The internal voltage ($V_I$) associated with the motor (due to its rotating magnetic field) is lower than the motor's source voltage ($V_S$) and slightly out of phase with the terminal voltage ($V_T$) due to the stator's impedance. Once the source voltage ($V_S$) is removed, either by opening the contacts (C) shown in FIG. 24 or opening the switch shown in FIG. 25, the phase angle (θ) between the source voltage ($V_S$) and the internal voltage ($V_I$) begins to increase as the motor's rotor speed decays.

Figure 26:
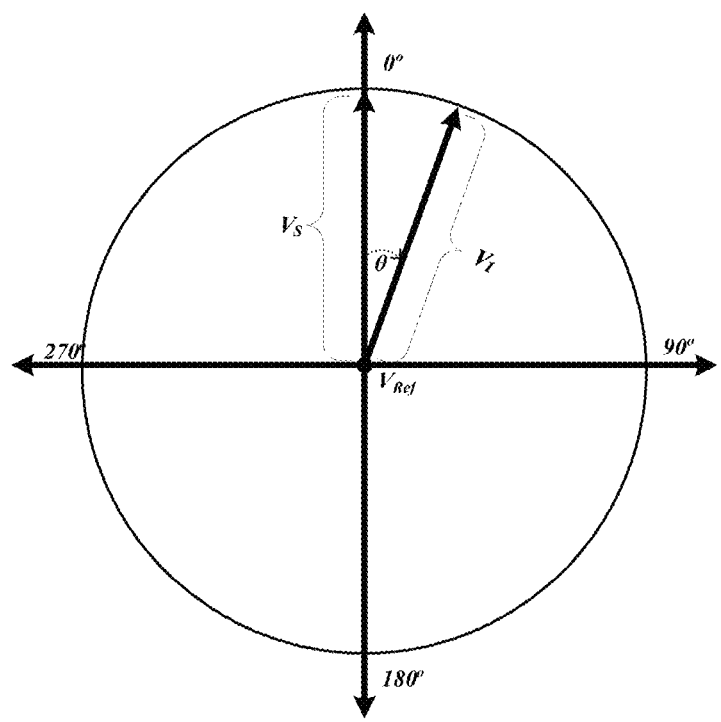
FIG. 26 illustrates the phasor relationship between the source voltage, $V_S$, and the motor's internally generated voltage, $V_I$.
Figure 26A:
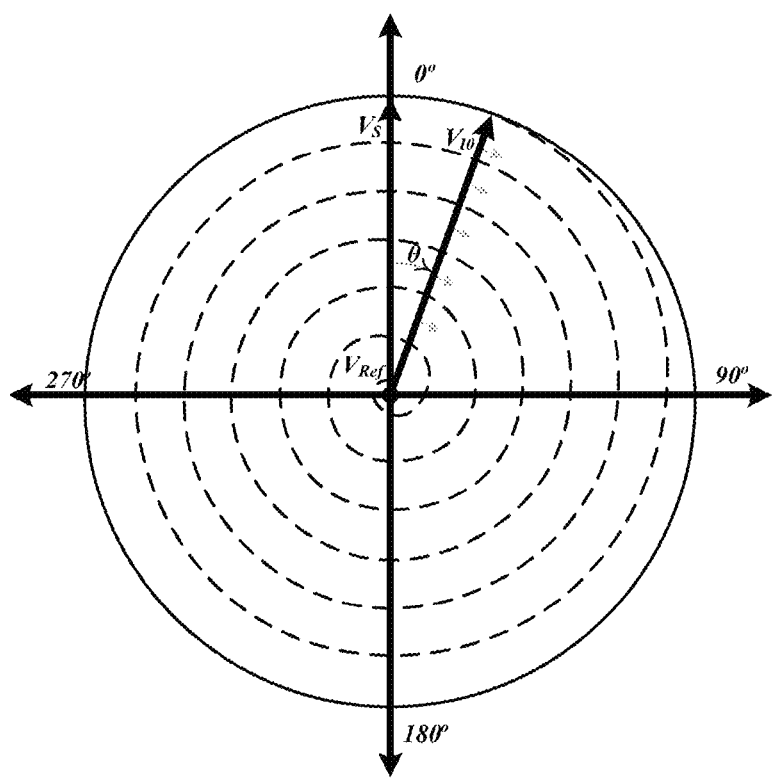
FIG. 26A illustrates the phase angle relationship between one phase of the source voltage and the respective phase on the motor's internally generated voltage (i.e., from the rotor's magnetic field) at the instant the motor is disconnected from its source voltage.
Figure 26B:
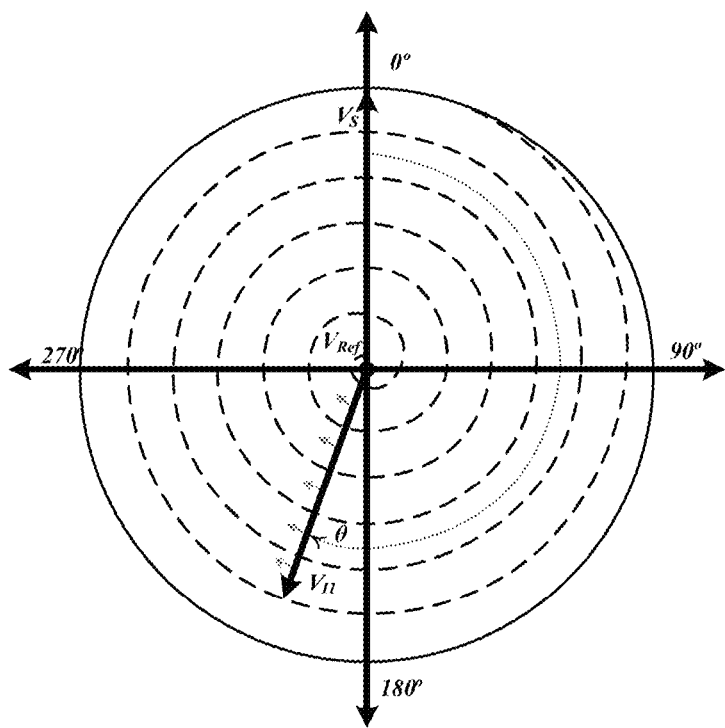
FIG. 26B illustrates the change in the phase angle relationship between the source voltage and the motor's internally generated voltage (i.e., from the rotor's magnetic field) as the rotor slows down after being disconnected.
Figure 26C:
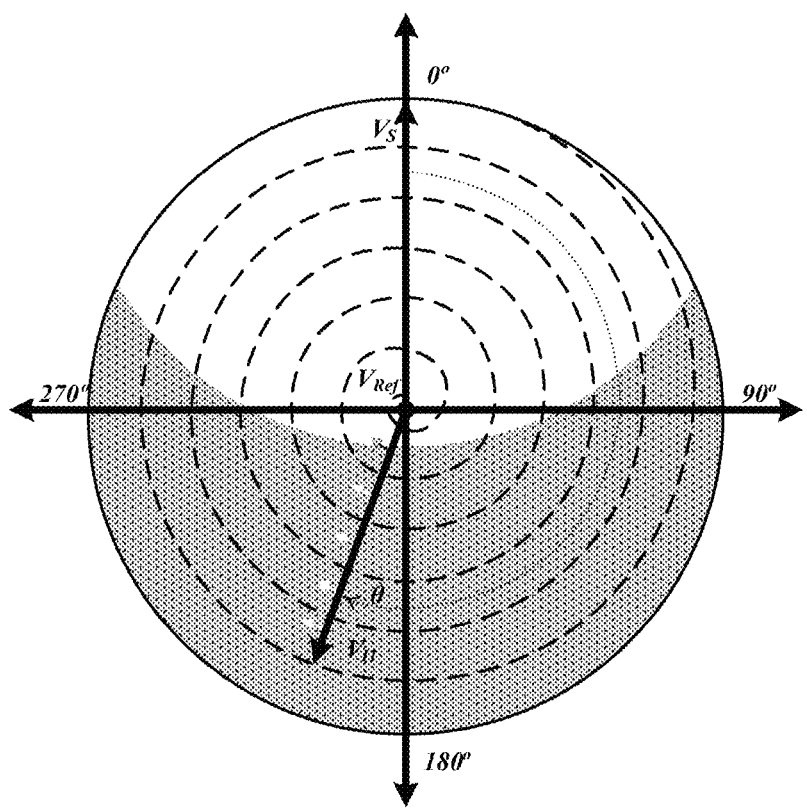
FIG. 26C highlights the area of potential damage (using a 110% threshold) in the phasor diagram when reconnecting a motor to its source voltage.
Figure 26D:
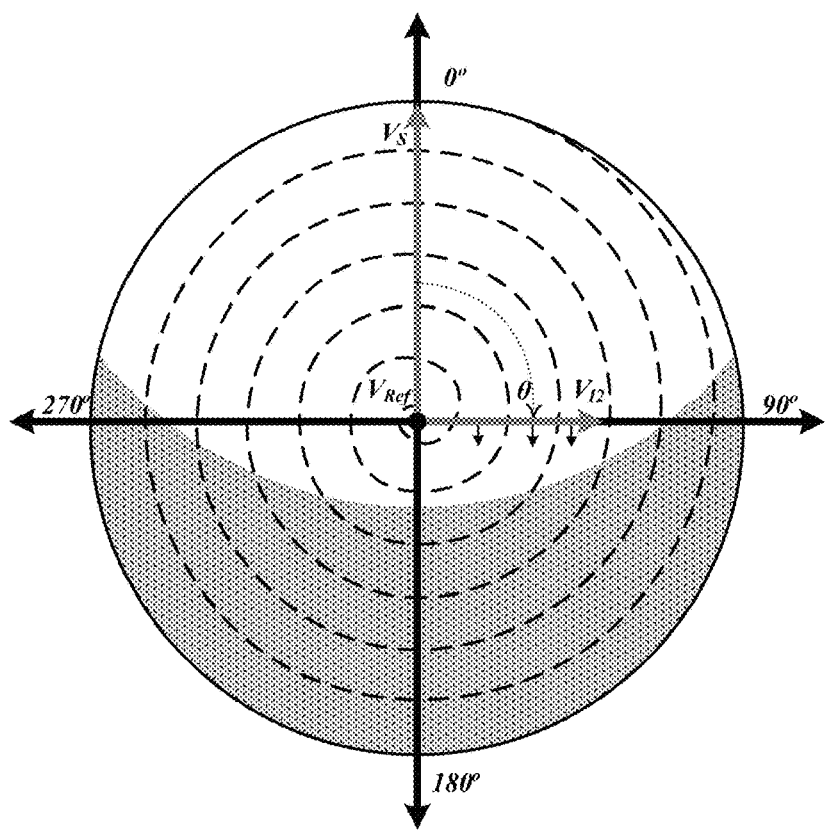
FIG. 26D highlights the area of potential damage (using a 125% threshold) in the phasor diagram when reconnecting a motor to its source voltage.
Figure 26E:
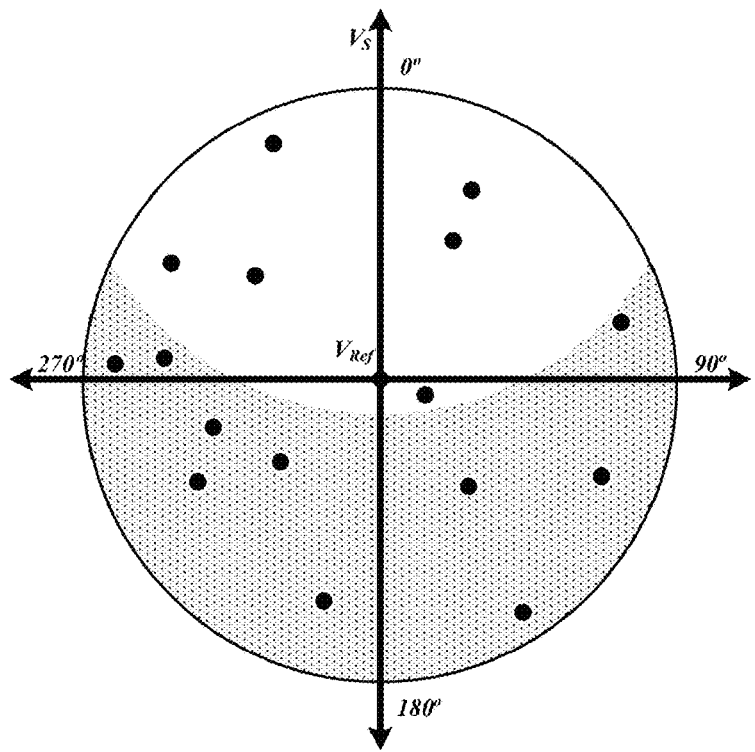
FIG. 26E highlights switching transient occurrences over an arbitrary time period in the phasor diagram.

To further expound on this example, FIGS. 26-26E are used to illustrate the relative effects on voltage magnitudes and phase angles, between the source voltage ($V_S$) and the motor's internal voltage ($V_I$). (Note: The angle locations in graphs 26-26E may not agree with commonly accepted nomenclature for labeling axes and phase angles; for example, 0° is normally shown on the positive x-axis, 90° is normally shown on the positive y-axis, and so forth. While it is likely more common to use the accepted nomenclature for referencing angle labels and phasor placements, the nomenclature used herein is intentional to help more clearly illustrate and discuss the key concepts.)

In FIG. 26, shows an example of the phasor relationship between the source voltage ($V_S$) and the motor's internal voltage ($V_I$) during the normal operation of a motor. The source/line voltage ($V_S$) is the reference phasor (shown by arrow $V_S$) and is arbitrarily shown on the y-axis at 0° (i.e., 12 o'clock). The motor's internal voltage ($V_I$), shown by arrow $V_I$, lags the source voltage ($V_S$) by a phase angle (θ). The phase angle (θ) between the source voltage and motor's internal voltage will vary slightly as the motor load increases and decreases during the motor's operation. One analogy might be phasor $V_S$ is spinning counterclockwise around the graph's origin while pulling phasor $V_I$ using the dotted arrow with a length of θ. In reality, the source voltage ($V_S$) phasor is spinning counterclockwise around the graph's origin with the motor's internal voltage ($V_I$) spinning with, and relative to, the source voltage ($V_S$).

FIG. 26A illustrates the instant the source is removed/disconnected from the motor (e.g., the contacts (C) are opened in FIG. 24, the circuit is opened in FIG. 25, etc.). At the point when the motor's internal voltage ($V_{I0}$) is disconnected from the source voltage ($V_S$), t=0, the motor's rotor begins to slow down. Initially (at t=0), the motor's internal voltage ($V_{I0}$) is still fully available/intact; however, the arrow shown perpendicular to the internal voltage phasor ($V_{I0}$) indicate the direction $V_I$ begins to move relative to the source voltage phasor $V_S$ after the disconnect occurs. It should be noted that the rotor speed's rate of decay may not be linear.

FIG. 26B illustrates a later time (t=1) after the source is removed/disconnected from the motor. At this point, the internal voltage phasor ($V_{I1}$) has moved approximately 180° behind its original location due to the motor rotor's decaying speed (i.e., θ≈200°). As indicated by the dashed-spiral, the magnitude of the internal voltage phasor ($V_{I1}$) has slightly attenuated as the motor's magnetic field to collapse. In this instant, the voltage difference between the source/line voltage ($V_S$) and the motor's internal voltage ($V_{I1}$) is almost twice the original difference between the two phasors at t=0.

As the motor's rotor continues to slow relative to the source voltage ($V_S$) . . . and in reality, the motor's internal voltage phasor ($V_I$) will again approach the source voltage phasor's ($V_S$) phase angle. The phase angle difference between the motor's internal voltage ($V_I$) and the source/line voltage ($V_S$) begins to decrease until the two are again in phase with each other and the difference is minimized. And as indicated by the dashed-spiral, the magnitude of the internal voltage phasor ($V_I$) continues to decay exponentially as the motor's rotor slows down and its magnetic field continues to collapse.

FIG. 26C is identical to FIG. 26B, with the exception of a shaded area on the bottom portion of the graph. This shaded area represents the potential damage zone for reconnecting the motor's terminals to its source voltage ($V_S$), and is a novel approach to analyze, quantify, view and resolve power quality issues using the phasor domain. The shaded area in FIG. 26C is uniquely calculated using the relationship between the magnitudes and phase angles of the source voltage ($V_S$) and the motor's internal voltage ($V_I$), and shows the range where a 110% threshold is met or exceeded. The shaded damage zone area is normalized, meaning it is agnostic of the original voltage levels and/or phase angles. For example, the same shaded damage zone/area concept applies equivalently for motors on 208-volt systems, 480-volt systems, or any other nominal voltage system.

When the magnitude and phase angle of the motor's internal voltage (i.e., the phasor $V_I$) falls within the potential damage zone (i.e., shaded area), the voltage difference between the motor's internal voltage ($V_I$) and the source/line voltage ($V_S$) exceeds 110% of the nominal system voltage. Based on a damage threshold of 110%, reconnecting the source to the motor may result in stress, damage or failure/eventual failure of the motor. It may also produce a voltage transient event that can propagate (locally) within the electrical system, depending on the local impedance(s) and switching transient voltage.

Some motors may allow a greater tolerance regarding the threshold setting; some less. There may be a tradeoff between the risk of impacting a process by letting the motor's rotor completely stop before restarting it and the risk of motor damage due to re-energizing it out of phase. FIG. 26D illustrates a graph similar to FIG. 26C; however, a 125% damage threshold is used. Notice, the shaded area of the graph (i.e., the potential damage zone) is slightly smaller than was provided in FIG. 26C. This is consistent because increasing the potential damage threshold will provide greater freedom to reconnect the motor to its voltage source. FIG. 26D also indicates the motor's internal voltage ($V_{I2}$) is at a different phase angle ($\approx 90°$) and its magnitude is reduced; however, this is only for illustrative purposes.

FIG. 26E shows a phasor diagram plot of all the switching transient occurrences captured over an arbitrary time period as measured by a single IED. Each marker (•) indicates the magnitude and phase angle of the regenerative voltage when the motor was reconnected to the source voltage. The shaded area in this diagram is based on a >=110% threshold and the markers in the shaded area exceed this threshold. The markers in the unshaded area are below the threshold of 110%, so would be considered as acceptable. The source voltage is shown at the top ($V_S$) and the reference voltage ($V_{Ref}$) is in the center of the phasor diagram. This diagram is useful for quantifying the issue at the discrete IED, but the data can also be aggregated from multiple IEDs onto a single phasor diagram to provide system analysis of the issue.

As previously noted in this disclosure, switching transients can damage motors and impact surrounding/adjacent equipment. Recognizing, analyzing and/or mitigating this issue are example objectives of this invention.

Described below are several flowcharts (or flow diagrams) illustrating example methods (here, methods 2700, 2800, 2900, 3000) of the disclosure relating to recognizing, analyzing and/or mitigating the impact of switching transients on motors and/or other equipment in an electrical system. As will appreciated from further discussions below, in some instances one or more aspects or features (e.g., blocks) of one of the flow diagrams may be used in one or more other flow diagrams, and may be modified, etc. For example, as will be discussed further in connection with method 2800 illustrated in FIG. 28, in some instances method 2800 may correspond to an example implementation of method 2700 illustrated in FIG. 27, with various features of method 2700 being modified, expanded on, etc. in method 2800.

Figure 27:
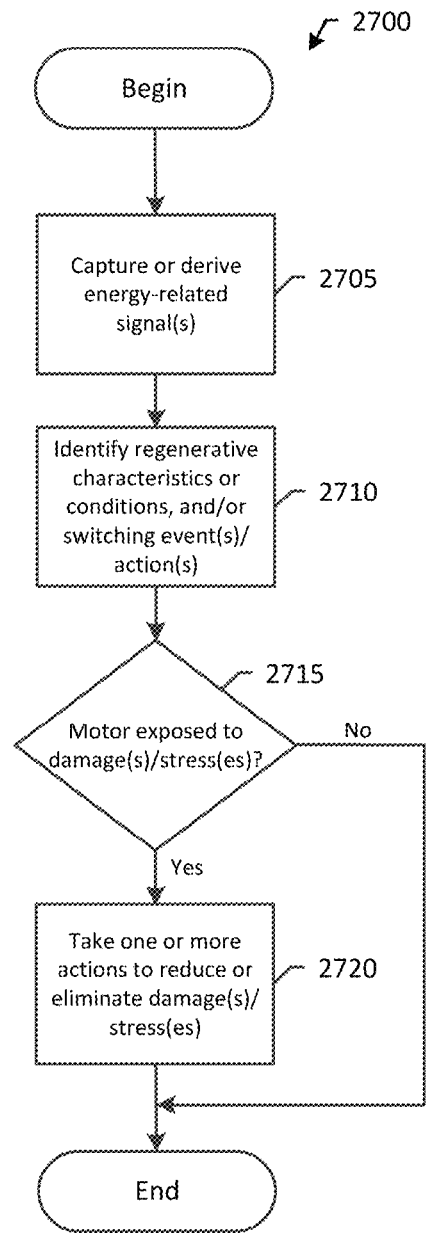
FIG. 27 is a flow diagram illustrating an exemplary method for analyzing effects of motor regeneration characteristics or conditions in an electrical system in accordance with embodiments of this disclosure.

Referring first to method 2700 shown in FIG. 27, a flowchart illustrates an example method 2700 for analyzing effects of motor regeneration characteristics or conditions in an electrical system in accordance with embodiments of this disclosure. Method 2700 may be implemented, for example, on a processor of at least one IED in an electrical system and/or remote from the at least one IED, for example, in at least one of: a cloud-based system, on-site/edge software, a gateway, or other head-end system. The at least one IED, the cloud-based system, the on-site/edge software, the gateway, and/or other head-end system may be coupled (communicatively or otherwise) to one or more motor(s), for example.

As illustrated in FIG. 27, the method 2700 begins at block 2705, where at least one energy-related signal is captured, measured or derived using one or more IEDs in the electrical system. For example, the at least one energy-related signal may be captured, measured or derived using one or more IEDs located proximate to: the at least one operational motor for which the regenerative characteristics or conditions are identified in the electrical system, and/or to the switching event(s)/action(s) producing a switching transient in the electrical system. In accordance with some embodiments of this disclosure, the at least one energy-related signal includes at least one voltage signal. The at least one voltage signal may include, for example, at least one of: a single-phase voltage signal and three-phase voltage signals.

At block 2710, electrical measurement data from, or derived from, the at least one energy-related signal is processed to identify at least one of: regenerative characteristics or conditions associated with at least one operational motor in the electrical system, and/or a switching event(s)/action(s) producing (or potentially producing) a switching transient in the electrical system. In one example embodiment, the regenerative characteristics or conditions may be caused by an energy source being disconnected from the at least one operational motor, for example.

At block 2715, the identified regenerative characteristics or conditions and/or the switching event(s)/action(s) from the electrical measurement data is/are analyzed to determine if the at least one operational motor is exposed (or potentially exposed) to damage(s)/stress(es) from the identified regenerative characteristics or conditions and/or the switching event(s)/action(s). If it is determined the at least one operational motor is exposed (or potentially exposed) to damage(s)/stress(es) from the identified regenerative characteristics or conditions and/or the switching event(s)/action(s), the method may proceed to block 2720. Alternatively, if it is determined the at least one operational motor is not exposed (or not potentially exposed) to damage(s)/stress(es) from the identified regenerative characteristics or conditions and/or the switching event(s)/action(s), the method may end or return to block 2705 (e.g., for capturing or deriving additional energy-related signal(s) in some embodiments. In other embodiments, an indication or notification may be provided or made to denote that the at least one operational motor is not exposed (or not potentially exposed) to damage(s)/stress(es). The indication or notification may be a visual notification (e.g., email, text, etc.) and/or an audible notification (e.g., sound(s)), for example.

At block 2720, in response to determining the at least one operational motor is exposed (or potentially exposed) to damage(s)/stress(es) from the identified regenerative characteristics or conditions and/or the switching event(s)/action(s), one or more actions may be taken or performed to reduce or eliminate at least one of: the damage(s)/stress(es) to the at least one operational motor and the damage(s)/stress(es) to other components in the electrical system from the identified regenerative characteristics or conditions and/or the switching event(s)/action(s). In one example implementation, the one or more actions include identifying at least one means to mitigate or eliminate at least one of: the damage(s)/stress(es) to the at least one operational motor and the damage(s)/stress(es) to other components in the electrical system. The one or more actions may also include selecting one or more of the at least one mitigation or elimination means based on priority and/or severity of: the damage(s)/stress(es) to the at least one operational motor and/or the damage(s)/stress(es) to other components, and at least one of indicating and applying the selected one or more of the at least one mitigation or elimination means. In accordance with some embodiments of this disclosure, at least one plot may be generated, the at least one plot indicating at least one of: a point or points where reenergization occurred with respect to the phase angle, and the selected one or more of the at least one mitigation or elimination means.

In embodiments in which the regenerative characteristics or conditions associated with at least one motor in the electrical system are determined to be due to switching transient in the electrical system, the one or more of the at least one mitigation or elimination means may include at least one transient mitigative device, for example. The at least one transient mitigative device may include, for example, at least one of: a surge arrester, a lightning arrestor, a surge suppressor, transient voltage surge suppressor, line reactor, regenerative load bank, and an isolation transformer.

Subsequent to block 2720, the method may end in some embodiments. In other embodiments, the method may return to block 2705 and repeat again (e.g., for capturing or deriving additional energy-related signal(s)). In some embodiments in which the method ends after block 2720, the method may be initiated again in response to user input, automatically, periodically, and/or a control signal, for example.

It is understood that method 2700 may include one or more additional or alternative blocks or steps in some embodiments, as will be appreciated from further discussions below.

Figure 28:
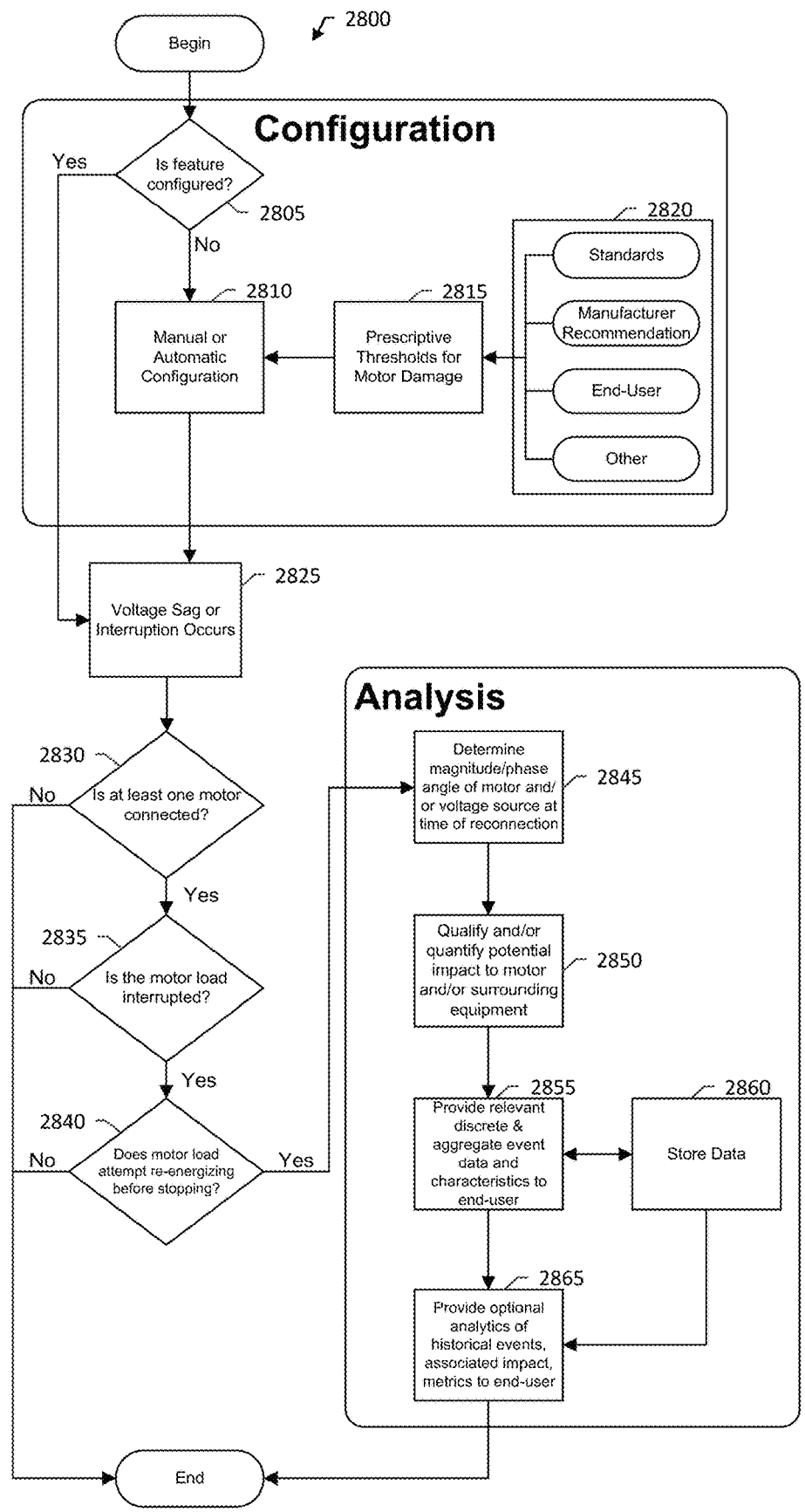
FIG. 28 is a flow diagram illustrating an exemplary method for identifying switching events/actions with motor(s) in accordance with embodiments of this disclosure.

Referring to FIG. 28, a flowchart illustrates an example method 2800 for identifying switching events/actions with motor(s) in accordance with embodiments of this disclosure. In accordance with some embodiments of this disclosure, method 2800 corresponds to an example implementation of method 2700 discussed above in connection with FIG. 27. Similar to method 2700, method 2800 may be implemented on a processor of at least one IED in an electrical system and/or remote from the at least one IED, for example, in at least one of: a cloud-based system, on-site/edge software, a gateway, or other head-end system. The at least one IED, the cloud-based system, the on-site/edge software, the gateway, and/or the other head-end system may be coupled (communicatively or otherwise) to one or more motor(s), for example.

As illustrated in FIG. 28, the method 2800 begins at block 2805, where configuration information relating to identifying switching events/actions with motor(s) is evaluated. In particular, at block 2805, it is determined if feature(s) associated with identifying switching events/actions with motor(s) is configured, for example, on at least one IED and/or a cloud-based system, on-site/edge software, a gateway, or other head-end system responsible for monitoring the motor(s). Example parameters or features to be configured may include, for example, damage threshold of motor (e.g., 110%, 125%, etc.), existence of connected motor, location of connected motor, other recommendations regarding motor, criticality of motor to operation, cost of motor, impact of motor on product quality, technical information such as size of motor, driven load, time constant (if available), etc.

At block 2805, in response to determining the feature(s) are configured, the method may proceed to block 2825. Alternatively, if it is determined the feature(s) are not configured, the method may proceed to block 2810. At block 2810, the device(s) responsible for monitoring the motor(s), hereinafter indicated as the above-discussed at least one IED for simplicity, may be automatically, semi-automatically or manually configured. For example, prescriptive thresholds for detecting motor damage may be set on the at least one IED, as indicated by block 2815. In accordance with some embodiments of this disclosure, the prescriptive thresholds (and other information) may be set or configured based on one or more standards, motor types, manufacturer recommendations, user input (e.g., from an end-user) and/or other sources. After configuration of the at least one IED at block 2810, the method may proceed to block 2825.

At block 2825, energy-related signals (or waveforms) are captured, stored, etc. by the at least one IED in the electrical system including the at least one IED and the motor(s) to be monitored. The at least one IED may be installed or located, for example, at a respective metering point of a plurality of metering points in the electrical system. In some embodiments, the at least one IED may be coupled to one or more of the motor(s), and the energy-related waveforms captured by the at least one IED may be associated with the motor(s) to which the at least one IED is coupled. The captured energy-related signals may include, for example, at least one of: voltage waveform(s), current waveform(s), power waveform(s), derivatives of voltage, current and/or power waveforms, integrals of voltage, current and/or power waveforms, and any (or substantially any) other energy-related signal/waveform derived from the voltage and/or current signatures. The voltage and/or current signals/waveforms may include, for example, single-phase or three-phase voltage and current signals/waveforms.

At block 2825, electrical measurement data from, or derived from, the energy-related signals is processed to identify voltage sags, voltage/current transients, and/or other interruptions (collectively, referred to as "anomalous conditions") in the electrical system. In accordance with some embodiments of this disclosure, the anomalous conditions are identified based on one or more characteristics of the energy-related signals/waveforms meeting at least one criteria indicative of an anomalous condition (or disturbance). For example, anomalous conditions may be identified due to the magnitude, duration, phase jump and/or other characteristics of a detected electrical event meeting disturbance classification criteria. For example, in one embodiment the anomalous conditions identified in the electrical system include characteristics indicative of a voltage sag, or transient voltage or current conditions in the electrical system. The characteristics indicative of the transient voltage or current conditions may include, for example, at least one of: (a) sudden, non-power frequency changes in voltage, current, or both voltage and current that is unidirectional in polarity, and (b) sudden non-power frequency change in voltage, current, or both voltage and current that is bidirectional in polarity. In accordance with some embodiments of this disclosure, the classification criteria may be established by IEEE Standard 1159-2019 or other standards or methods (e.g., user-defined classifications) in which classification criteria may be defined.

In response to detecting at least one anomalous condition at block 2825, the method may proceed to block 2830. At block 2830, it may be determined if there is at least one operational motor connected to the at least one IED detecting the at least one anomalous condition. In accordance with some embodiments of this disclosure, this determination (and the determinations also made at block 2835, 2840, etc. described below) may be performed using algorithms to evaluate relevant signal data, by using I/O status to indicate attempts to restart motor, and/or by some other control signal input (e.g., PLC, etc.), for example. The presence of the motor(s) may also be configured manually in some embodiments.

At block 2830, in response to determining at least one operational motor is connected to the at least one IED, the method may proceed to block 2835. Alternatively, in response to determining at least one operational motor is not connected to the at least one IED, the method may end or return to block 2825 (e.g., for detecting anomalous conditions using other IEDs in the electrical system that may be connected to motor(s)).

At block 2835, it may be determined if the at least one operational motor (i.e., motor load) is interrupted (e.g., based on an analysis of various relevant signal data). In one example implementation, the determination may be performed by analyzing pre-event/post-event data from the IED to identify an impact. The determination can also be performed by analyzing status changes in the system such as I/O (e.g., digital status) indications from the motor. Other processes/methods for making the determination are, of course, possible.

At block 2835, if it is determined the at least one operational motor is not interrupted, the method may end or return to block 2825 (e.g., for detecting future anomalous conditions that may impact the at least one operational motor). Alternatively, if it is determined the at least one operational motor is interrupted, the method may proceed to block 2840.

At block 2840, it may be determined whether the at least one operational motor attempts re-energizing before stopping. If it is determined the at least one operational motor does not attempt re-energizing before stopping, the method may end or return to block 2825 (e.g., for detecting subsequent anomalous conditions that may impact the at least one operational motor). Alternatively, if it is determined the at least one operational motor does attempt re-energizing before stopping, the method may proceed to block 2845 for further analysis.

At block 2845, magnitude/phase angle of the at least one operational motor and/or voltage source at time of reconnection may be determined (e.g., based on an analysis of various relevant signal data). For example, determining the magnitude and phase angle may depend on the location of the at least one IED monitoring the at least one operational motor. An IED may measure the source voltage, the motor's regenerated voltage or both, for example. In accordance with some embodiments of this disclosure, measuring both phasors is optimal and will provide accurate magnitude and phase relationships between the source voltage and the motor's regenerative voltage. Additionally, in accordance with some embodiments of this disclosure, it is possible to only measure the motor's regenerative voltage and predict the source voltage by extrapolating/extending a 60 Hertz signal (or whatever the nominal frequency of the pre-event signal is) in phase with the source voltage signal through the event to use as an approximate/derived reference for the source voltage. In accordance with some embodiments of this disclosure, more configuration would be required if only the source voltage is available. For example, system historical data from multiple IEDs would be useful to ascertain the motor's time constant. Additionally, the motor's time constant (and/or time to stop) could also be manually provided. Historical switching events/actions could be analyzed to identify their effects/impacts, and characteristics could be determined posteriori for configuration data and use, for example. From the measured or derived information, it would be possible to calculate/estimate the phase difference between the source voltage and motor's regenerative voltage upon reconnection.

At block 2850, potential impact(s) to the at least one operational motor and/or surrounding equipment (i.e., equipment proximate to the at least one operational motor in the electrical system) may be qualified and/or quantified. For example, qualifying the potential impact(s) to the at least one operational motor may be performed by determining whether the difference between the source voltage phasor and motor's regenerative voltage phasor exceed the potential damage threshold. Additionally, quantifying the potential impact(s) to the at least one operational motor may be performed by providing approximately how much the difference between the source voltage phasor and the motor's regenerative voltage phasor exceeded the potential damage threshold. Qualifying the potential impact to surrounding equipment may be performed by determining whether a corresponding transient voltage and/or current event corresponded with the switching event(s)/action(s). It is understood that loss of load (i.e., loads de-energizing due to the event) may be another factor in qualifying the event. Lack of capturing any corresponding transient event associated with the switching event(s)/action(s) may indicate the need for more capable IEDs able to capture transient events, for example.

At block 2855, relevant discrete and aggregate event data and characteristics may be provided to one or more end-users. For example, information related to switching transients and determined/derived from the two blocks above (phase angles, magnitudes, differences, qualifying and/or quantifying information, impacts, the need for more capable IEDs, etc.) may be provided here. Additionally, aggregated information from multiple IEDs related to the switching transient for the same event may be provided here. This may be used to determine the extent of the propagation of the effects, impacted equipment, total impact, magnitude, duration, etc. of the switching transient through the electrical system, for example. Event sources leading to switching event(s)/action(s) conditions may be appended to events to help mitigate root cause(s) of switching event(s)/action(s) conditions, for example.

In accordance with some embodiments of this disclosure, the relevant discrete and aggregate event data and characteristics determined/identified at block 2855 may be communicated to the end-user(s) in at least one of: a text, an email, a report, appendant to an alarm, an audible communication, and a communication on an interface of a screen/display. In accordance with some embodiments of this disclosure, the information may be stored, for example, on at least one memory device associated with the at least one IED at block 2760. The at least one memory device may include, for example, at least one local memory device (e.g., memory in the at least one IED) and/or at least one remote memory device (e.g., cloud-based memory).

Subsequent to block 2860, the method may end in some embodiments. In other embodiments, optional analytics may be provided at block 2865. The optional analytics may include, for example, analytics relating to historical events, associated impact, etc., to the end-user(s). For example, summary information received, or derived, from one or more IEDs relating to the present switching event(s)/action(s) may be provided here. For example, historical data (from stored data) may be used for summing/enumeration/counts, comparisons, contrasts, trends, periodicities, time of occurrences, and so forth, with regard to the present switching event(s)/action(s) or cumulative switching events/actions. In one embodiment, the summary information may use historical data to help determine whether the switching transient event is a chronic issue or arbitrary/random issue. Additionally, new metrics may be considered with regard to the impact of switching events/actions to better understand the impact of equipment (including motor(s)), operational costs, productivity, maintenance costs, downtime/uptime, causes, effects, reliability, other performance indices, energy costs, product quality, efficiencies, and so forth. In accordance with some embodiments of this disclosure, information relating to the optional analytics provided at block 2865 may be stored, for example, on the above-discussed at least one memory device associated with the at least one IED (e.g., at least one local memory device and/or at least one remote memory device).

Subsequent to block 2865, the method may end in some embodiments. In other embodiments, the method may return to block 2825 (or other blocks) and repeat again (e.g., to further monitor the motor(s) in the electrical system). In some embodiments in which the method ends after block 2860, the method may be initiated again in response to user input, automatically, and/or a control signal, for example.

It is understood that method 2800 may include one or more additional blocks or steps in some embodiments, as will be apparent to one of ordinary skill in the art. Additionally, it is understood that method 2800 may be performed on only a subset of the blocks, and the order of the blocks may be changed. Other example aspects of this invention are described below in connection with methods 2900 and 3000, for example.

Figure 29:
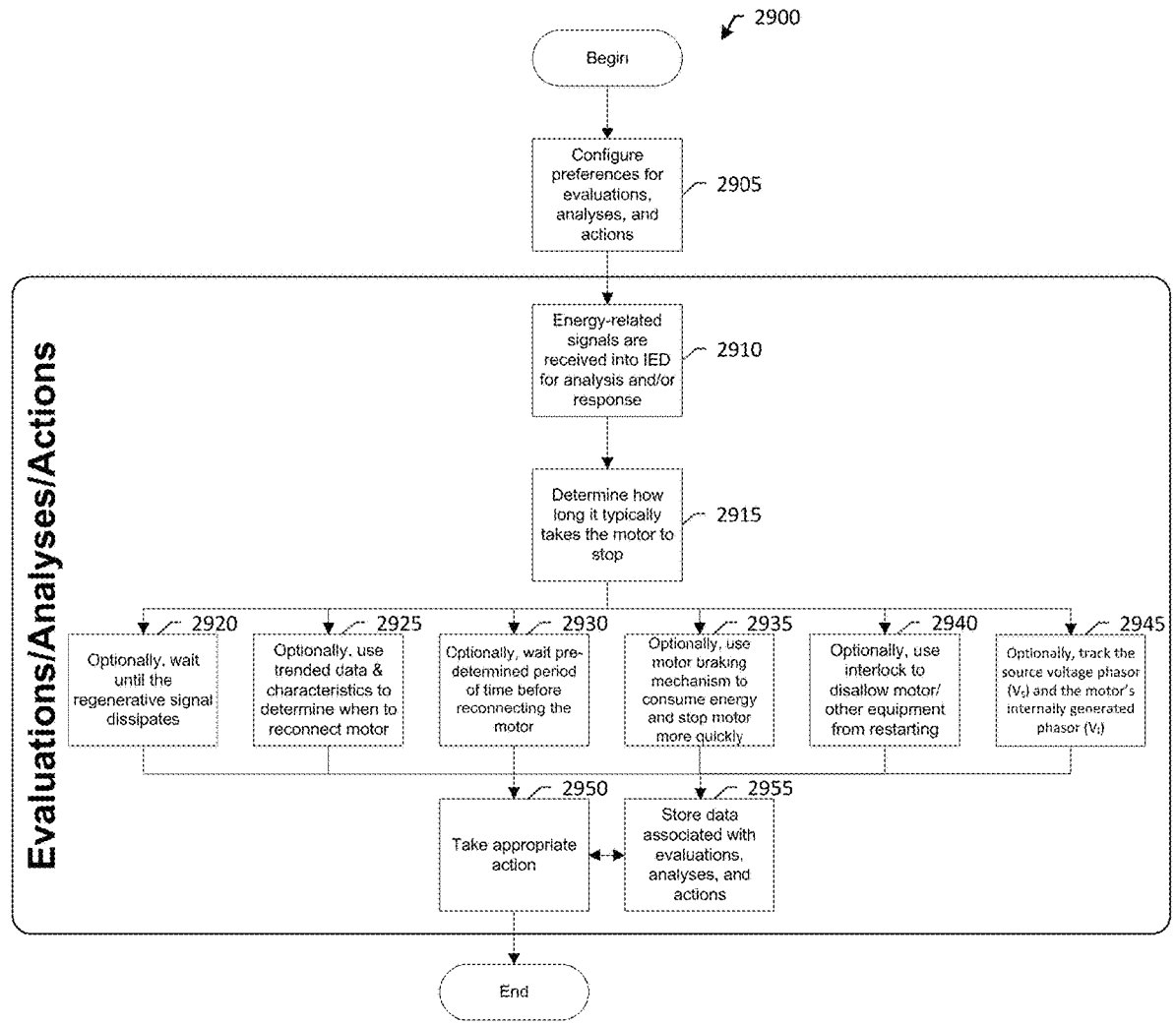
FIG. 29 is a flow diagram illustrating exemplary real-time functionality for switching events/actions in accordance with embodiments of this disclosure.

Referring now to FIG. 29, shown is a flow diagram illustrating exemplary real-time functionality for switching events/actions in accordance with embodiments of this disclosure. In accordance with some embodiments of this disclosure, the features illustrated by method 2900 in FIG. 29 are located on or near a motor due to the rapid measurement and response time required. For example, suitable locations for real-time functionality may be motor control centers, relays, breakers or other disconnecting means, meters, local gateways, control schemes, otherwise independent IEDs, and so forth.

As illustrated in FIG. 29, the method 2900 begins at block 2905 where preferences for evaluations, analyses, and actions are configured, for example, on the device(s) on which the method 2900 is implemented. The preferences may include, for example, user-configured preferences, manufacturer preferences, preferences from standards, etc. For simplicity of discussions herein, the method 2900 will be described as implemented on at least one IED proximate to at least motor monitored by the at least one IED. However, as noted above, the method 2900 may be implemented on any number and type of devices.

At block 2910, energy-related signals (or waveforms) may be received by the at least one IED for analysis and/or response. In accordance with embodiments of this disclosure, the energy-related signals are captured, received, and analyzed in real-time or pseudo real-time. The at least one IED may be coupled to the at least one operational motor, and the energy-related signals may be associated with the at least one operational motor. The energy-related signals may include voltage and/or current signals (and any number of other signals or derived signals), for example.

At block 2915, the energy-related signals are analyzed to determine how long it typically takes the at least one operational motor's rotor to stop before restarting. As illustrated in FIG. 29, a fixed delay period of time may be taken before making the determination (as indicated by block 2920). Additionally, the determination may be made after waiting until the regenerative signal dissipates (as indicated by block 2925). The determination may also be made using a historical trend value to restart the motor (as indicated by block 2930). A braking mechanism may be provided to consume the regenerative energy through a connected load or load bank to stop the at least one operational motor more quickly (as indicated by block 2935). Additionally, the determination may be made after employing a signal interlock to disable motor restarts until conditions are acceptable (as indicated by block 2940). Further, the source voltage phasor ($V_S$) and the at least one operational motor's internally generated phasor ($V_I$) may be tracked to determine when it's acceptable to reconnect the at least one operational motor to its voltage source (as indicated by block 2945). In accordance with some embodiments of this disclosure, the tracking may occur by evaluating (in real-time) the two phasors ($V_S$ and $V_I$ from FIGS. 26-26D) and allowing the at least one operational motor's controls (internal or external) to re-energize the at least one operational motor only while the at least one operational motor is not in the potential damage zone. Conversely, the at least one operational motor's controls may inhibit the at least one operational motor from restarting while the at least motor's internally generated phasor ($V_I$) is in the potential damage zone. Naturally, this would require the configuration of the damage threshold for the motor.

At block 2950, in response to the determination(s) made at one or more of blocks 2920, 2925, 2930, 2935, 2940 and 2945, one or more actions may be taken to address switching events/actions to reduce or minimize impacts of the switching on the at least one operational motor and/or other components in the electrical system. For example, one or more mitigation devices may be switched on/switched into the electrical system (e.g., proximate to the at least one operational motor). For example, the braking mechanism proximate to the at least one operational motor may be enabled to stop the motor's rotor more quickly. Other control mechanisms may be employed to reduce the impact to the motor and/or other locally connected loads. Additionally, the anomalous conditions may be analyzed and used to specify higher sampling rate devices and/or configurations to better measure/evaluate/identify regenerative conditions.

As illustrated in FIG. 29, in accordance with some embodiments of this disclosure data associated with the evaluations, analyses, and/or actions performed may be stored at block 2955. For example, the stored data may be used for subsequent switching events/actions to minimize their effects by a number of means including changing configurations (e.g., blocks 2920-2945, sample rates, etc.), making recommendations (e.g., load bank sizes, SPD locations, etc.), and so forth. The stored data may additionally or alternatively be used to develop historical trends for block 2925, for example. The data may be stored, for example, on at least one memory device associated with the at least one IED. The at least one memory device may include, for example, at least one local memory device (e.g., memory in the at least one IED) and/or at least one remote memory device (e.g., cloud-based memory).

Subsequent to block 2950 and/or block 2955, the method may end in some embodiments. In other embodiments, the method may return to block 2905 (or other blocks) and repeat again (e.g., for further evaluation(s)). In some embodiments in which the method ends after block 2950 and/or block 2955, the method may be initiated again in response to user input, automatically, and/or a control signal, for example.

It is understood that method 2900 may include one or more additional blocks or steps in some embodiments, as will be apparent to one of ordinary skill in the art. Additionally, it is understood that method 2900 may be performed on only a subset of the blocks, and the order of the blocks may be changed. Other example aspects of this invention are described below in connection with method 3000, for example.

Figure 30:
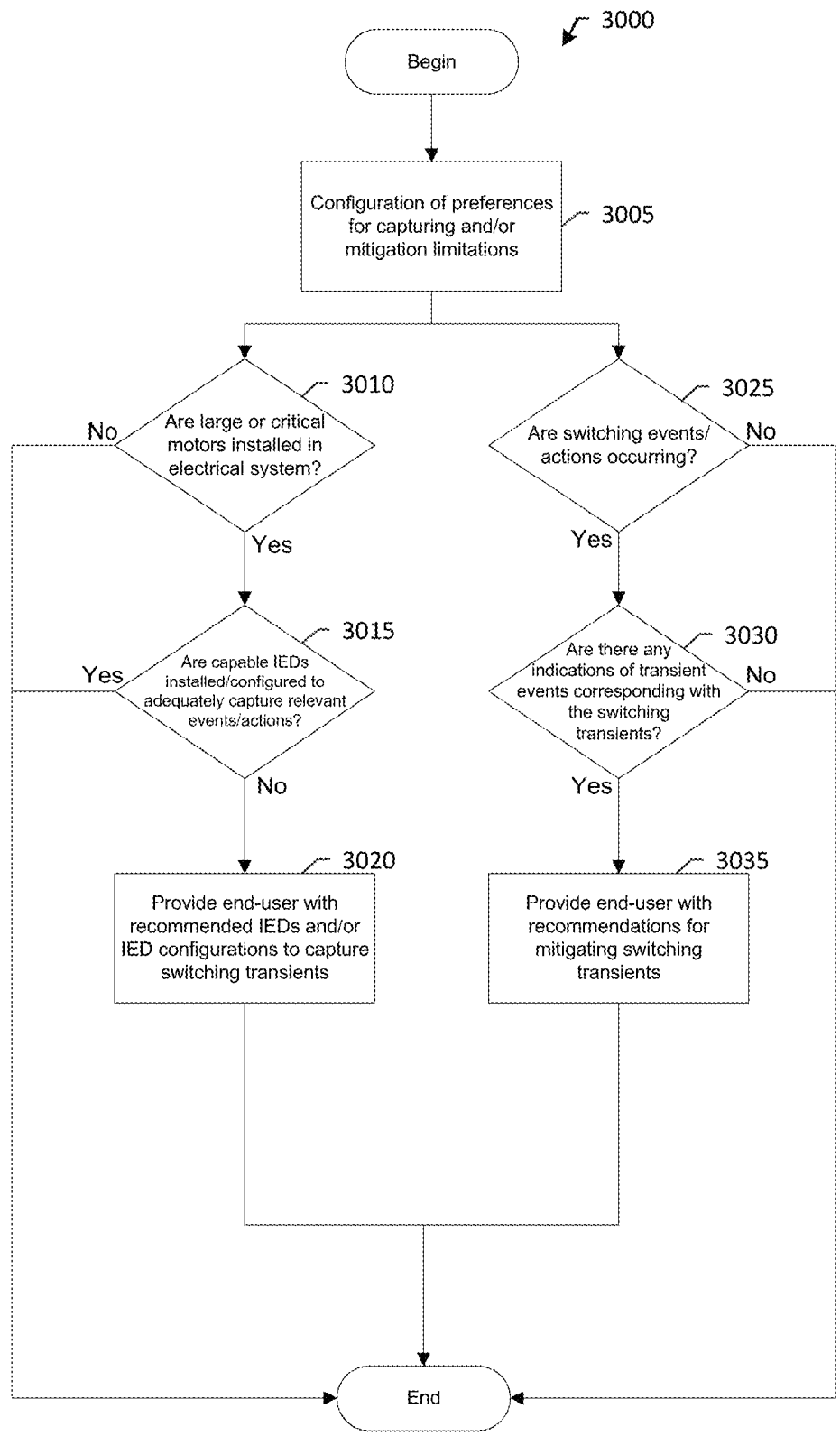
FIG. 30 is a flow diagram illustrating an exemplary method for capturing and mitigating switching events/actions in accordance with embodiments of this disclosure.

Referring now to FIG. 30, shown is a flow diagram illustrating an example method 3000 for capturing and mitigating switching events/actions in accordance with embodiments of this disclosure. In accordance with some embodiments of this disclosure, the mitigation may include installing SPDs, isolation transformers, line reactors or regenerative load banks near at least one operational motor in an electrical system to minimize transient voltage propagation through the electrical system. Various conditions may be used to specify higher sample rate devices, larger braking load banks, and/or configurations to better measure/evaluate regenerative conditions, for example, as will be further apparent from discussions below.

It is understood that method 3000 may be implemented, for example, on a processor of at least one IED in an electrical system and/or remote from the at least one IED, for example, in at least one of: a cloud-based system, on-site/edge software, a gateway, or other head-end system. The at least one IED, the cloud-based system, the on-site/edge software, the gateway, and/or the other head-end system may be coupled (communicatively or otherwise) to at least one operational motor in the electrical system.

As illustrated in FIG. 30, the method 3000 begins at block 3005 where preferences for capturing and/or mitigation limitations are configured, for example, on the device(s) on which the method 3000 is implemented. The preferences may include, for example, user-configured preferences, manufacturer recommendations, preferences from standards, presence of motors, etc. For simplicity of discussions herein, the method 3000 will be described as implemented on at least one IED proximate to at least motor monitored by the at least one IED. However, as noted above, the method 3000 may be implemented on any number of devices.

At block 3010, it is determined if there are any large or critical motors installed in the electrical system. If it is determined there are large or critical motors in the electrical system, the method proceeds to block 3015. Alternatively, if it is determined there are no large or critical motors in the electrical system, the method may end or proceed to block 3025.

At block 3015, in response to it having been determined there are large or critical motors in the electrical system, it is determined if there are capable IEDs installed/configured to adequately capture relevant events. If it is determined there are no capable IEDs installed/configured to adequately capture relevant events, the method proceeds to block 3020. Alternatively, if it is determined there are capable IEDs installed/configured to adequately capture relevant events, the method may end or proceed to block 3025.

At block 3020, in response to it having been determined there are no capable IEDs installed/configured to adequately capture relevant events, end-user(s) may be provided with recommended IEDs and/or IED configurations to capture switching transients. In accordance with some embodiments of this disclosure, the recommendations are provided to the end-user(s) via at least one of: a text, an email, a report, alarm, an audible communication, and a communication on an interface of a screen/display. Subsequent to block 3020, the method may end or proceed to block 3025.

At block 3025, it is determined if switching events/actions are occurring in the electrical system. For example, the at least one IED may analyze energy-related signals captured by the at least one IED to identify switching events/actions in the electrical system. If it is determined switching events/actions are occurring in the electrical system, the method may proceed to block 3030. Alternatively, if it is determined switching events/actions are not occurring in the electrical system, the method may end or proceed to block 3010 (e.g., in embodiments in which the analysis in method 3000 takes place first at block 3025 instead of block 3010).

At block 3030, in response to it having been determined switching events/actions are occurring in the electrical system, it is determined if there are any indications of transient events corresponding with the switching transients. If it is determined there are indications of transient events corresponding with the switching transients, the method proceeds to block 3035. Alternatively, if it is determined there are no indications of transient events corresponding with the switching transients, the method may end or proceed to block 3010 (e.g., in embodiments in which the analysis in method 3000 takes place first at block 3025 instead of block 3010).

At block 3035, in response to it having been determined there are indications of transient events corresponding with the switching transients, end-user(s) may be provided with recommendations for mitigating switching transients. In accordance with some embodiments of this disclosure, the recommendations are provided to the end-user(s) via at least one of: a text, an email, a report, an alarm, an audible communication, and a communication on an interface of a screen/display. The recommendations may advise the end-users to install one or more transient mitigative devices to mitigate the switching transients, for example. The transient mitigative devices may include at least one of: SPDs, isolation transformers, line reactors, regenerative load banks, surge arresters, lightning arrestors, surge suppressors, snubbers, transient voltage surge suppressors, for example.

In some embodiments, connecting load banks to the circuit to slow the motor's rotor down faster may also help minimize the issue. It is understood that the above-listed example recommendations and actions are but a few of many possible recommendations and actions, as will be apparent to one of ordinary skill in the art. Subsequent to block 3035, the method may end or proceed to block 3010 (e.g., in embodiments in which the analysis in method 3000 takes place first at block 3025 instead of block 3010).

Subsequent to block 3035 and/or block 3020, the method may end in some embodiments. In other embodiments, the method may return to block 3005 (or other blocks) and repeat again (e.g., for further evaluation(s)). In some embodiments in which the method ends after block 3035 and/or block 3020, the method may be initiated again in response to user input, automatically, and/or a control signal, for example.

It is understood that method 3000 may include one or more additional blocks or steps in some embodiments, as will be apparent to one of ordinary skill in the art. Additionally, it is understood that method 3000 may be performed on only a subset of the blocks, and the order of the blocks may be changed. For example, in some embodiments blocks 3025, 3030 and 2935 may be performed prior to blocks 3010, 3015 and 3020, or these blocks may be selectively performed or performed simultaneously.

As described above, and as will be further appreciated, processes and flow diagrams described herein may be used in different order, used in part or whole, as needed. Moreover, it is possible to use any one or more of the ideas described in this application, located within one processor or many, on premise or in the cloud, and so forth.

As also described above, and as will be further appreciated, identifying, analyzing and resolving the effects of switching events/actions and their associated impacts is important for the reliability of equipment, uptime of processes, and profitability of businesses relying on their rotating equipment. The above-discussed invention addresses those concerns to facilitate lower capital expenditures (CapEx), operational expenditures (OpEx) and maintenance expenditures (MaintEx).

CONCLUSIONS

Globally, voltage events such as sags/dips and short interruptions are the biggest contributor to losses related to power quality issues. Voltage events can be external (e.g., originate on the utility) or internal (e.g., originate inside the end-user's facility), anticipated (e.g., starting a large load) or unpredictable (e.g., a system fault), impactful (e.g., loads de-energize) or inconsequential (e.g., system continues to operate with no issues). Recognizing the existence of voltage perturbations and characterizing their properties (e.g., worst magnitude, duration, etc.) is not sufficient; it is important to understand the operational impact to differentiate nuisance events from disruptive events. Ascertaining the level of impact from voltage events (regardless of their origin) facilitates easier prioritizing and filtering metering system alarms, creating and trending historical effects from disruptive perturbations, and determining locations and sizes of mitigation equipment. Leveraging phasor analysis can help minimize potential equipment issues, for example.

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein (e.g., electrical system monitoring applications) but rather, may be useful in substantially any application where it is desired to identify, assess and mitigate selected power quality issues.

While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method to automatically identify power quality issues from at least one energy-related signal in an electrical system, comprising:
   capturing or deriving the at least one energy-related signal using one or more Intelligent Electronic Devices (IEDs) in the electrical system;
   processing electrical measurement data from, or derived from, the at least one energy-related signal to identify anomalous characteristics in the electrical system;
   in response to identifying the anomalous characteristics in the electrical system, determining a degree of voltage phase jump and a voltage sag magnitude based on or using the identified anomalous characteristics;
   displaying the degree of the voltage phase jump and voltage sag magnitude on at least one phasor diagram;
   analyzing the at least one phasor diagram to determine apparatus(es) to mitigate at least one of the identified anomalous characteristics; and
   overlaying one or more mitigative solution characteristics on one or more phasor diagrams of the at least one phasor diagram to take one or more actions based on determining the apparatus(es) to mitigate the at least one of the identified anomalous characteristics.

2. The method of claim 1, wherein the degree of the voltage phase jump and the voltage sag magnitude are each represented by at least one indication on the at least one phasor diagram.

3. The method of claim 2, wherein the at least one indication takes the form of at least one of: a phasor, a shape, a marker, a shading, a coloring, a heat map, a sound indicator, and an icon, the at least one indicator being representative of the degree of the voltage phase jump and the voltage sag magnitude.

4. The method of claim 3, wherein characteristics associated with the phasor, the shape, the marker, the shading, the coloring, the heat map, the sound indicator, and the icon are manually or automatically configured.

5. The method of claim 1, further comprising:
determining a duration of the identified anomalous characteristics; and
displaying the duration of the identified anomalous characteristics on the at least one phasor diagram.

6. The method of claim 5, wherein information relating to at least one of: the degree of voltage phase jump, the voltage sag magnitude, and the duration of the identified anomalous characteristics presented on the at least one phasor diagram is analyzed to determine the apparatus(es) to mitigate at least one of the identified anomalous characteristics.

7. The method of claim 1, wherein the one or more mitigative solution characteristics are indicated using at least one of: a shape, a marker, a shading, a coloring, a heat map, a sound indicator, and an icon, the at least one indicator being representative of the one or more mitigative solution characteristics.

8. The method of claim 1, wherein the one or more mitigative solution characteristics overlayed on the one or more phasor diagrams are associated with at least one range or zone where the one or more mitigative solution characteristics are determined to be capable of successfully mitigating at least one anomalous condition of the identified anomalous conditions within the at least one range or zone.

9. The method of claim 1, wherein the one or more mitigative solution characteristics include capability to resolve or mitigate at least one of: the voltage phase jump, the voltage sag magnitude and a duration of the identified anomalous characteristics.

10. The method of claim 1, wherein the at least one phasor diagram includes at least one of: information relating to the apparatus(es) of analyzed mitigative apparatus(es) to mitigate the at least one of the identified anomalous characteristics, and information relating to the identified anomalous characteristics, the information relating to the identified anomalous characteristics including at least one of: degree of phase jump, voltage sag magnitude and duration of the identified anomalous characteristics.

11. The method of claim 10, wherein the information relating to the apparatus(es) of analyzed mitigative apparatus(es) to mitigate the at least one of the identified anomalous characteristics, and the information relating to the identified anomalous characteristics, is shown by one or more indications, the one or more indications including at least one of: a shape, a marker, a shading, a coloring, a heat map, a sound indicator, and an icon.

12. The method of claim 1, wherein the one or more actions taken include:
indicating recurrent anomalous characteristics on one or more phasor diagrams of the at least one phasor diagram.

13. The method of claim 1, wherein the at least one energy-related signal includes at least one voltage signal, and the at least one voltage signal includes at least one of: a single-phase voltage signal and a three-phase voltage signal.

14. The method of claim 1, wherein the electrical measurement data is processed on at least one of: the one or more IEDs responsible for capturing the at least one energy-related signal, a cloud-based system, on-site/edge software, a gateway, and other head-end system, wherein the cloud-based system, on-site/edge software, the gateway, and the other head-end system are communicatively coupled to the one or more IEDs responsible for capturing the at least one energy-related signal.

15. The method of claim 1, wherein the identified anomalous characteristics are indicative of at least one power quality issue in the electrical system.

16. The method of claim 15, wherein the at least one power quality issue is identified based on an analysis of at least one of: the degree of voltage phase jump, the voltage sag magnitude, and a duration of the identified anomalous characteristics.

17. The method of claim 15, wherein the at least one power quality issue includes at least one voltage event, and the at least one voltage event includes at least one of: a voltage sag, a voltage swell, a voltage transient, a transient overvoltage event, a short-duration root mean square (rms) variation, and a long-duration rms variation.

18. The method of claim 1, wherein the at least one phasor diagram is presented on at least one display device, the at least one display device includes a display device of a system user and/or operator.

19. The method of claim 1, wherein the one or more actions are automatically performed by a control system associated with the electrical system, wherein the control system is communicatively coupled to the one or more IEDs responsible for capturing the at least one energy-related signal, and/or to a cloud-based system, on-site/edge software, a gateway, and other head-end system associated with the electrical system.

20. The system of claim 19, wherein the at least one phasor diagram includes at least one of: information relating to the apparatus(es) of analyzed mitigative apparatus(es) to mitigate the at least one of the identified anomalous characteristics, and information relating to the identified anomalous characteristics, the information relating to the identified anomalous characteristics including at least one of: degree of phase jump, voltage sag magnitude and duration of the identified anomalous characteristics.

21. The system of claim 20, wherein the information relating to the apparatus(es) of analyzed mitigative apparatus(es) to mitigate the at least one of the identified anomalous characteristics, and the information relating to the identified anomalous characteristics, is shown by one or more indications, the one or more indications including at least one of: a shape, a marker, a shading, a coloring, a heat map, a sound indicator, and an icon.

22. A system to automatically identify power quality issues from at least one energy-related signal in an electrical system, comprising:
at least one processor;
at least one memory device coupled to the at least one processor, the at least one processor and the at least one memory device configured to:
capture or derive the at least one energy-related signal using one or more Intelligent Electronic Devices (IEDs) in the electrical system;
process electrical measurement data from, or derived from, the at least one energy-related signal to identify anomalous characteristics in the electrical system;
in response to identifying the anomalous characteristics in the electrical system, determine a degree of voltage phase jump and a voltage sag magnitude based on or using the identified anomalous characteristics;
display the degree of the voltage phase jump and the voltage sag magnitude on at least one phasor diagram;
analyze the at least one phasor diagram to determine apparatus(es) to mitigate at least one of the identified anomalous characteristics; and
overlay one or more mitigative solution characteristics on one or more phasor diagrams of the at least one phasor diagram to take one or more actions based on determining the apparatus(es) to mitigate the at least one of the identified anomalous characteristics.

23. The system of claim 22, wherein the at least one processor and the at least one memory device of the system are further configured to:
  determine a duration of the identified anomalous characteristics; and
  display the duration of the identified anomalous characteristics on the at least one phasor diagram.

24. The system of claim 23, wherein information relating to at least one of: the degree of voltage phase jump, the voltage sag magnitude, and the duration of the identified anomalous characteristics presented on the at least one phasor diagram is analyzed to determine the apparatus(es) to mitigate at least one of the identified anomalous characteristics.

25. The system of claim 22, wherein the one or more mitigative solution characteristics are indicated using at least one of: a shape, a marker, a shading, a coloring, a heat map, a sound indicator, and an icon, the at least one indicator being representative of the one or more mitigative solution characteristics.

26. The system of claim 22, wherein the one or more mitigative solution characteristics overlayed on the one or more phasor diagrams are associated with at least one range or zone where the one or more mitigative solution characteristics are determined to be capable of successfully mitigating at least one anomalous condition of the identified anomalous conditions within the at least one range or zone.

27. The system of claim 22, wherein the one or more mitigative solution characteristics include capability to resolve or mitigate at least one of: the voltage phase jump, the voltage sag magnitude and a duration of the identified anomalous characteristics.

* * * * *